July 7, 1959
G. A. GAGNON
2,893,008
ELECTRONIC COMPONENT ATTACHING MACHINE
Filed Sept. 9, 1955
22 Sheets-Sheet 1
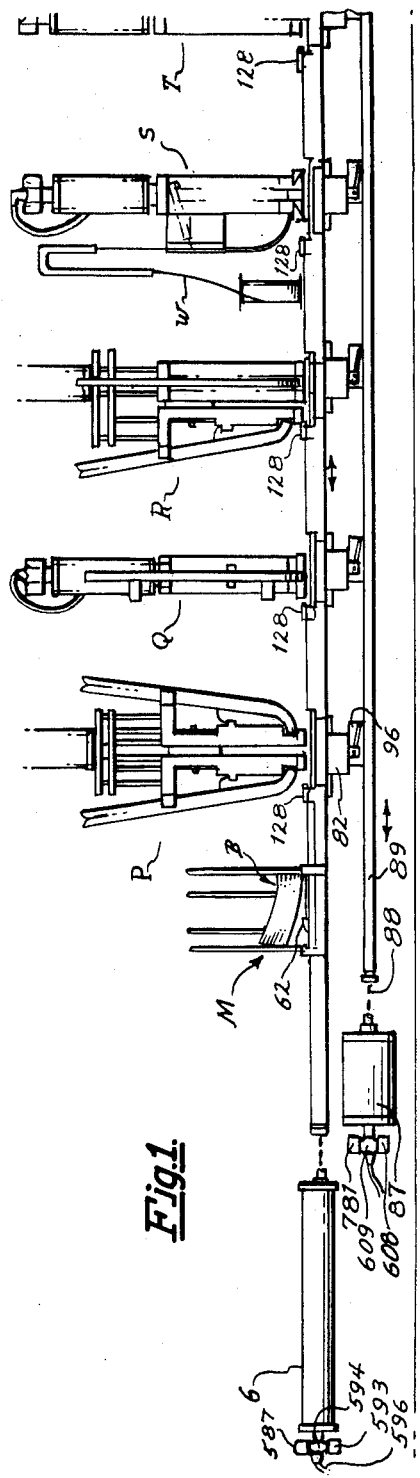
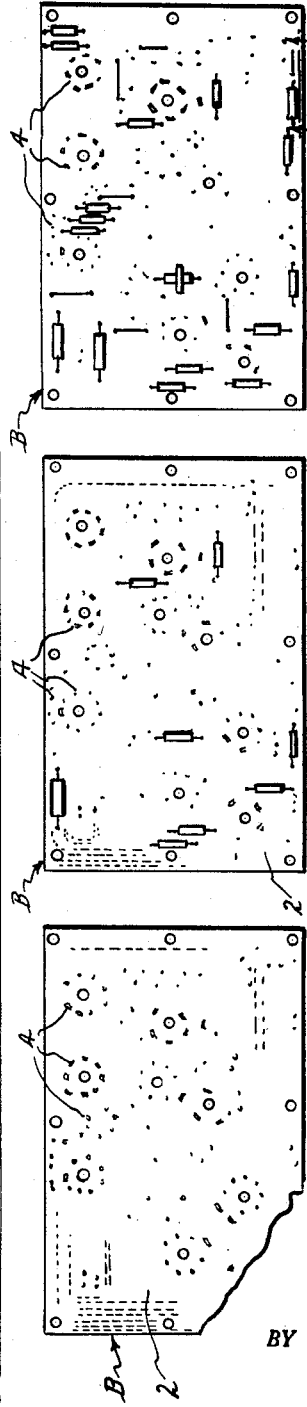
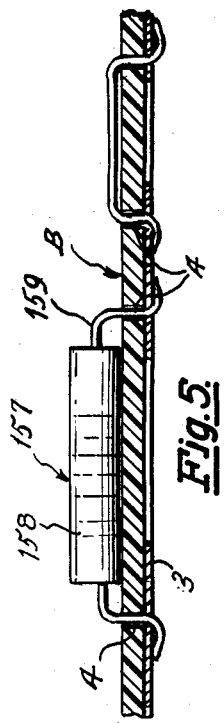
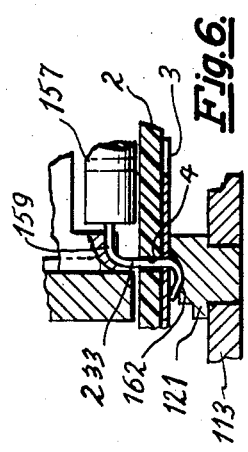
INVENTOR.
George A. Gagnon
BY

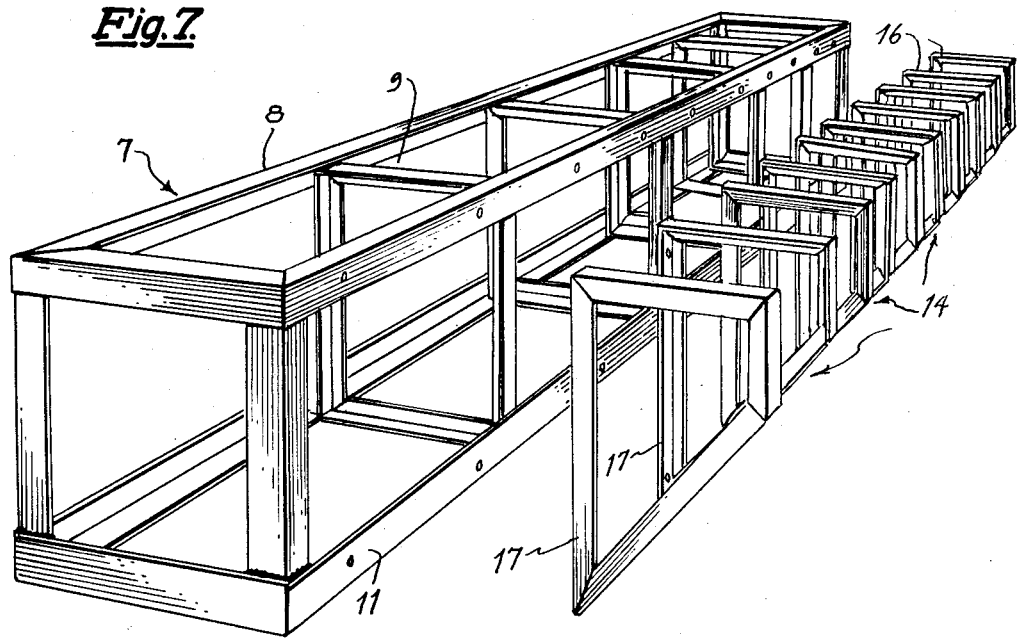
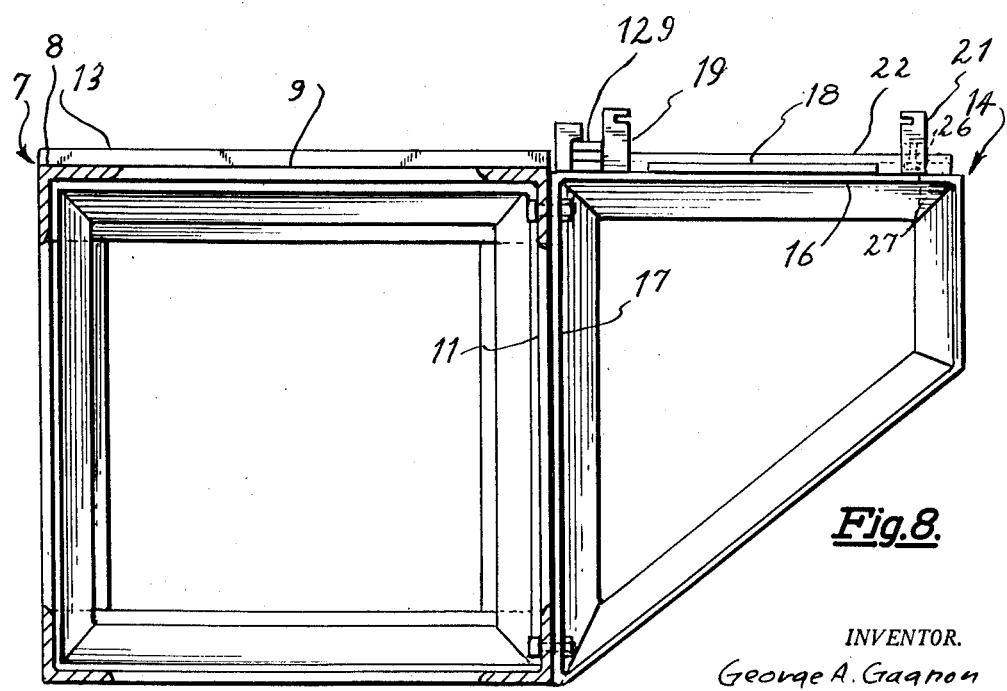

July 7, 1959    G. A. GAGNON    2,893,008
ELECTRONIC COMPONENT ATTACHING MACHINE
Filed Sept. 9, 1955    22 Sheets-Sheet 3
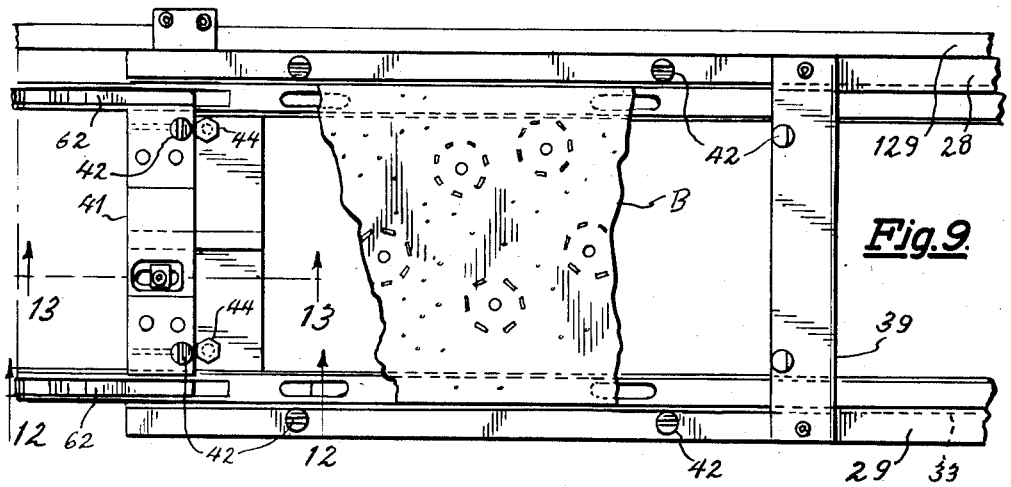
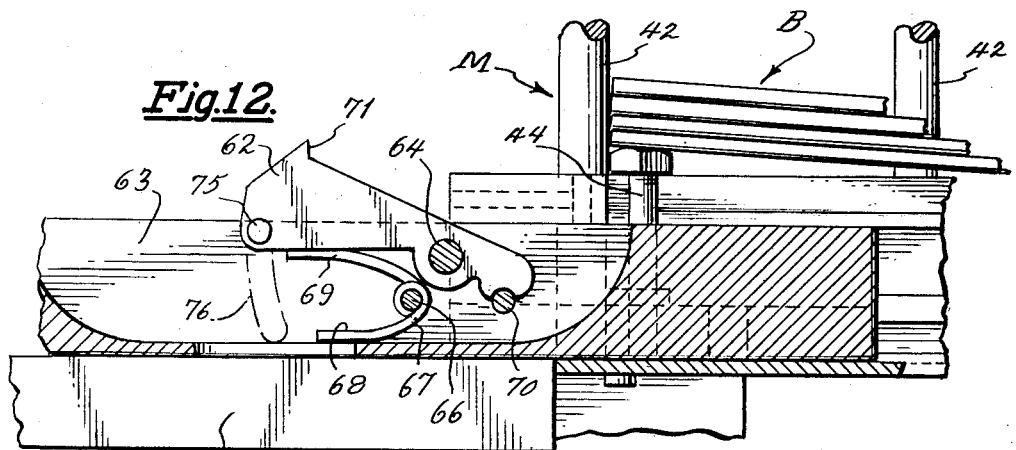
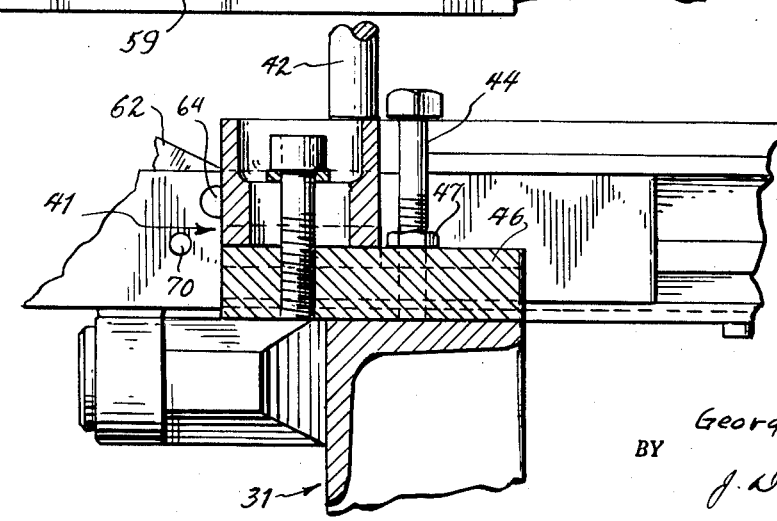
INVENTOR.
George A. Gagnon
BY
J. W. Douglas
his atty.

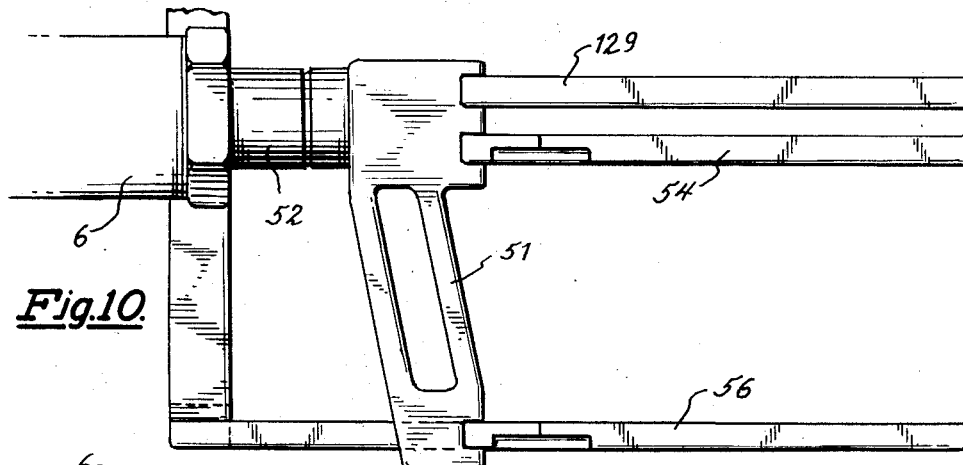
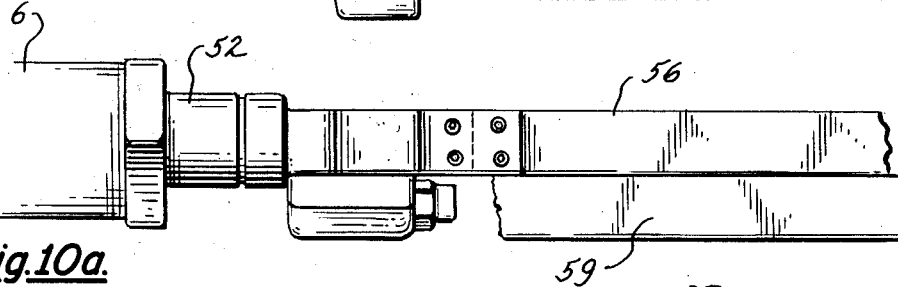
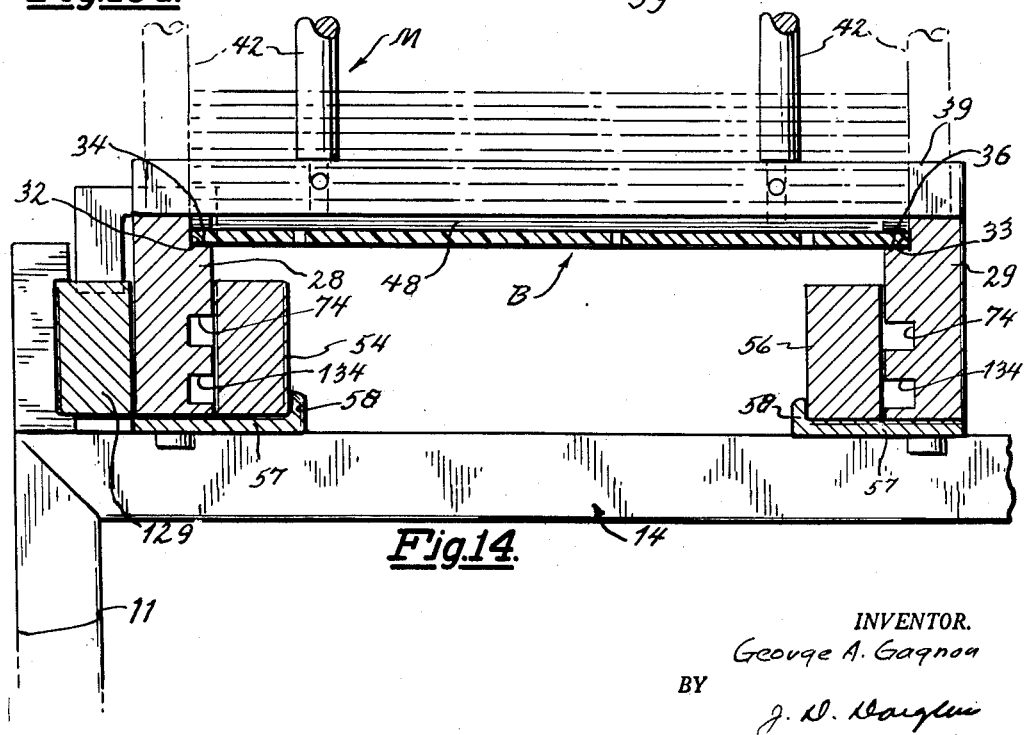

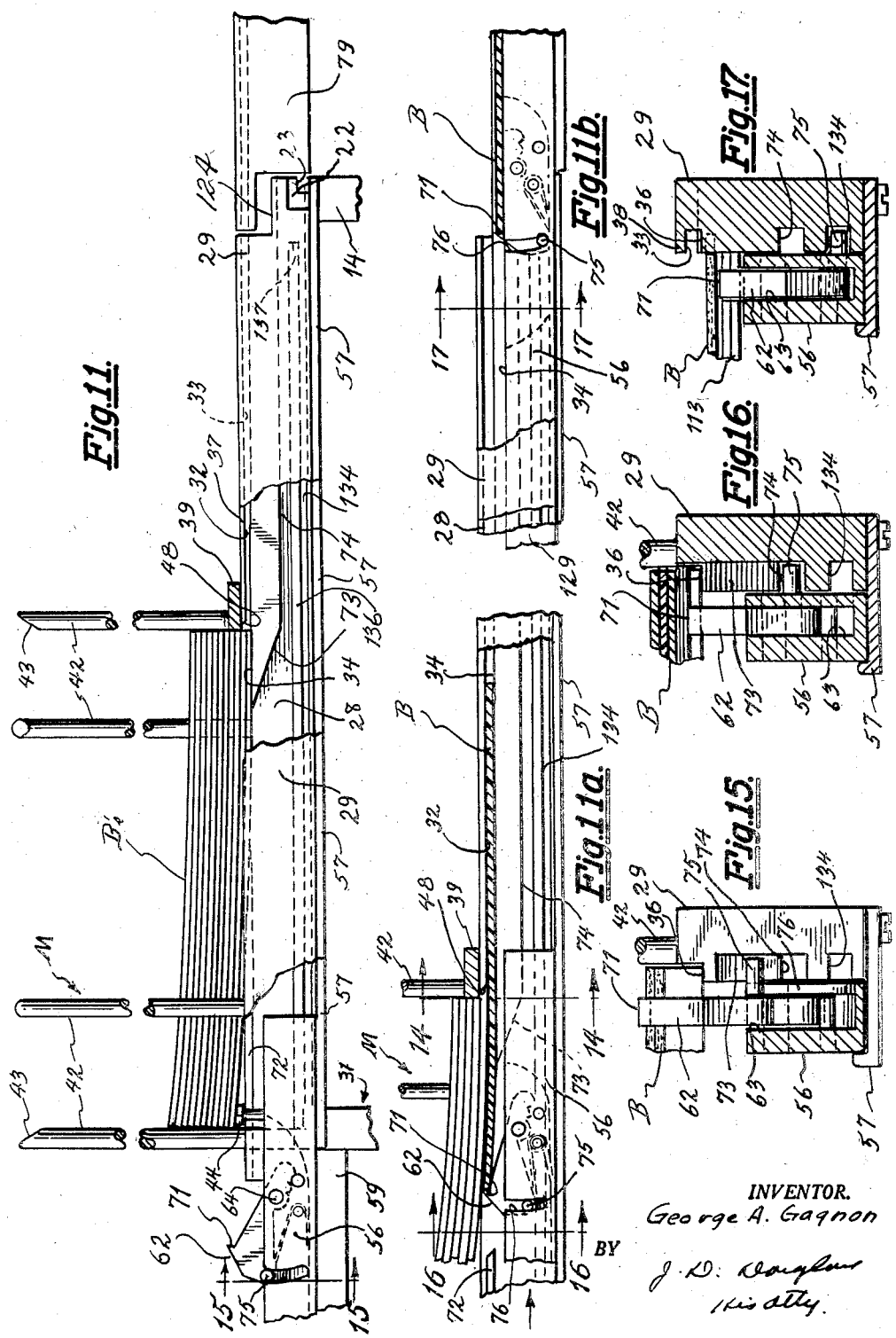

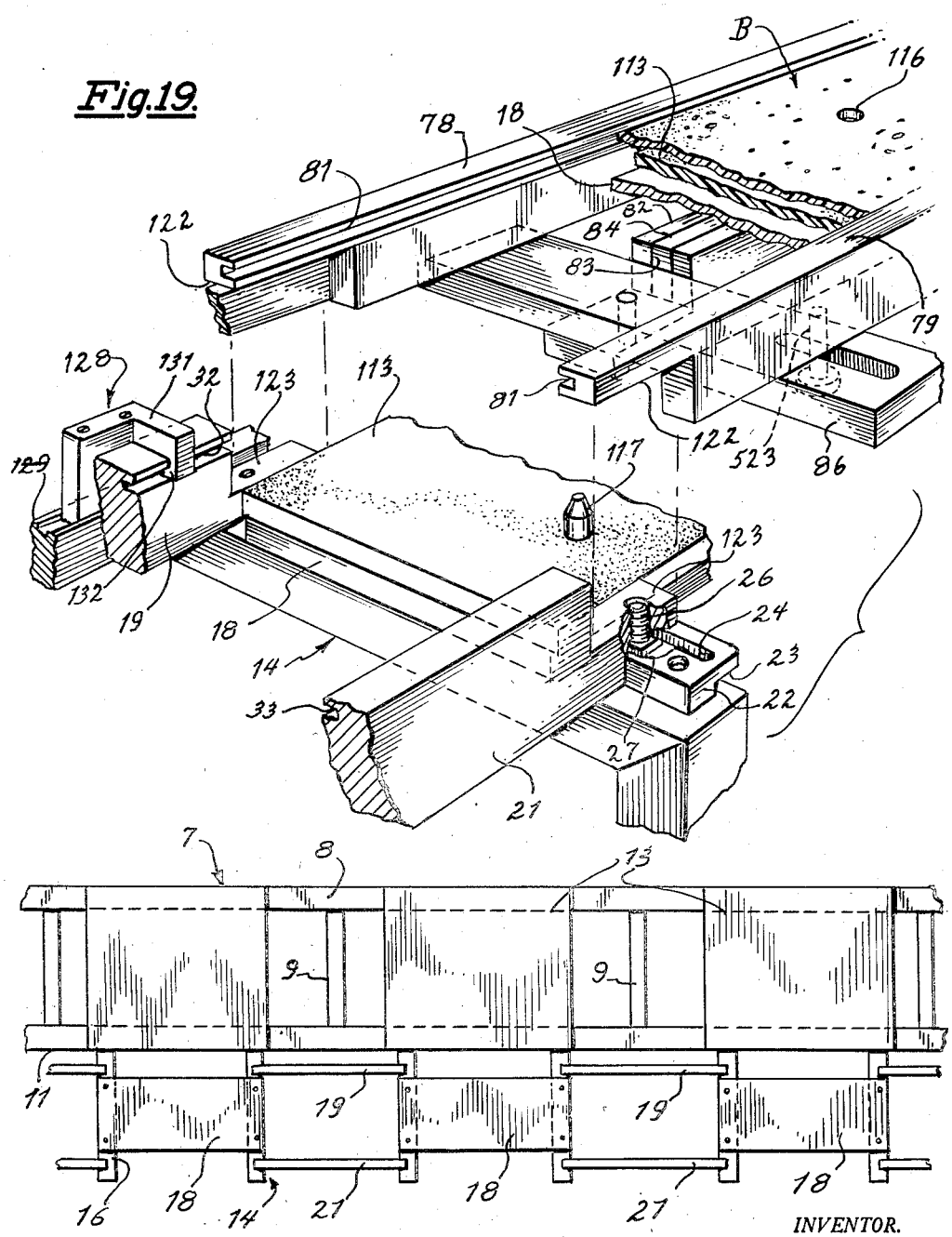

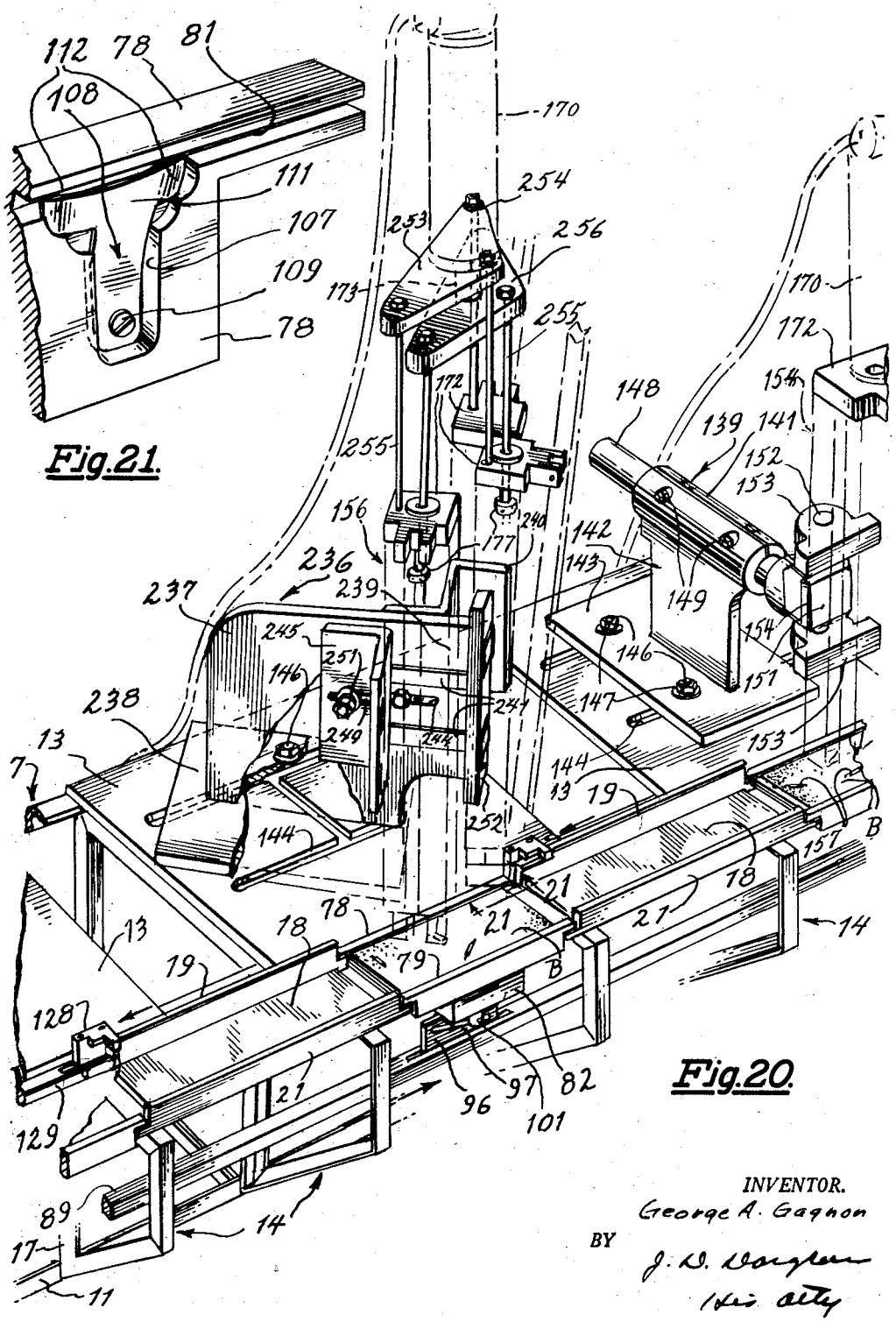

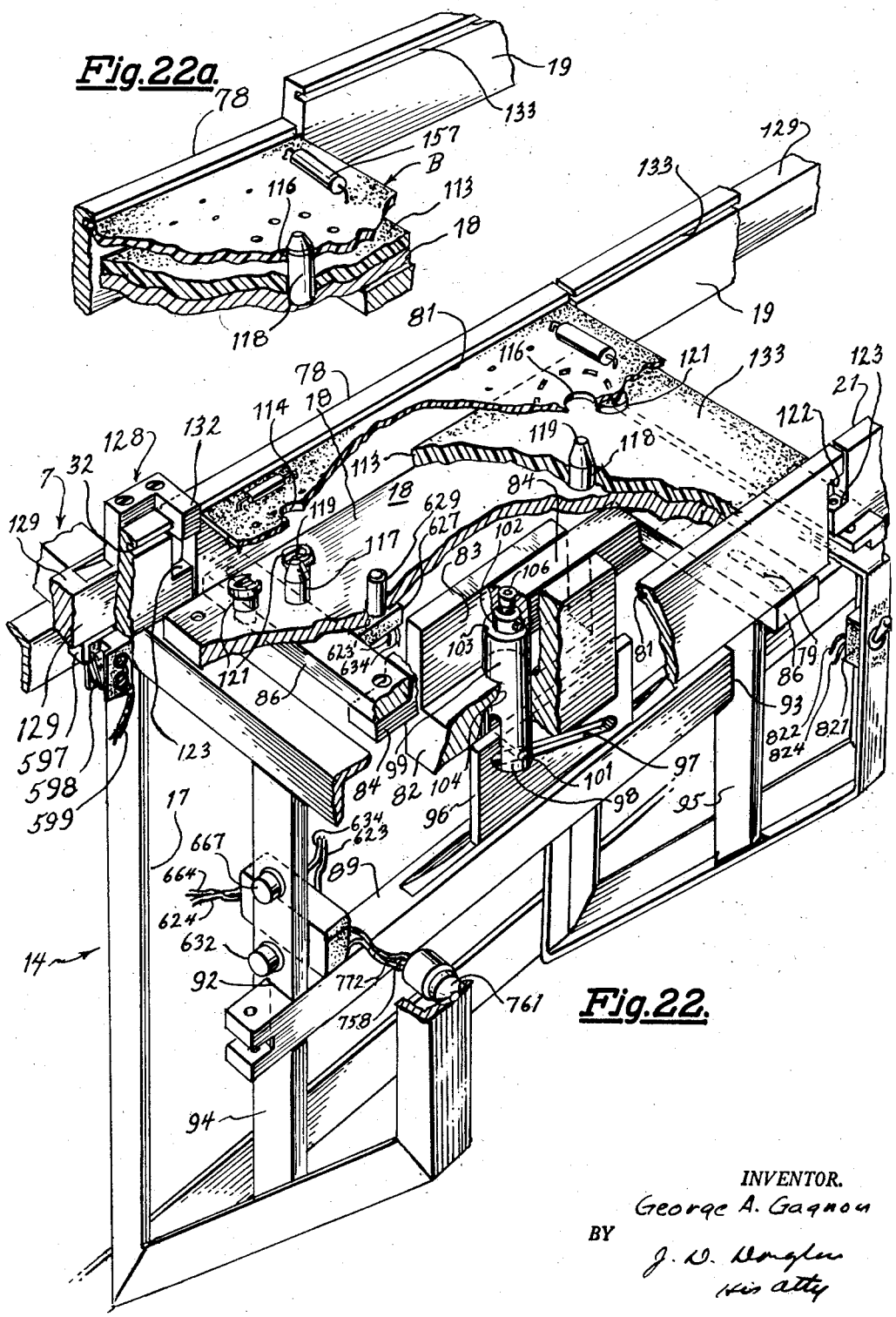

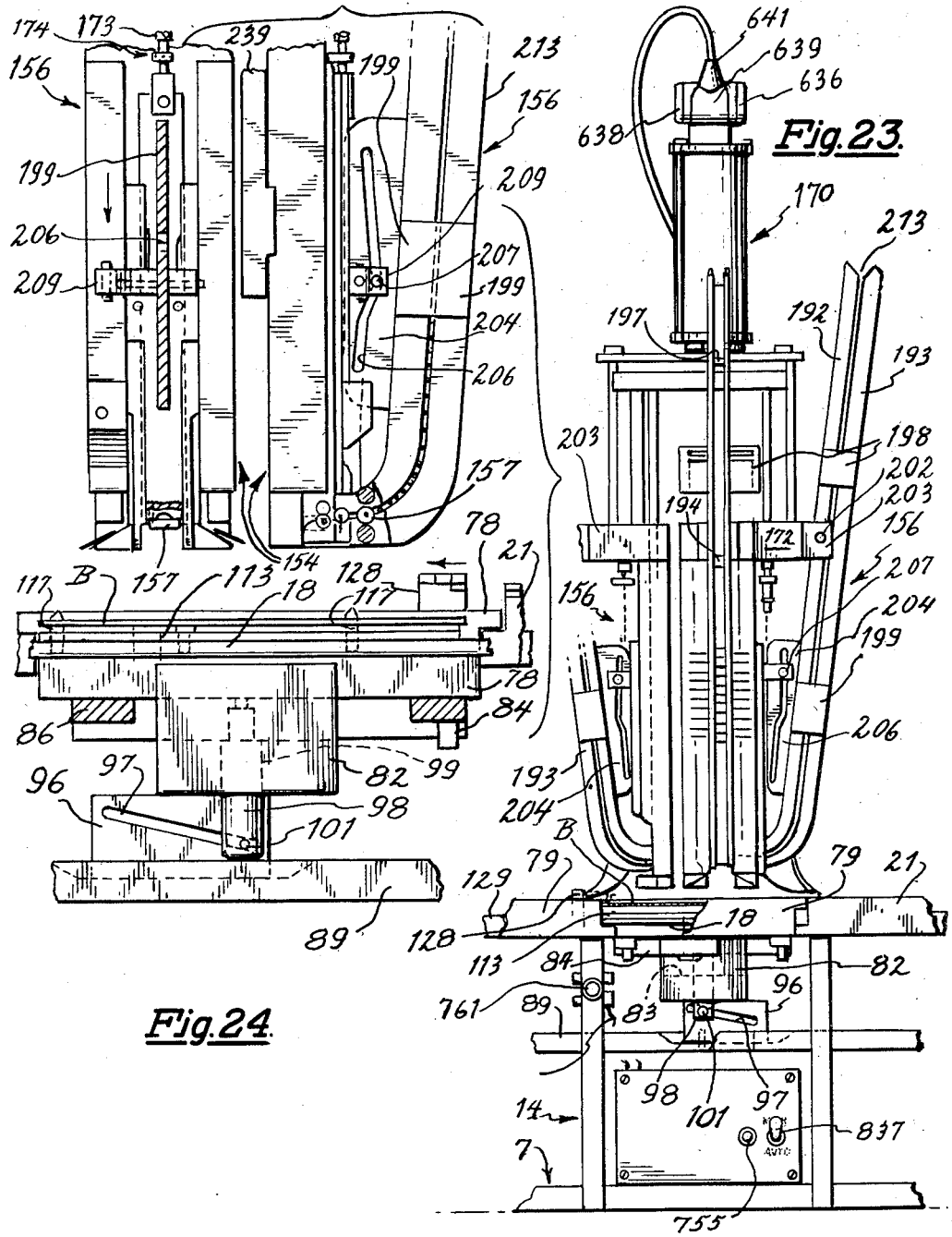

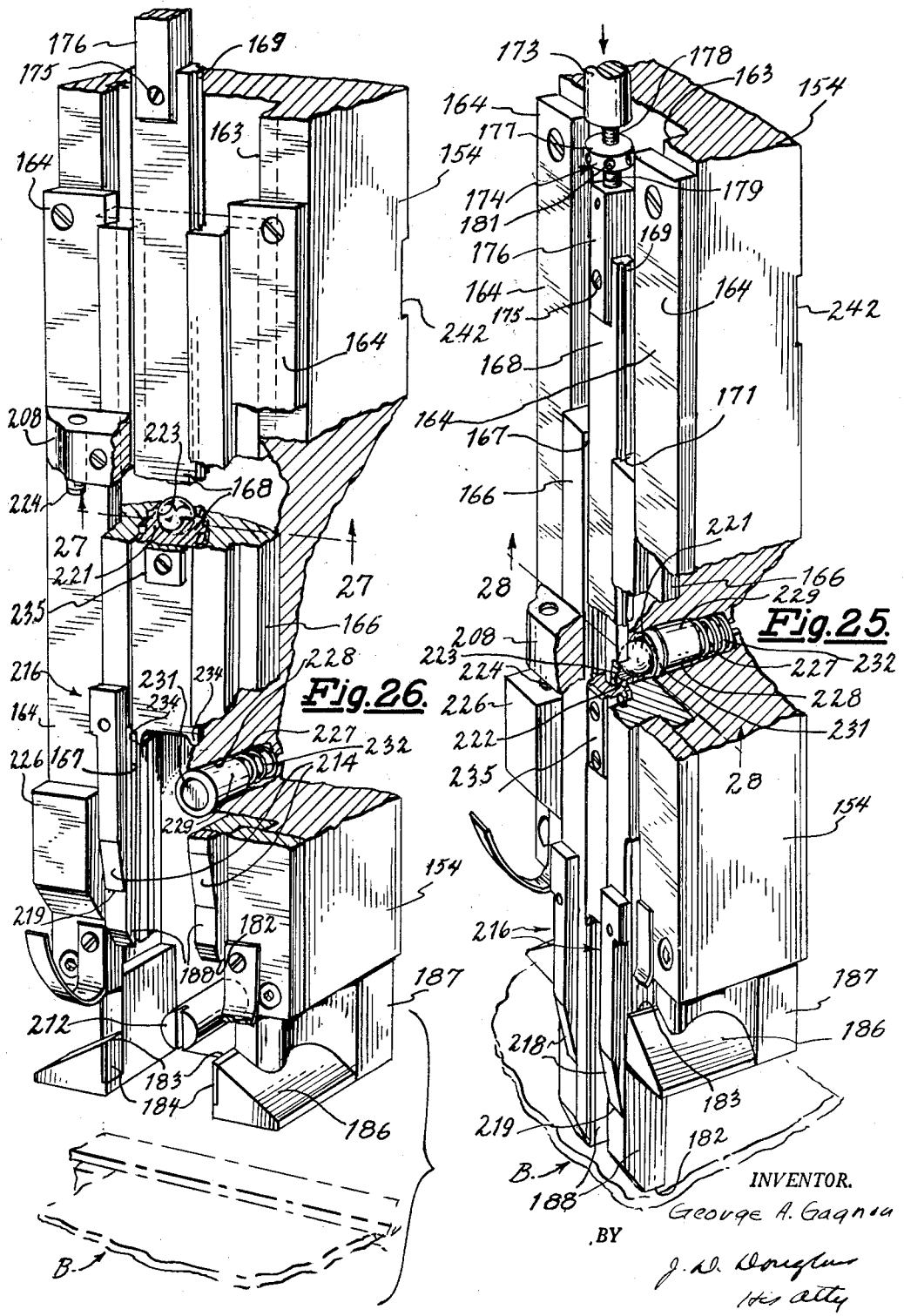

July 7, 1959 G. A. GAGNON 2,893,008
ELECTRONIC COMPONENT ATTACHING MACHINE
Filed Sept. 9, 1955 22 Sheets-Sheet 11
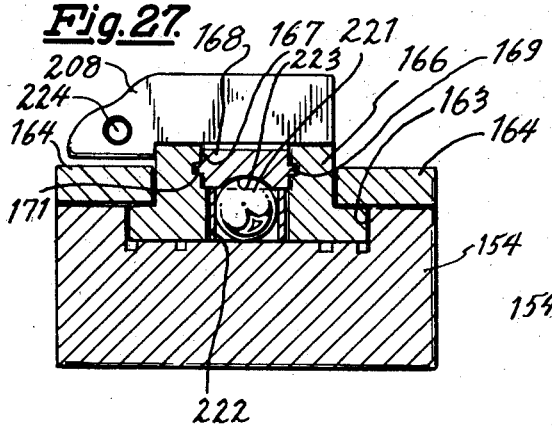
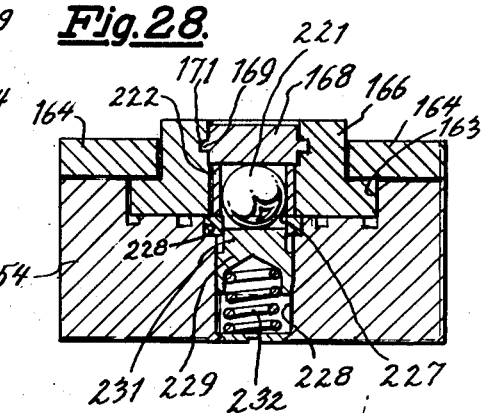
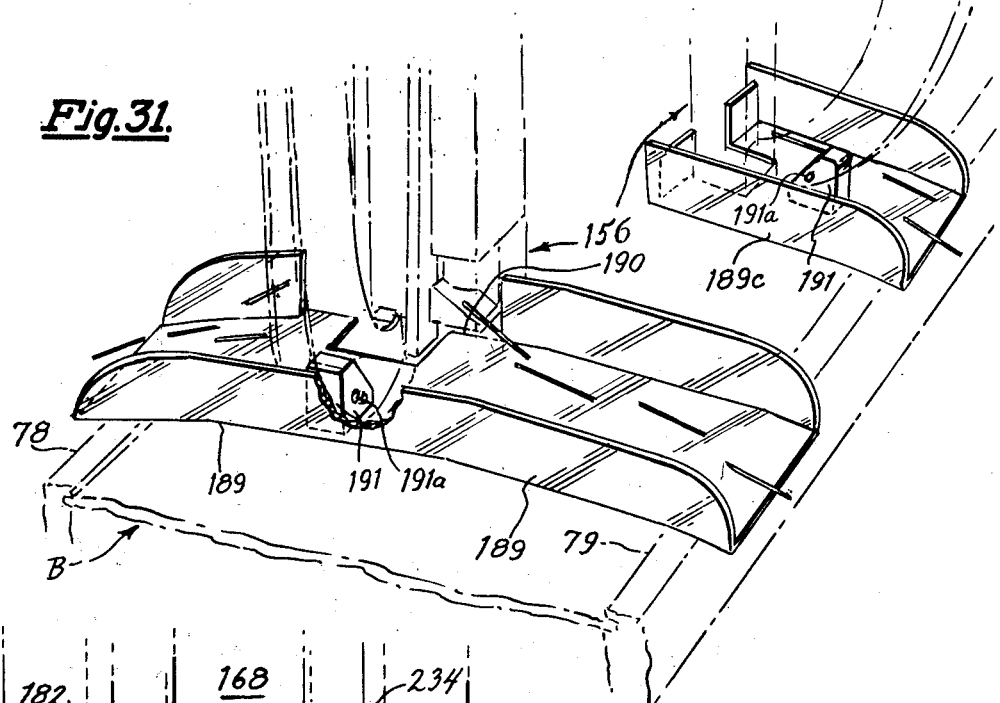
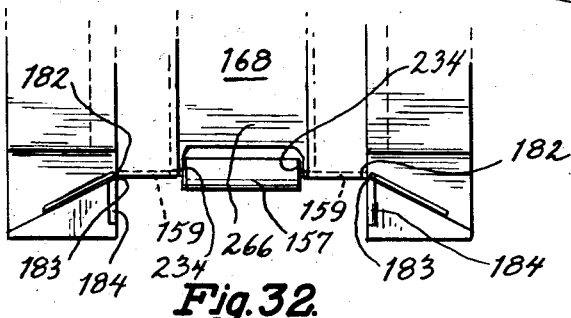
INVENTOR.
George A. Gagnon
BY

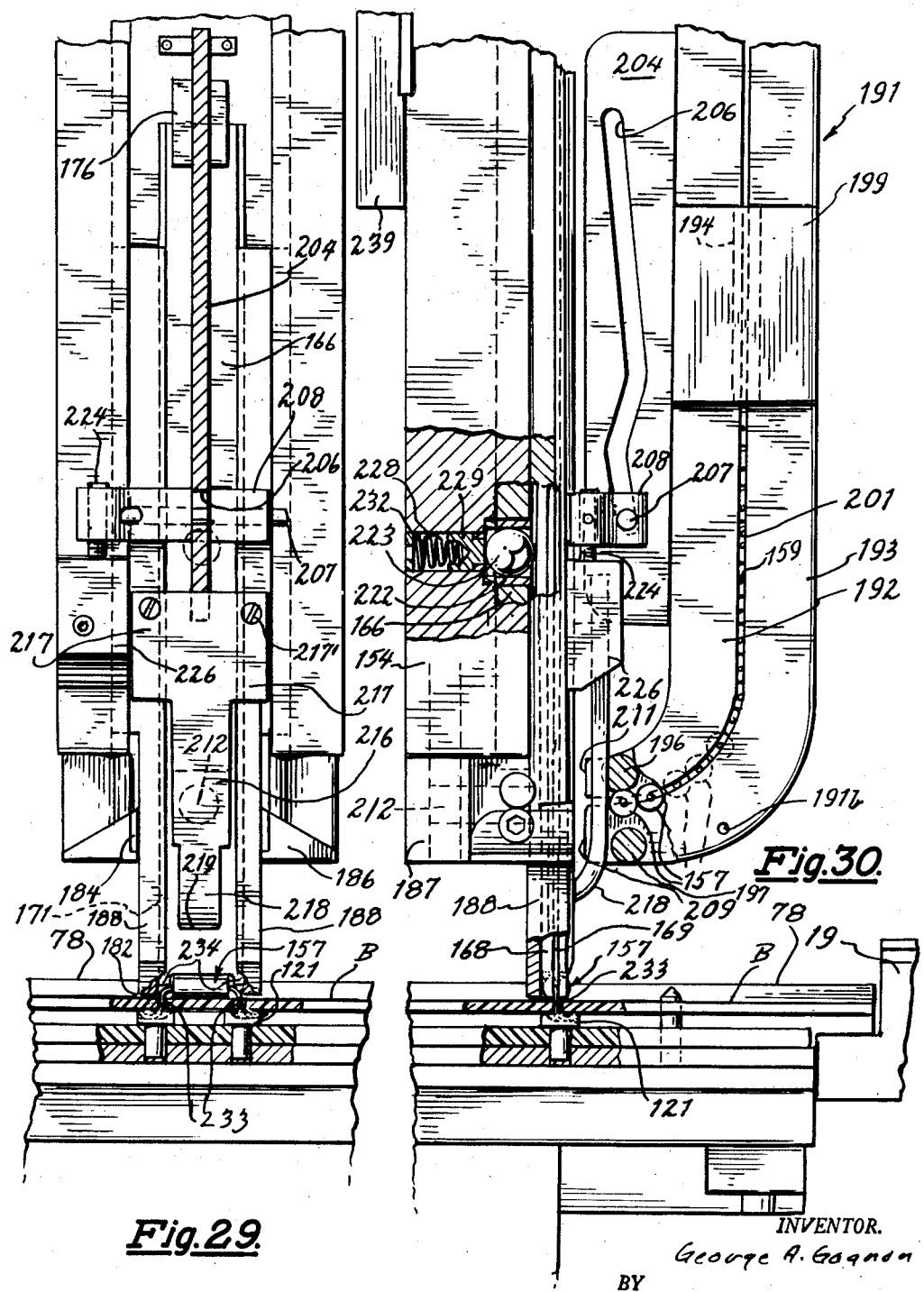

July 7, 1959 G. A. GAGNON 2,893,008
ELECTRONIC COMPONENT ATTACHING MACHINE
Filed Sept. 9, 1955 22 Sheets-Sheet 13

INVENTOR.
George A. Gagnon
BY

July 7, 1959
G. A. GAGNON
2,893,008
ELECTRONIC COMPONENT ATTACHING MACHINE
Filed Sept. 9, 1955
22 Sheets-Sheet 14
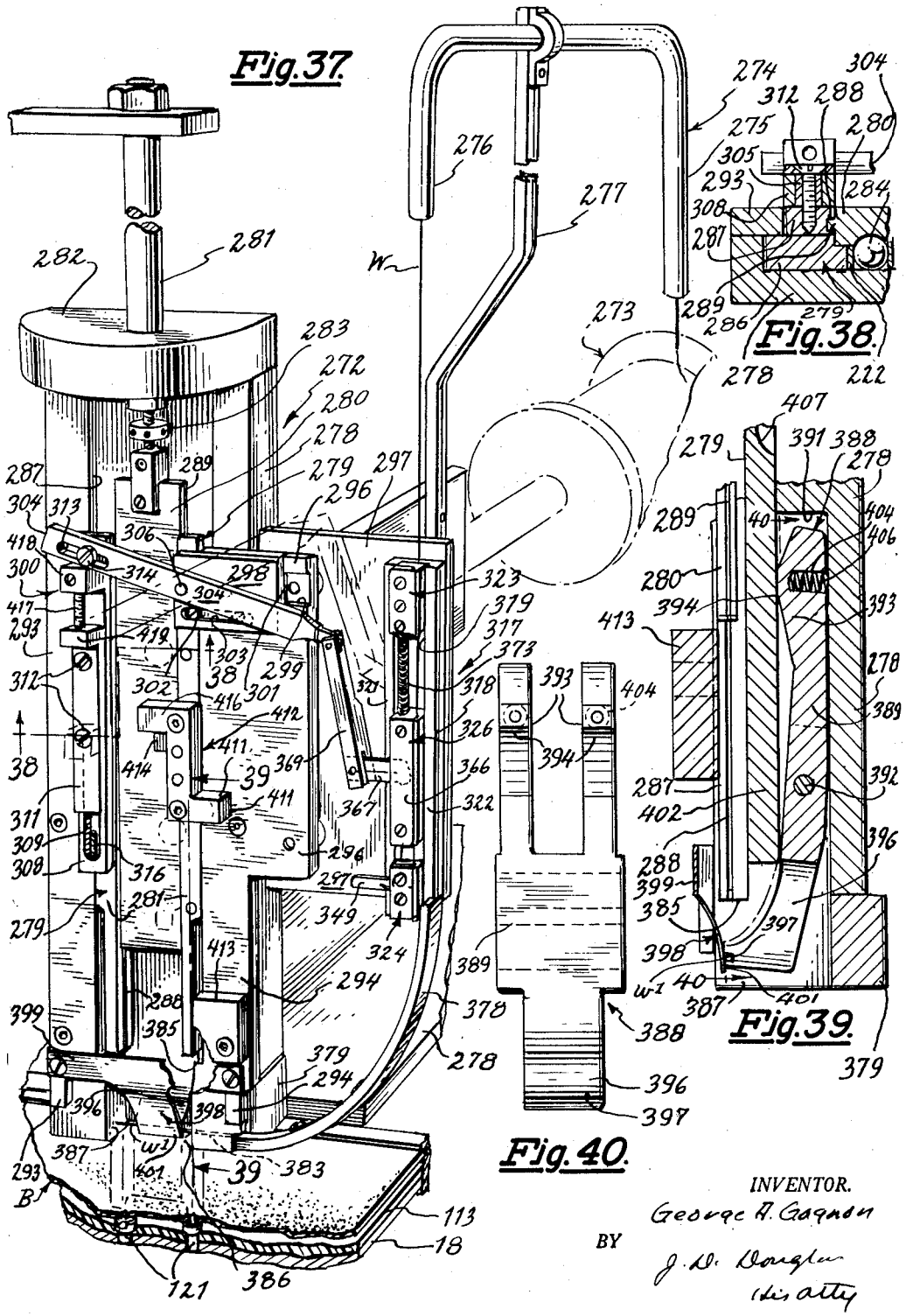
INVENTOR.
George A. Gagnon
BY
J. D. Douglas
his atty July 7, 1959  G. A. GAGNON  2,893,008
ELECTRONIC COMPONENT ATTACHING MACHINE
Filed Sept. 9, 1955  22 Sheets-Sheet 15

INVENTOR.
George A. Gagnon
BY
J. D. Dougher
His Atty

July 7, 1959    G. A. GAGNON    2,893,008
ELECTRONIC COMPONENT ATTACHING MACHINE
Filed Sept. 9, 1955    22 Sheets-Sheet 16
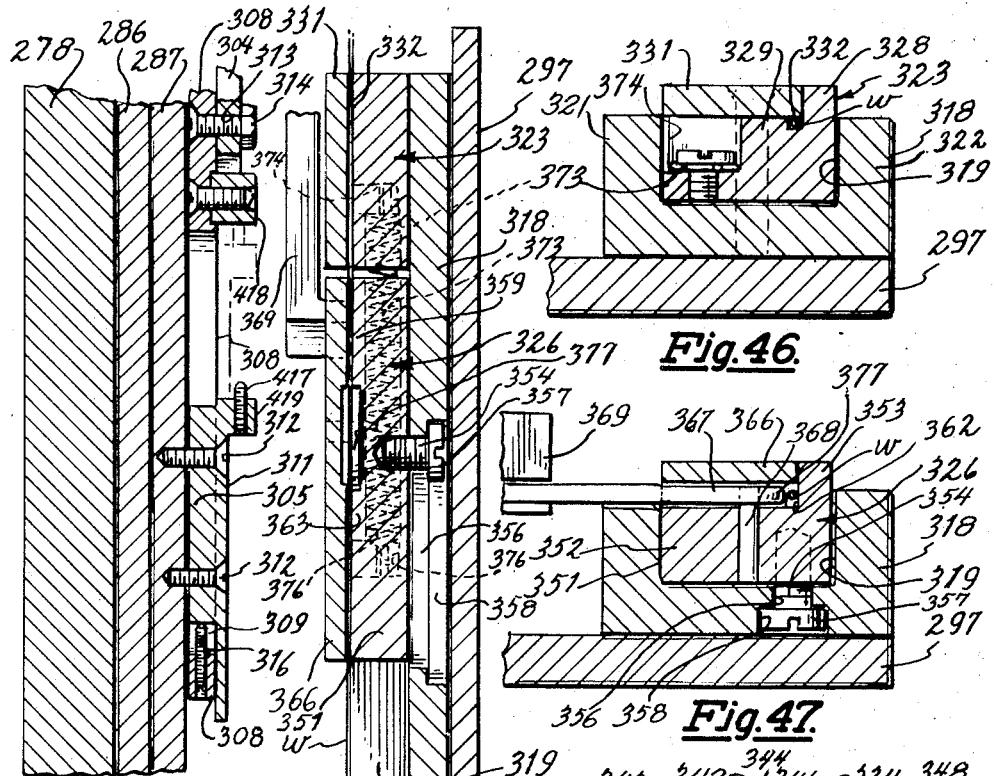
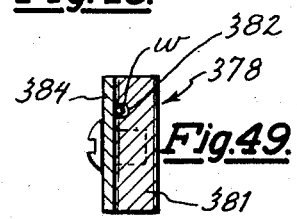
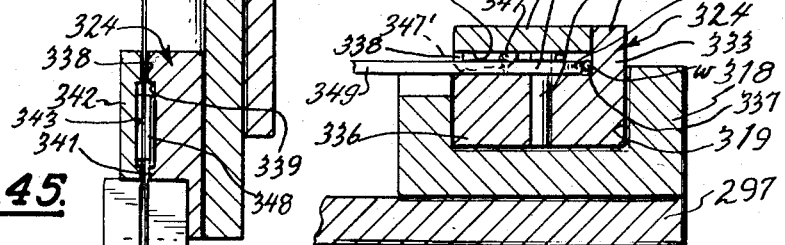
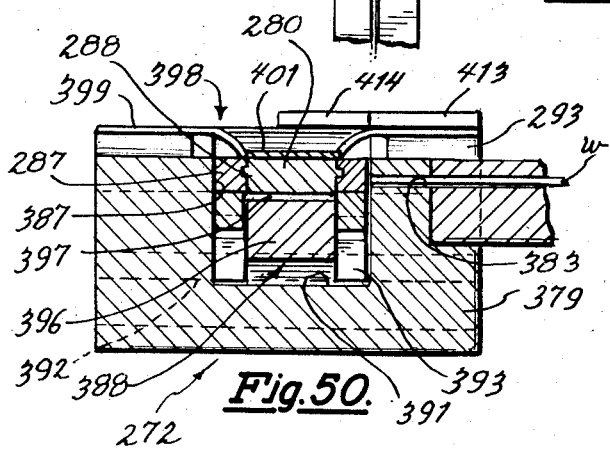
INVENTOR.
George A. Gagnon
BY
J. A. Douglas
His atty

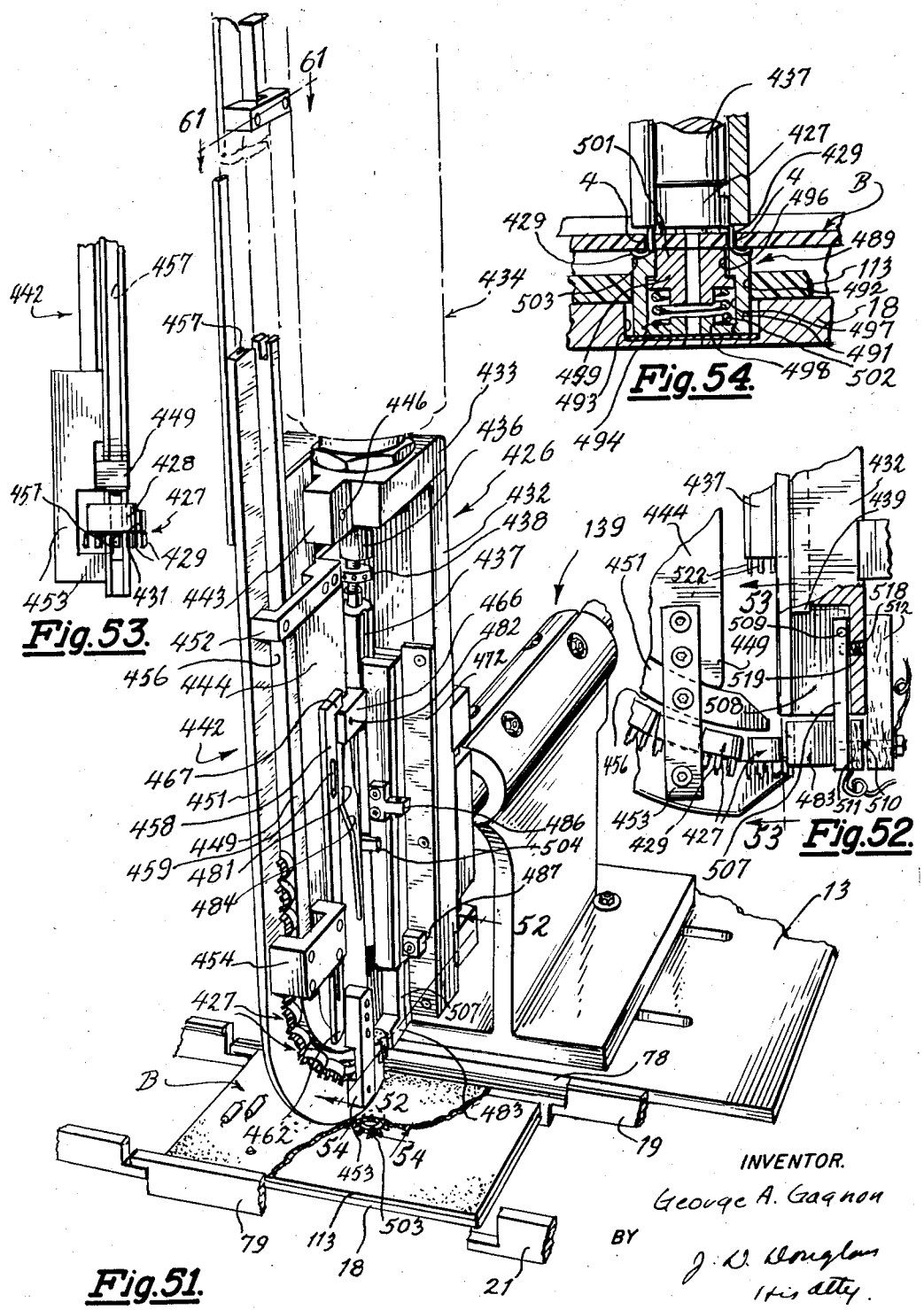

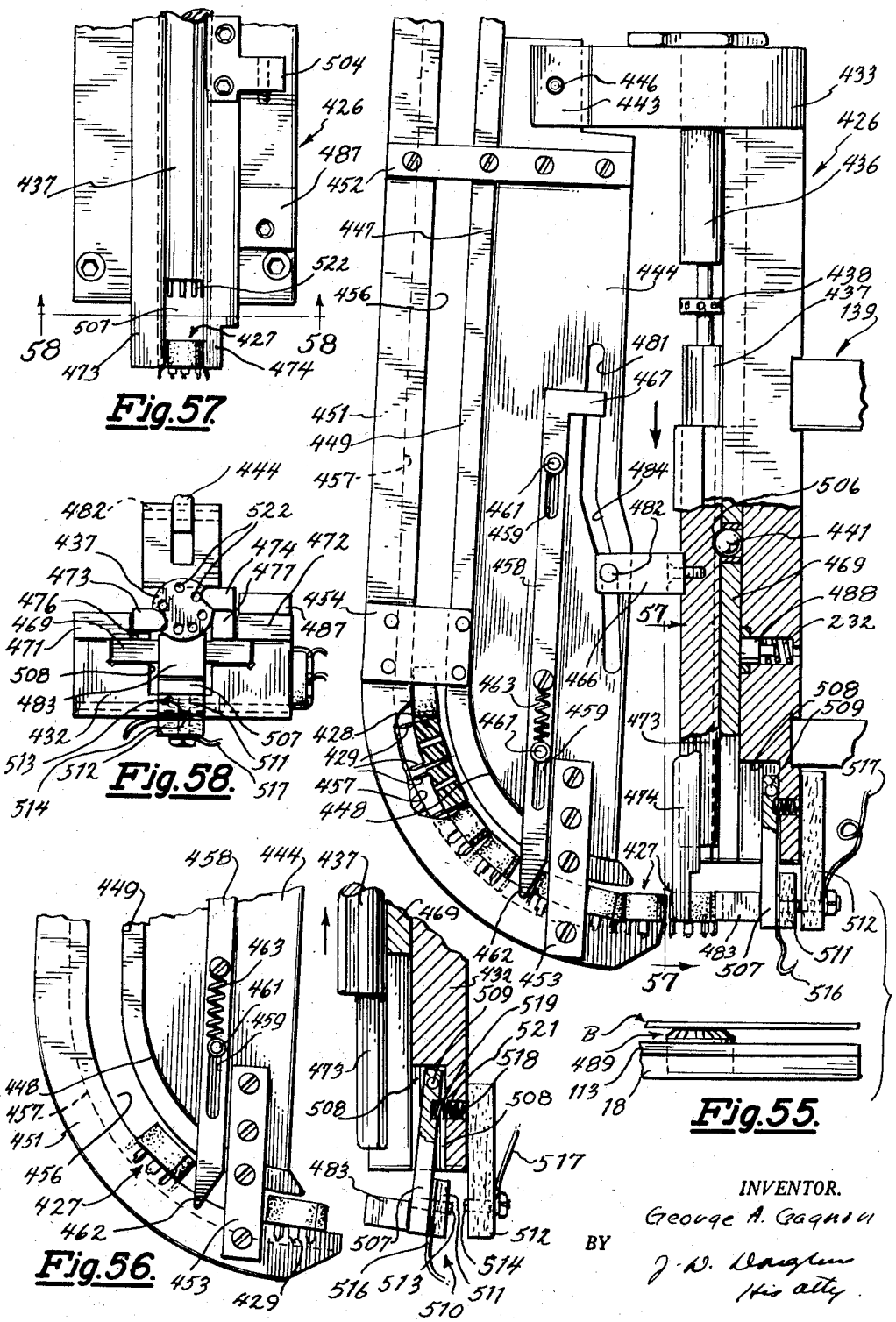

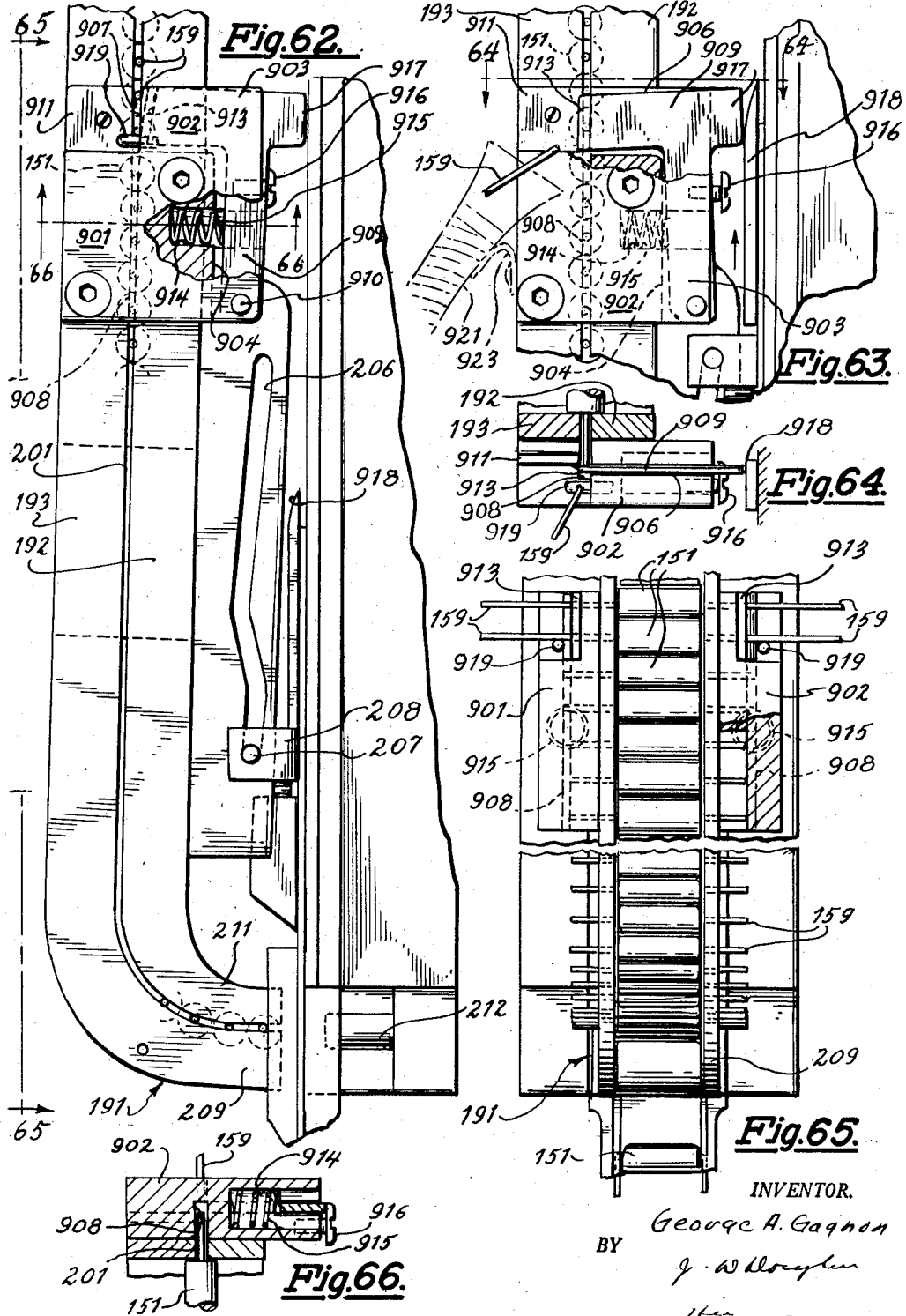

July 7, 1959

G. A. GAGNON 2,893,008

ELECTRONIC COMPONENT ATTACHING MACHINE

Filed Sept. 9, 1955

INVENTORS.
George A Gagnon
BY
*His* ATTORNEY

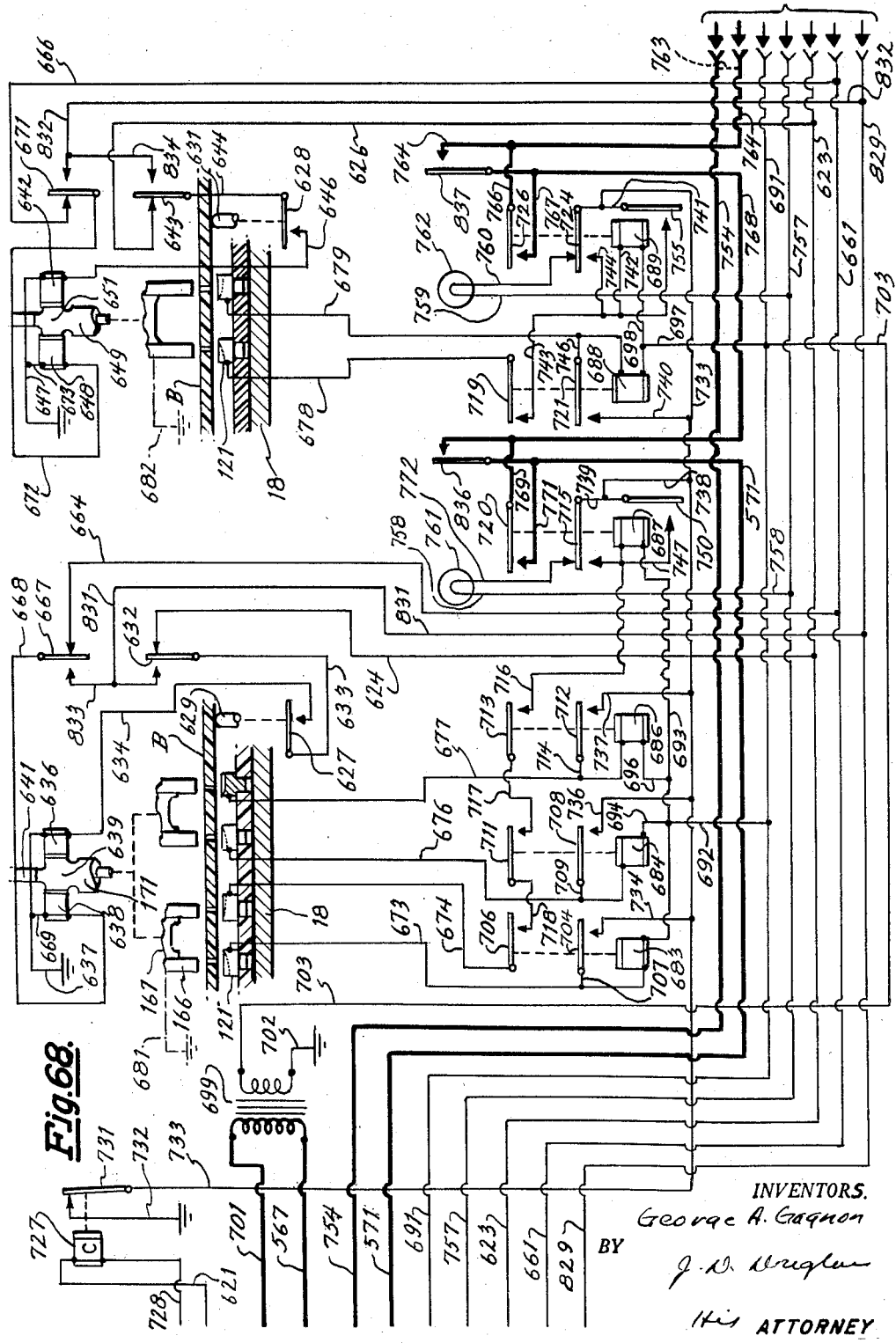

United States Patent Office 2,893,008
Patented July 7, 1959

2,893,008

ELECTRONIC COMPONENT ATTACHING MACHINE

George A. Gagnon, Chicago, Ill., assignor to Admiral Corporation, Chicago, Ill., a corporation of Delaware Application September 9, 1955, Serial No. 533,351

36 Claims. (Cl. 1—102)

This invention relates to the manufacture of electrical equipment and more particularly, but is not limited to, the manufacture of what is known in the art as radio and television chassis.

The invention about to be described is described in connection with a machine for initially installing circuit components on an insulated base which may comprise a dielectric sheet having conductors formed thereon by a process known in the art as a printed circuit. It involves the step or steps in manufacture of the apparatus preceding the soldering of leads and terminals of the components to the conductors on the blanks.

Where printed circuits are employed in the electronic industry, it has been customary to secure the various components to the printed circuit blanks manually, before soldering the components to the conductive portions of the blanks. The amount of labor and resultant cost thereof represents a considerable item in the overall cost of the device.

The present invention contemplates the use of mechanical means for replacing the manual labor previously necessary for initial assembly of the components with the blanks which is commonly known as automation. Additionally, the operations are performed at a higher rate than when they were performed manually so that by use of the novel device electronic apparatus may be automatically produced at prices lower than formerly.

The novel machine comprises magazine means for retaining a stack of printed circuit blanks in superimposed relation to each other. The magazine is at the end of a row of horizontal blank supports also in spaced relation to each other and from which the magazine is also spaced. Successive lowermost blanks are removed from the magazine by a pair of ejector members which oscillate horizontally by cycles and engage, on their forward movement, the end of a lowermost blank only. In the course of their stroke, the ejectors slide the bottom blank out from under the remaining magazined blanks and pass it through a gate in the side of the magazine nearest the first or adjacent support. In this operation the bottom blank rests on a pair of rails until it has been slid over the first support to rest thereon after the forward stroke of the ejectors has been completed.

Above the first support, and successive supports, is mounted at least one circuit component affixing device which is associated with a component magazine which is loaded with the components of the type to be installed by the device. Furthermore, the device is operated cyclically and sequentially relative to the operation of the ejectors so that as soon as a blank has been deposited on the support the device then operates to affix a component thereto.

A transfer member, also operative in unison with the ejectors, then removes the blank from the first support and transfers it to the adjacent or second support while concurrently the first blank is replaced by a second blank from the source and in the manner already indicated.

Simultaneously, both blanks then receive and have secured thereto components from devices above each station. They are then transferred to succeeding supports where they receive additional components and are, of course, replaced by other blanks as previously described. The components are therefore applied at stations, any number of which may be provided. A plurality of components may be applied to a blank at any of the stations.

Additional advantages of the invention will be apparent from the following description when considered in conjunction with the accompanying drawings in which:

Fig. 1 is a schematic view of a component affixing installation in which the invention is embodied;

Fig. 2 is an elevational view of a printed circuit blank before any of the components have been affixed thereto;

Fig. 3 is a view corresponding to Fig. 2, some components having been applied to the blank;

Fig. 4 is a view corresponding to Fig. 3, additional components having been applied to the blank;

Fig. 5 is a vertical section taken on line 5—5 of Fig. 4 illustrating a pair of attached components;

Fig. 6 is a fragmentary sectional view showing means for applying a component to a printed circuit blank;

Fig. 7 is an exploded perspective view of elements of the frame of the mechanism;

Fig. 8 is an end view of the frame, the parts thereof being in assembled relation to each other;

Fig. 9 is a top plan view of the magazine;

Fig. 10 is a fragmentary top plan view of linkage for coupling the pusher motor to the ejector mechanism;

Fig. 10a is a side view thereof;

Figs. 11, 11a and 11b are fragmentary side elevational views of the magazine, showing the ejector mechanism thereof in different stages of its operation, parts being broken away to reveal structure of other parts;

Fig. 12 is a fragmentary vertical section taken on line 12—12 of Fig. 9;

Fig. 13 is a vertical section taken on line 13—13 of Fig. 9;

Fig. 14 is a vertical section taken on line 14—14 of Fig. 11a;

Fig. 15 is a vertical section taken on line 15—15 of Fig. 11;

Fig. 16 is a vertical section taken on line 16—16 of Fig. 11a;

Fig. 17 is a vertical section taken on line 17—17 of Fig. 11b;

Fig. 18 is a fragmentary top plan view of the frame including the parts shown in Fig. 7;

Fig. 19 is a fragmentary perspective view of the horizontal and vertical conveyor mechanism;

Fig. 20 is a perspective view of a portion of the frame at one of the component affixing stations, and a mounting for a pair of component affixing units;

Fig. 21 is a fragmentary perspective view of the means for slowing down a printed circuit blank as it is moved into one of the component affixing stations;

Fig. 22 is a fragmentary perspective view of the vertical conveyor mechanism, in elevated position, parts being broken away to reveal the structure of other parts;

Fig. 22a is a fragmentary view of some of the parts shown in Fig. 22, the mechanism being in its lowered position;

Fig. 23 is a fragmentary front elevational view of a component affixing station showing three units operated by a single vertical fluid pressure motor;

Fig. 24 is also a view, drawn to an enlarged scale, corresponding to Fig. 23, showing means by which a blank is moved to a vertical position differing from the position thereof shown in Fig. 23;

Figs. 25 and 26 are fragmentary elevational views of a component affixing unit, parts thereof being in different positions and broken away to reveal other parts;

Fig. 27 is a horizontal section taken on line 27—27 of Fig. 26;

Fig. 28 is a horizontal section taken on line 28—28 of Fig. 25;

Fig. 29 is a fragmentary front elevational view of a component affixing unit for applying condensers to a printed circuit blank, parts being broken away;

Fig. 30 is a side elevational view of the mechanism shown in Fig. 29, parts being broken away;

Fig. 31 is a view, in perspective, of two embodiments of chutes for guiding clippings from a component away from moving parts of the affixing mechanism;

Fig. 32 is a fragmentary view of the shearing mechanism of a component affixing mechanism;

Fig. 37 is a fragmentary perspective view of a component affixing unit for applying cross-overs to a printed circuit blank;

Fig. 38 is a horizontal section taken on line 38—38 of Fig. 37;

Fig. 39 is a vertical section taken on line 39—39 of Fig. 37;

Fig. 40 is a side elevational view of the retractable die;

Fig. 44 is a vertical section taken on line 44—44 of Fig. 41;

Fig. 45 is a vertical section taken on line 45—45 of Fig. 41 and drawn to an enlarged scale;

Fig. 46 is a horizontal section taken on line 46—46 of Fig. 41;

Fig. 47 is a horizontal section taken on line 47—47 of Fig. 41;

Fig. 48 is a horizontal section taken on line 48—48 of Fig. 41;

Fig. 49 is a horizontal section taken on line 49—49 of Fig. 41;

Fig. 50 is a horizontal section taken on line 50—50 of Fig. 41;

Fig. 51 is a perspective view of a component affixing unit for applying tube sockets to a printed circuit blank, some of the parts of the unit being broken away;

Fig. 52 is a fragmentary side elevational view, the locus of which is indicated by line 52—52 of Fig. 51, the parts being in a different position;

Fig. 53 is a fragmentary side elevational view, the locus of which is indicated by line 53—53 of Fig. 52;

Fig. 54 is a vertical section taken on line 54—54 of Fig. 51;

Figs. 55 and 56 are fragmentary elevational views corresponding to Fig. 52, parts of the respective views being in different positions;

Fig. 57 is an elevational view the whereabouts of which is indicated by line 57—57 of Fig. 55;

Fig. 58 is a horizontal section taken on line 58—58 of Fig. 57;

Fig. 62 is a fragmentary side elevational view of a modified form of head for handling components and illustrates a different type of lead cutting device.

Fig. 63 is a similar view of the cutter portion in a different operative position;

Fig. 64 is a section on the line 64—64 of Fig. 63;

Fig. 65 is a view taken on the line 65—65 of Fig. 62;

Fig. 66 is a section taken on the line 66—66 of Fig. 62;

Fig. 68 is the right hand part thereof.

*General description*

Figure 33:
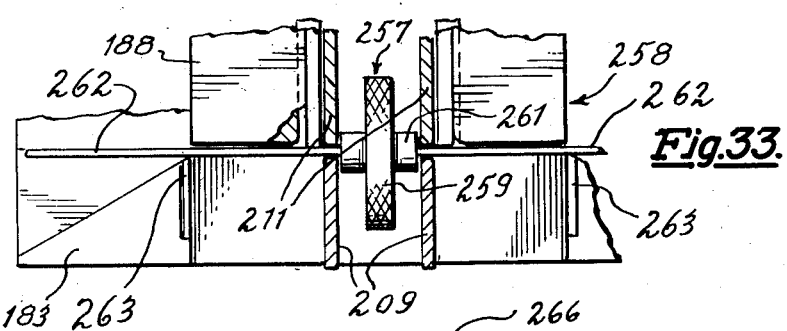
Figs. 33, 34 and 35 are front elevational views of an affixing mechanism of the type employed for applying a peaking coil to a printed circuit blank, the respective views representing three steps in the operation and portions of the mechanism being broken away.
Figure 34:
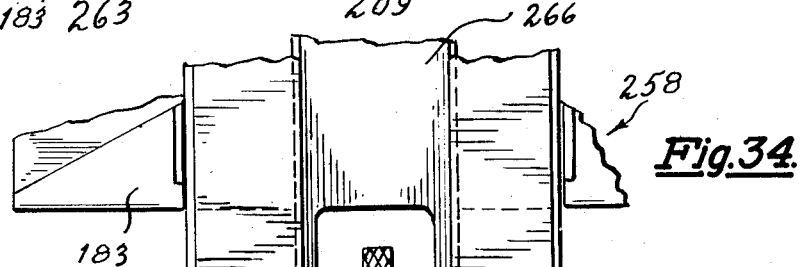
Figure 36:
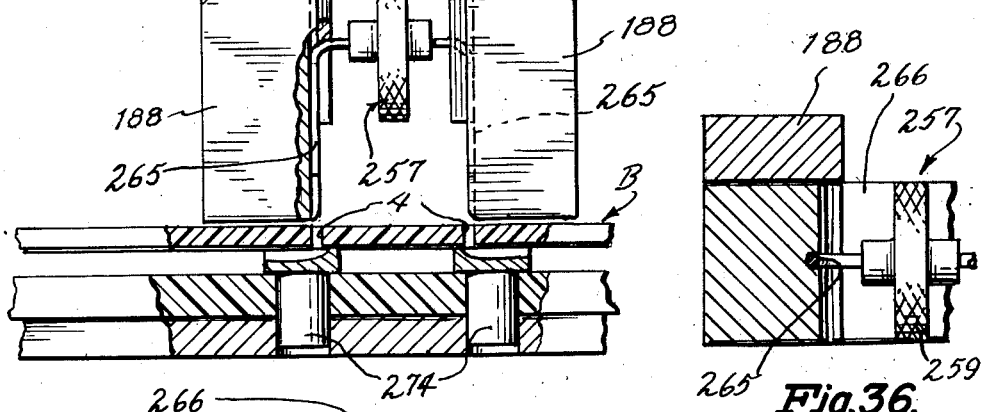
Fig. 36 is a horizontal section taken on line 36—36 of Fig. 35.
Figure 35:
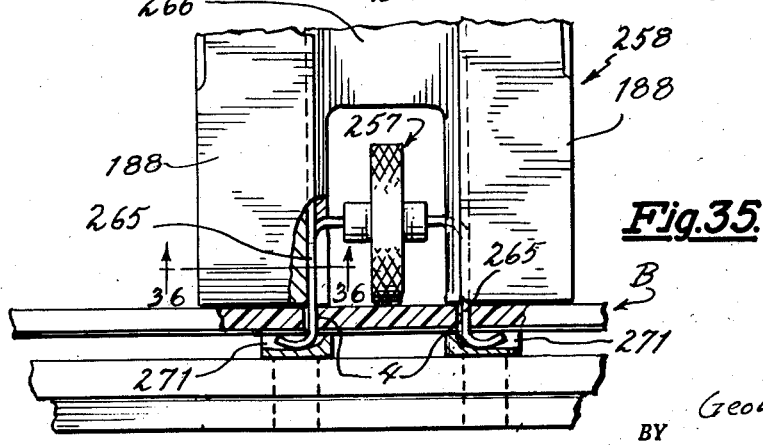
Figures 41, 42, 43:
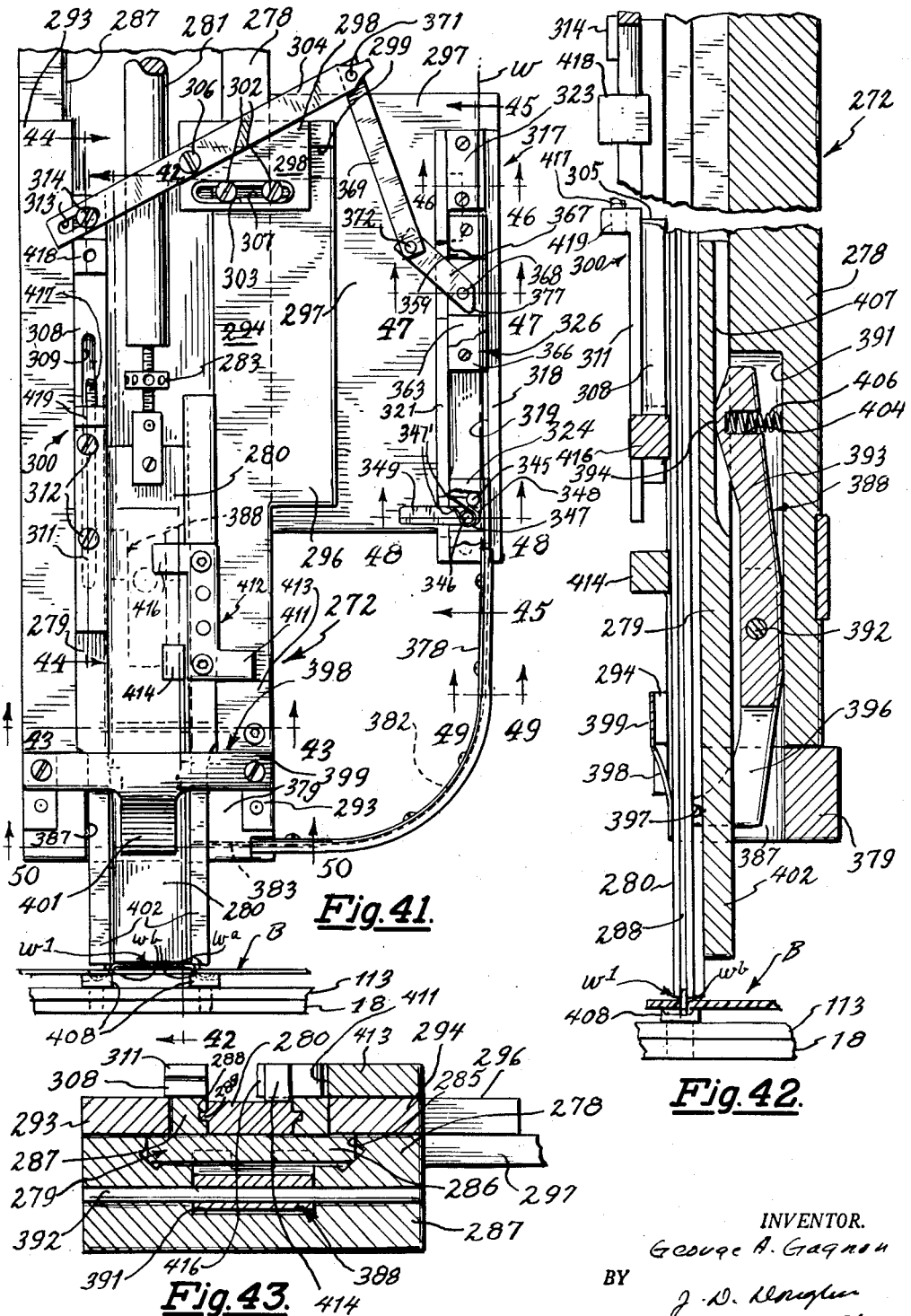
Fig. 41 is a front elevational view of the mechanism shown in Fig. 37, parts thereof being in different positions of operation.
Fig. 42 is a vertical section taken on line 42—42 of Fig. 41.
Fig. 43 is a horizontal section taken on line 43—43 of Fig. 41.
Figure 60:
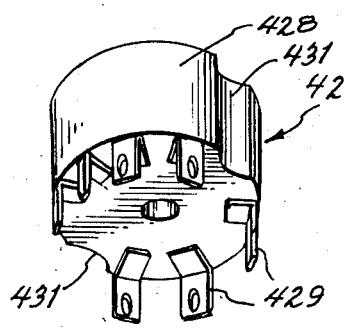
Fig. 60 is a perspective view of the socket manipulated by the apparatus shown in Fig. 55, the socket being depicted as above the level of the eye of an observer.

Throughout the drawings the reference character B is used to denote a "printed" circuit blank. It is best shown in Fig. 2 and comprises a rectangular plate 2 of some suitable dielectric material such as Bakelite about 1/16 of an inch in thickness. On one side of the plate is a multiplicity of metal conductors 3 which are formed thereon by a process referred to by the trade as "printing." The process will not be described, however, since it is no part of the present invention. The purpose of the printed conductors, of course, is to take the place of wires ordinarily joining elements of the numerous circuit components of an electronic circuit as in radio or television receivers. Prior to association of components with the plate 2, a multiplicity of apertures 4, or irregular formation and arrangement, are provided therein. One of the functions of the invention is the means it affords for inserting conductors or leads, to be found on circuit components, into the apertures from the reverse side of the plate; i.e., the side opposite the side on which the conductors are carried.

Although condensers and resistors are typical components applicable to the blank B, tube sockets and coil units having connector lugs thereon insertable in the apertures of the plate 2 in addition to lengths of wire to act as cross-overs are also contemplated. In fact, any medium applicable to the blank for eventual soldered association therewith may be so regarded.

Components of the foregoing description are affixed to the blanks progressively; that is, by stages or steps. This is best illustrated in Fig. 1, wherein a magazine M to contain a stack of blanks B is provided. Operation of a fluid pressure motor 6 removes, by means later to be described, blanks from the magazine and moves them in a linear course in connection with which is a plurality of spaced-apart components affixing stations P, Q, R, etc. at each of which the blank receives one or more components by mechanism to be described hereinafter. The motor 6 operates intermittently and at each operation a blank is ejected from the magazine and passed to the station P. Concurrent with its next operation and following affixing of one or more components to the blank in station P, the first blank is moved to station Q and a second blank is moved from the magazine to station P. In the station P the second blank receives a component of the class applied to the first blank and in a position identical with the position of application of the component to the first blank while concurrently said first blank receives a component at a point thereon spaced from its first received component or components. By a third operation of the motor 6 the first blank is advanced to station R, the second blank is advanced to station Q and a third blank, just removed from the magazine is transferred to the station P. Any number of stations may be employed and in each at least one component is added to the blank at a point thereon spaced from the points where any other component was affixed, to completely or partially equip the blank with a desired number of components.

Frame

Support for the component affixing machine is provided by a frame indicated in its entirety by the reference characters 7 and 14 (Figs. 7 and 8). It is of composite construction since it includes a plurality of structural units 8 rigidly associated with each other. They, too, are of composite structure since each is preferably formed from lengths of structural steel welded together and forming the corners of a parallelepiped, opposed ends of which are bolted to corresponding ends of adjacent units in an arrangement that provides continuous top and front surfaces 9 and 11 respectively. The frame 7 may be supported at a convenient height by any suitable means such as a series of tables, not shown. The frame 7, in turn, affords support for a row of bearer plates 13 (Fig. 18), one of which is fixed to the top 9 at each of the stations P, Q, R, etc., the bearer plates 13 each being for support of a component affixing mechanism described hereinafter.

Support means is provided for the magazine blank supports and transfer means and comprises a frame made from a plurality of brackets 14 (Figs. 7 and 8) each of which is preferably formed from lengths of structural steel welded to each other to provide a triangular-shaped structure having a horizontal top 16 perpendicular to a back 17, the back being secured to the front 11 of the frame 7 (Fig. 18). The brackets 14 are arranged in pairs at each of the stations P, Q, R, etc., and each of the pairs is bridged by a support plate 18 fixed at both ends thereof to the brackets. The spaces between adjacent pairs of stations are also bridged by a pair of circuit board or blank guides or rails 19 and 21 respectively, uniformly spaced from each other. While both of the guides 19 and 21 are rigidly fixed at their respective ends to the brackets 14, the guides 21 are adjustable laterally to accommodate different size board blanks. The guides are secured to the bracket 14 of anchor blocks 22 (Fig. 19) one of which is between both of the ends of the guides 21 and brackets 14. The anchor blocks, which are rigidly fixed to the brackets 14, are of inverted L-shaped cross-section and consequently have extending ledges 23 each of which is provided with a longitudinal slot 24. Each of the guides 21 is clamped in a selected position on the anchor blocks by a stud 26 one of which is threaded in either end of the rail 21, and a nut 27 for the stud engaging the underside of the ledge 23 above the bracket 14. It will now be apparent that besides being secured in spaced relation to each other, by the frame 7, the brackets 14 are further tied together by the rails 19 and 21 and the plates 18.

Magazine

The magazine M includes a pair of rails or guides 28 and 29 (Figs. 9, 11 and 14) in line with the rails 19 and 21. At the right thereof, the rails 28 and 29 are supported by one of the members of a pair of brackets 14, at the station P, to which they are fixed. Their opposite ends are rigidly secured to a bracket 31, identical with one of the brackets 14, and also fixed to the front of the frame 7. The rails 28 and 29 are grooved longitudinally for their length externally of the magazine, with channels or tracks 32 and 33. The rails 28 and 29 are arranged in parallel relation to each other, and the grooves 32 and 33 are arranged to embrace the opposed edges of a blank B while the blank is disposed between the rails 28 and 29.

In greater detail, a blank so supported rests on a lower shoulder or horizontal wall surface 34 (Fig. 11a) of the groove 32 and a shoulder 36 of the groove 33. The grooves 32 and 33 are adjacent the upper side of the rails where they are partly defined by overhanging portions or ledges 37 and 38 respectively. Although the shoulders 34 and 36 are continuous throughout the length of the rails 28 and 29, the ledges 37 and 38 are externally of the magazine and terminate at a bridge or strap 39, spanning the rails to which the bridge is fixed.

Between the rails 28 and 29 and spaced from the bridge 39 by slightly more than the length of one of the blanks B is a supoprt 41 (Fig. 9), which is fixed to the top of bracket 31 spaced from the rails 28 and 29. The support carries a pair of posts 42 which extend upward therefrom as does also the bridge 39, and portions of the rails 28 and 29 intermediate the wall 41 and bridge 39. The posts 42 thus provide a fence structure defining an enclosure for accommodating a stack of blanks B.

The ends of the posts 42 are provided with slanting surfaces 43 which assist in guiding a stack of blanks into the magazine.

The stack of blanks B is supported in the magazine in a position slightly inclined from horizontal. For this to be effected, the leading edge of the lowermost blank, i.e., the edge of the blank nearest the station P, rests on the shoulders 34 and 36 (Figs. 11 and 17) of the rails 28 and 29 while adjacent the trailing portions, said lowermost blank rests on the upper extremities of a pair of elevation adjustment members, which are threaded studs or screws 44 threaded in a bearing portion 46 of the rear support 41. If desired, lock nuts 47, Fig. 13, may be employed for the screw 44 and portion 46 to lock said screws in a selected position above the level of the shoulders 34 and 36. This mode of supporting the blanks assures engagement of the shoulders 34 and 36 by the leading edge of the lowermost blank, even if the blanks are warped as frequently happens.

The purpose of providing for engagement of the leading edge of the bottom blank with the shoulders 34 and 36 is to assure passage of said blank through a gate 48 adjacent the leading edge of said blank. The gate 48 is below the bridge 39 where it will be apparent that the ends of the ledges 37 and 38 of the rails act as stops for precluding passage of the blank next above the lowermost blank from the magazine when force is exerted on said lowermost blank to move it out from under the remaining blanks and into the groves 32 and 33.

Ejector mechanism

Removal of the blanks B from the magazine M is effected by novel ejector mechanism. It transfers the blanks sequentially to the station P and includes a yoke 51 (Fig. 10) connected to the end of a piston rod 52 of the fluid pressure motor 6, which is preferably a pneumatic air cylinder and piston. The motor 6 is supported from the frame 7 by any suitable means, not shown. The yoke 51 is connected to a pair of push rods or ejector dog carriers 54 and 56 respectively, that are arranged to extend between the rails 28 and 29 with which they are in intimate association and so maintained by means including guide plates 57, each of which is secured to the bottom of each of the respective rails. The plates 57 extend from the bracket 31 to the next bracket 14 of station P and project laterally beneath rods 54 and 56, their inner edges having lips 58 for holding the push rods in association with the rails 28 and 29. Additionally, the push rods 54 and 56 are slidable relative to the bracket 31 and the motor support member 59. The push rods 54 and 56 are further confined in engagement with their bearing supports by the support 41, which extends over the tops of the rods.

As has been indicated, the rods 54 and 56 are movable longitudinally by the air cylinder 6. During this operation, the rods carry with them a pair of ejector dogs 62, one of which is carried on each of the rods. Structure and mounting of the dogs is best shown in Figs. 11 to 17. Therein it will be apparent that their width is less than the width of the rods, each of which is formed with a socket or recess 63, in which a dog 62 is pivotally mounted on a pivot pin 64. Spaced from the pin 64, in the recess, is a second pin 66 about which a spring 67 having arms 68 and 69 is coiled to move the dog 62 clockwise about its axis. The upper position of the dog is determined by a stop 70, spaced from the pins referred to, with which the dog normally has engagement. The upper edge of each dog is formed with a blank engaging lug 71. Normally, between operations of the motor 6, the lugs 71 are at the level of the trailing edge of the lowermost magazined blank while it is supported by the studs 44. While in this status, the lugs 71 are also slightly below the level of the trailing edge of the blank next above the lowermost blank. It will therefore be understood that early in a cycle of operation of motor 6 the lugs 71 engage the lowermost blank and move it from the support of the studs 44 and by its accompanying longitudinal displacement relative to the remaining magazined blanks urge the leading end of said lowermost blank into the grooves or tracks 32 and 33. Once the lowermost blank has been thus ejected from the support of the studs 44, however, its trailing end drops to the support of a pair of rear magazine ledges 72 one of which is on both of the rails 28 and 29. The ledges 72 are horizontal, are adjacent the top of the rails and extend from the left end of the magazine for nearly half the length thereof. When the bottom blank is dropped from the support of studs 44, the weight of the blanks depress the dogs 62 against the resistance of springs 67. When the bottom blank is slid far enough to the right for its release from the support of the ledges 72, the weight of the blanks depress the dogs still more. By this time the released blank is safely in the grooves 32 and 33, the ledges 72 having acted as mediums for gradually permitting lowering of the trailing edge, thereby to safeguard against upward tipping of the leading edge if the bottom blank is warped longitudinally thereof. Once the dogs 62 engage its trailing edge the bottom blank is continuously moved to the right until it is in the station P at which time the piston rod 52 has completed its forward stroke. Also once a bottom blank is dislodged from the studs 44 the remaining magazined blanks drop to the support thereof and the one engaged by the studs then assumes the role of lowermost blank and is in readiness to be ejected on the next cycle.

As will be noted, on comparing Figs. 11 and 11a, the dogs 62 are moved to the right of magazine M before their direction of motion is reversed. It is therefore necessary that the lugs 71 be depressed so that they may pass under the bridge 39 during the forward stroke of piston 52. This is effected by a pair of cams 73, Fig. 11, one of which is on the inside of both of the rails 28 and 29. Each of the cams 73 slant downward to horizontal linear dwell portions 74 thereof. The cams are engaged by a pair of followers 75 one of which extends laterally of each of the dogs 62. In order that the followers may have cooperation with the cams, the outer vertical sides of the rails 28 and 29 are formed with slots 76, arcuate of the pins 64, through which the followers extend. On being guided into engagement with the dwells 74, by the inclined portions 73, the lugs 71 are thereby maintained at an elevation at which their cooperation with the trailing edge of a blank is assured as the blank is pushed by the dogs for the remainder of their course along the grooves 32 and 33.

*Station support*

After a blank is removed from the magazine M and transferred to the station P by being slid along the grooves 32 and 33, the blank is supported by other means each identical structurally, in each of the stations P, Q, R, etc. This support includes a pair of movable rail sections 78 and 79, the respective members of which are identical in cross-section intermediate their ends to the rails 28 and 29 to the right of the magazine. They therefore include grooves 81, in their adjacent surfaces, for alignment with the grooves 32 and 33 as shown in Fig. 19.

The sections 78 and 79 are mounted for movement vertically. Means to provide for this includes a guide block 82 fixed to the bottom of the support plate 18. Cross-sectionally the block 82 is U-shaped and therefore formed with a channel 83, throughout its length, parallel with the rail sections 78 and 79. The purpose of the channel is to provide spaced-apart, vertical side walls between which a horizontal beam 84 is confined for vertical movement. The rail sections 78 and 79, on the other hand, are carried by a pair of transverse members 86 which, at points intermediate their ends, are rigidly secured to the ends of the member 84.

For moving the sections 78 and 79 vertically, a second fluid pressure motor 87 is provided (Fig. 1), adjacent the motor 6. It has a piston 88 to which a linkage 89 is connected. The linkage 89 extends throughout the length of the row of stations P, Q, R, etc., and, if desired, may comprise a series of units or operating rods having complementary mortised and tenoned ends pinned to each other. The linkage 89 extends through bearing notches 92 and 93 in a series of vertically extending straps 94 and 95 on the brackets, alternate notches extending from opposite sides of alternate straps to retain the linkage against lateral displacement. The linkage bears, in fixed relation thereto, a rectangular cam plate 96 at each of the stations P, Q, R, etc. Each of the plates 96 extends vertically from the top of the linkage and is formed with a positive motion cam slot 97 extending diagonally of the plate inclined in a vertical direction. Each of the plates 96 is also engaged by bifurcated end portions 98, of a ram 99. A follower 101 carried by the ram passes through the cam slot for cooperation with the cam 97. At its upper end, the ram is formed with a section 102 of reduced diameter thereby providing a shoulder 103 at the base thereof. The section 102 extends through a vertical bore 104 centrally of the beam 84 which rests on the shoulder 103. In this position the beam 82 and ram 98 are secured by a screw 106, passing downward from the top of the beam and into threaded engagement with the section 102.

It will now be apparent that as the linkage 88 is moved longitudinally the cam 97 is carried with it and elevates or lowers the sections 78 and 79 by cooperating with the follower 101. The upward motion of the ram 99 is completed in timed relation to ejection of a blank from the magazine so that the blank is received by the grooves 81 following which the sections 78 and 79 are lowered by operation of the motor 87 during the return stroke of its piston rod 88.

Although movement of the dogs 62, during their forward stroke, is sufficient to shift the support of a blank from the rails 19 and 21 to the rail sections 78 and 79, additional means is provided to stop the ejected blank at a predetermined point in the station P. Similar means is employed in succeeding stations since without this feature inertia acquired by the blank during its transit to the respective stations might result in the blank overshooting its mark when the force for transferring it was suddenly relieved. Accordingly, the rail sections 78, adjacent their ends at the right, are relieved at 107 (Fig. 21) to provide recesses, the formation of each of which is suitable for accommodation of a leaf spring 108 of T-shaped formation. At the base thereof each of the leaf springs 108 is bolted at 109 to the rail 78 below the level of the groove 81. From there the spring is bent forward slightly so that an upper horizontal portion thereof 111 is in the groove and engages the blank when the latter is moved into the grooves 81, with sufficient pressure to bring it to a stop promptly when the dogs have travelled to the end of their stroke. Additionally, the ends of the horizontal portion are bent backward both to provide cam portions 112 and tips capable of striking the bottom of the recesses 107, the cam 112 guiding the blank into pressure engagement with the intermediate part.

As will now be apparent, a blank B is transferred from the magazine to the station P and then moved downward to a lower level, where it receives the components, after which it is returned to the upper level. During their vertical motion and when at their lower level the blanks are secured against edgewise displacement, by an anvil carrier or removable plate 113 superimposed on the plate 18 to which the carrier is fixed. Each of the blanks B is provided with a pair of locator holes 114 and 116, the diameter of which is slightly greater than the diameter of a pair of complementary locator pins 117 and 118 extending upward from the plate 113. The upper ends of the pins 117 and 118 are conical as at 119 so that as a blank, the opposed edges of which are grasped by the rail sections 78 and 79, is lowered, the conical ends 119 engage the blank and move it until the apertures are coaxial with the pins. At the limit of its downward movement the blank rests on one or more anvils 121, Figs. 6 and 22. The anvils are secured to the plate 113 against downward movement. In order that there may be clearance for the up-and-down movement of the rails 78 and 79, the lower portions of their ends are notched at 122, Figs. 19 and 22, opposite notches 123 at the ends of the rails 19 and 21 and notches 124 on the ends of the rails 28 and 29. When the blanks B engage the anvils they are in readiness to receive components.

A blank having been returned to its upper position in any of the stations P, Q, R, etc., it is then moved to the adjacent station concurrent with transfer of a blank from the magazine to the station P. The means by which each of the blanks is transferred includes a pusher member 128. It is fixed to the top of a push rod 129, Figs. 19 and 20, and is formed at the top thereof with a finger 131 extending transversely of the rails 78 and 79 to an integral blank contactor 132 extending downward to the level of the groove 81. The rod 129 on the other hand, is pinned to the cross-head 51, Fig. 10, and the pusher 128 so located on the rod that during a forward stroke of the piston 52 the trailing edge of the blank in the grooves 81 is engaged by the finger 132 which slides the blank out of engagement with the grooves 81 and into corresponding grooves 133, Fig. 22a, in the intermediate sections 19 and 21 and thence into grooves 81 of rail sections in the station Q, Fig. 19. The rod 129 extends throughout the length of the row of stations P, Q, R, etc. and at each of the stations the rod is equipped with a pusher 128 so that concurrent with removal of a blank from the station P, the blanks in each of the following stations are advanced to the next adjacent stations. Then by means similar to the means already described in connection with station P, the blanks are lowered for each to receive one or more components. While in their lowered position the return stroke of the rod 129 takes place and this is possible without interference with the blanks since when the blanks are at their lower position the pushers 128 may pass freely above the sections 78 and 79.

Concurrent with the backward stroke of the push rod 129, the dogs 62 are, of course, carried backward. During this operation the dogs are depressed in order that the lugs 71 may be carried at a level in which they avoid interference with the bottom magazined blank. Means to cause this is as follows: The rails 28 and 29 are formed with horizontal grooves or base cams 134, below the cams 74, in which the followers 75 may be received. Between the grooves 134 and dwells 74 are pads 136 which extend from the left hand extremities of the rails 28 and 29 to the right thereof where they terminate in extremities 137 spaced from the adjacent extremities of the rails. When a blank has been received by the grooves 81 of the sections 78 and 79 and the dogs are pausing intermediate their forward and backward strokes, the dogs 62 are pressed downward due to pressure engagement by a blank B in the grooves 81 when the blank is moved downward at station P. This movement of the dogs carries the followers 75 past the extremities 137 to the level of the grooves 134. Then when the rods 54 and 56 begin their return stroke the followers 75 enter the grooves 134 which retain the dogs against force of the springs 67 until the followers are released at the left hand ends of the grooves 134. During their transit, throughout the length of the grooves 134, the dogs 62 are thus maintained at a level below the magazined blanks.

*Mechanism for affixing components*

One or more component affixing units is supported at each of the stations P, Q, R, etc. The support or mounting is indicated in its entirety, Fig. 20, by the reference character 139 and includes a split sleeve 141 fixed to the upper edge of a rectangular, vertical web 142, the lower edge of which is fixed to a base plate 143. The mounting unit 139 is releasably anchored to one of the plates 13 by bolts 146. After passing through holes, not shown, in the plate 143 the bolts may also extend through an H-shaped aperture 144 in the plate 13. Due to the configuration of the aperture 144 the bolts may hold the unit 139 in a wide variety of points thereon and thus a component attaching unit may be secured in an operative relation to a blank. A shaft 148 is keyed in the sleeve 141 being longitudinally adjustable therein and capable of being clamped to the sleeve by the pinching action effected by a plurality of screws 149, threaded in said sleeve above the shaft and pulling the portion of the sleeve into close engagement with the shaft. A coupling 151 is secured to the forward end of the shaft 148 and carries a vertical pivot shaft 152. A pair of unit supports 153 are supported in spaced relation on the shaft 152, and are arranged to support a component affixing unit 156, being indicated by dot-dashed lines in Fig. 20 and in full lines in Fig. 23. The unit may be swung about the pivot 152 and fixed in any selected position thereabout by set screws, not shown, threaded in the bearings and having clamping engagement with the shaft.

A component which the unit 156 is adapted to secure to the blank B, may be of the variety such as a resistor or a condensor which has a cylindrical body 157 from either end of which wires 159 extend. Such leads are usually longer than necessary for operative association with the blank. Therefore the leads are first sheared off to reduce them to the uniform and desired lengths and next they are bent downward normal to the axis of the body 157 to provide portions 161 for insertion in pairs of holes 4 in the blank B. The holes 4 in the blank are above dished surfaces of die portions 162 in the tops of the anvils 121 so that as the portions 161 are forced downward through the holes 4 by operation of the unit 156 their lower ends, due to the shape of the cavity in the die, are bent outwardly laterally and then clinched under the lower surface of the blank into engagement with conductors 3 which are normally spaced from each other.

The apparatus by which the foregoing operations are performed include a base support plate or bed 154, formed with a longitudinal channel or way 163 throughout the length of said plate; a pair of confining plates 164 which are fixed to the plate 154 and extend over opposite edges of the channel 163 to provide a vertically extending slot of T-shaped cross-section. The plates 164 retain a shearing and bending slide 166 in the slot, the slide being complementary in formation to that of the slot in which said slide has longitudinal movement. The slide 166, in turn, has a channel 167 in which is slidably mounted a ram or plunger 168, which acts as a stripper and driver, of cross-section complementary to that of the channel 167. The ram is provided with ridges of fins 169, on opposed sides thereof which mesh with corresponding grooves 171 on opposite sides of the channel 167, and may be moved longitudinally in the channel.

The ram is moved by connection to an air cylinder and carries with it by a clutch the slide, relative movement between the two being effected when the slide meets with a predetermined resistance.

The slide 166 and ram 168 are moved vertically by fluid pressure means such as a pneumatic motor 170 above the channel 163 where the motor is supported by a bracket 172, Fig. 20, on the upper end of the plate 154.

The motor 170 has a piston rod 173 which extends downward and is adjustably connected to the ram 168. This is carried into effect by an adjustable linkage 174 including lower bifurcated member 176 embracing the upper end of the ram 168 to which the linkage is pinned at 175. Between the upper end of the linkage member 176 and piston rod 173 is a rotary adjustment comprising a disc 177 having upper and lower coaxial screws 178 and 179, one of which has a right hand thread and the other a left hand thread, the one being threaded in the upper end of the member 176 and the other is threaded in the piston rod 173, to move the piston and ram toward or away from each other when the disc 177 is turned. If desired, the periphery of the disc 177 may be formed with holes 181 therein adapted to receive a rod or lever by which the disc may be turned. The component leads 159 are trimmed to uniform, predetermined lengths at a position between that of the anvil plate 113 and lower end of housing plate 154. For this to be effected, the lower extremity of the slide 166 is provided with a pair of spaced jaws 188 their ends being square relative to its vertical sides and formed with outer sharp corners 182. The latter performs the function of shearing die portions or movable jaws when they cooperate, as they do, with fixed jaws or dies 183 at the upper and inner edges of a pair of die plates 184 fixed to both of the ends of a pair of arms 186 of a horizontally U-shaped die bracket 187, in turn, rigidly secured to the lower end of the plate 154. A component delivered to the jaws, by mechanism later to be described, is supported by the leads resting on the jaws 183 and the body 157 thereof being intermediate and spaced between the jaws. When the upper jaws pass the lower jaws both of the leads are concurrently severed by the shearing action of the jaws.

Provision is made for discharge of the ends clipped of the components in such a manner that they do not accumulate under the stations or fall upon the boards and interfere with the operation of the machine. To this end discharge chutes are provided into which the clipped ends fall and whereby they are discharged by gravity to a point beyond the side of the conveyor rails.

As illustrated in Fig. 31, the chutes may be made of plastic or sheet metal material and include channel shaped members 189 which extend outwardly and incline downwardly. For the head which has its magazine facing in the longitudinal direction of the rails, the chute is provided with a notched mid portion 190 which enables it to extend in close proximity to the base and magazine. At one side the head has secured to or integral with it, a boss 191 which may extend between the outermost plates 193 by a pin or bolts which extend through apertures 191b (Fig. 30) in the plates 193 and holes 191a in the boss 191. As can be seen the chutes are sufficiently long to extend beyond the rails whereby the ends are discharged at points where they do not interfere with the apparatus.

Where the head faces in the other direction, 90 degrees rotated from the first head shown in Fig. 31, a single chute will suffice and comprises the channel member 189c, being a boss or block 191 and a similar notch in one end for engagement with the head.

It will be appreciated that these chutes may vary as to form and are merely shown as one manner in which the clipped ends may be directed away from the head and conveyor.

Magazine means is accordingly provided to supply a replacement component to the jaws 183 after each of the downward strokes of the jaws 182. This is effected by arranging the components in a row extending in a nearly vertical position so that the components may move by gravity to the jaws. For containing the rows of components, an elongated cage structure is provided. It is of rectangular internal cross-section to freely accommodate the bodies of the components and is formed with diametrically opposed slots, of width less than the diameter of a component's body 157, on either side of the structure through which the leads extend. While in the structure, the bodies 157 are precluded from axial displacement by the slotted walls adjacent their ends. At the same time the components are precluded from displacement in a direction transversely of the cage structure by the confining operation of the edges of the slots on the leads of the bodies.

Figs. 23 and 30 illustrate a magazine which includes a pair of uniformly spaced-apart inner elongated plates 192 in coplanar relation to an outer pair of elongated plates 193. The plates 192 are spaced from each other by slightly more than the length of a component body 158 by a filler block 194, downwardly thereof, in addition to studs 196 while the members of the pair 193 are spaced by similar blocks and studs 197. At one side thereof, the pairs of plates 191 and 192 are bridged by upper and lower U-shaped members 198 and 199 fixed to the plates and uniformly spacing them from each other by a distance less than the diameter of a component body 159 thereby providing slots 201 through which the leads 159 may extend through while the bodies are supported between the plates. Means for supporting the components against lateral downward displacement thereof within the magazine will be indicated hereinafter.

As will be noted, on comparing Figs. 23, 24 and 30, the component magazine is capable of occupying at least two positions. This is due to its support which involves a horizontal pivot pin 202 fixed in a lug 203 on the bracket 172, the portion of the pin on either side of the lug being journalled in the plates 192. The filler 194 bears a cam plate 204 having therein a cam slot 206 in which is slidably received a follower pin 207, rigidly secured to the slide 166 by a follower carrier 208 having arms through which the pin 207 passes and between which the plate 204 extends. At their lower ends, the magazine plates 192 and 193 curve toward the course of the slide 166 to provide lower horns 209 and upper horns 211. The cam 206 is so arranged that normally when the follower 207 is at the upper end of the cam the lower end of the magazine extends between the courses of the jaws 188. When in this position the components contained in the magazine slide downward, and then laterally following the curvature of the magazine until the body of the end component, engages a stop 212, carried by the base plate 154, resisting displacement of the component from the magazine 191 and positioning its leads over the jaws 183.

The components are inserted, in horizontal position, into the upper end of the magazine into the slot 201 through a V-shaped end as at 213.

The jaws 182 descend past the jaws 183 by straddling the stop 212. In this operation, both leads 159 resting on the lower jaws are severed, the remaining portions being of uniform length from the body 158. Also as the movable jaws move downward they carry with them the follower 207 with the result that the magazine 191 is swung about the pivot pin 202 with consequent movement of the horns 209 and 211 away from the housing plate 154 in order that the ram may have clearance for its downward movement in sequence later to be indicated. Therefore, mechanism is provided to preclude loss of components from the lower end of the magazine when the lower end is moved away from the base plate 154 and includes cam surfaces 214 on the front of the jaws 188, which slope upward and outward and therefore engage the leads of the components next to the end component which has just had its leads severed. Following initial engagement of the leads by the cams 214 their downward bodily movement and shifting points of engagement with the leads to higher points on the cams is coordinated with the outward movement of the horns to maintain the components in the magazine 191 without exerting undue pressure thereon.

A slightly different means for preventing the loss of the components from the magazine is shown in Figs. 29 and 30, and comprises a plate 217 secured to the slide by screws 217' and having a downwardly extending and inwardly curved tongue 216 which is adapted to engage with the bodies of the components 158 and hold them against loss. The curved end 218 is arranged to engage the components and hold them in the magazine, the extremity being provided with a lip 219 which enters in between the component in the jaws and the components in the magazine.

As previously stated, the plunger or ram 168 is connected to the piston and moved thereby and it, in turn, is positively connected to the slide by a ball and detent coupling to move the slide. The slide and ram may have relative movement to each other when the slide meets with a predetermined resistance as it does in the downward course of its travel, at which time the slide is locked, to the base 154.

As illustrated in Fig. 27 the slide 166 is provided with a bore having a bushing 222 which carries a ball 221. The recess is such that the ball cannot move laterally of the recess. The ball rests against the base plate 154 in the bottom of the channel. The ram 168 is provided with a detent 223 engaging the ball opposite to its point of engagement with the channel bottom. Under these conditions the ball acts as a lock between the ram and the slide and movement of the ram is positively transmitted to the slide. This operation continues until a vertical contact screw 224, threaded in the follower carrier 208 carried by the slide engages a stop 226 fixed to one of the plates 164 on the base. When this occurs, the ball 221 has been moved to a point opposite a bore 227 in the bottom of the channel 163 in the base. The bore 227 opens into a counterbore 228 which contains a hardened ring. The plunger 229, which is formed with a neck 231 of reduced diameter, is freely received in the bore 227 and is biased by a compression spring 232 toward the opening in the bottom of the channel. The ball 221 is then unseated from the detent 223 owing to the camming action, moving into the ring and bore 227 against the pressure of the plunger 229 moving the plunger backward against the resistance of spring 232. This permits the ram to continue downward independently of the slide which is retained at a predetermined level by the adjustment of the screw 224. At the same time since the ball now protrudes into the bore 227 in the base 154 and cannot move outward, the slide is locked to the base.

Immediately after and while the leads 159 are trimmed by the outer edges of the jaws the component so treated is supported by the horns 209. Continued downward movement of the jaws causes the jaws 182 to descend past the upper sustaining surfaces of the horns 209 by straddling the same. In doing so the bottoms of the jaws 182 engage the remaining ends of the leads and bend them downward about the opposed upper edges of the horns. During this operation the leads 159 are engaged by the jaws 182 at points thereon at the bottom of the grooves 171 and the bent portions 233 are confined in the lower portions of the grooves 171 when the arm portions are formed. This having been effected, the horns are withdrawn from the support of the leads.

As was previously stated, the blank B is formed with pairs of holes 4 therein, one of which is over each of the dies 162 of the anvils 121 when the blank is disposed on the pins 117. In this position the holes 4 are directly under the grooves 171 for receiving the lead portions 233 when the lower ends of the jaws 182 are carried into intimate association with the blank. Accordingly, the lower end of the ram 168, Fig. 32, is bifurcated to provide fingers 234 on either side of the base of the ram to straddle the body 157 and to engage the remaining axial portions of the leads 159 by pressing them downward strip the portions 233 from the grooves 171 and then force said portions against the dies 162 after they have been passed through the holes 4. The latter operation, of course, takes place as the ram is moved into close proximity to the blank B. In the final stages of their downward stroke the fingers 234 drive the portions against the dies 162 which cam and deflect them laterally and clinch them to the lower surface of the blank B against the conductors 3.

The component having been fixed to the blank and the end stroke of the ram completed the motor 170 is reversed. This raises the piston and pulls up the ram, the slide being locked to the base remains in its downward position until the ram reaches the point where the ball may be forced into the detent. At this time an abutment 235 on the ram strikes the underside of the carrier 208 on the slide, which relieves the impact on the ball and detent, and the ram then retracts the slide. It should be noted that when the detent arrives opposite the plunger 229 that the ball is pressed out of the bore 227 and therefore the slide is unlocked from the base and at the same time the ball goes into the detent 223 locking the slide and ram together.

The slide and ram are then raised as a unit, the cam surfaces are withdrawn from the horn and the horn moves inwardly positioning another component for subsequent attachment on the next cycle.

As previously described, the component having been attached to the blank, the blank is raised and transported to the next station where one or more other components are attached.

*Support for general component affixing units*

Although the mounting 139 illustrates a support of a single unit a plurality of units, similarly mounted, may be used at any of the stations P, Q, R, etc., if the space between pairs of the holes 4 is sufficient to permit stationing of a unit over each of the pairs without interference between the units. When this is possible, the units are supported by mounting resembling the mounting 139 with the exception that the vertical members thereof, corresponding to the member 142, are positioned near one of the edges of their bases, the bases being plates corresponding to the plates 143. This enables the bases to be anchored to the supports 13 in an arrangement wherein the vertical plates are in close relation to each other than when the vertical members are centrally of their bases. When so grouped, each of the component affixing units is, of course, operated by its own motor 171, although both of the motors may operate simultaneously.

It is also contemplated that two or more units may be operated by a single motor. Such mechanism involves a mounting 236, Fig. 20, upon which the units are carried and means by which the movable parts of the units are coupled to the motor. The mounting 236 includes a vertical L-shaped plate 237, one edge of which is fixed to a base plate 238 while the remaining end 239 is in a vertical plane. As in the previously described mounting, the mounting 236 is bolted to one of the base plates 13 in a selected position thereon.

Both of the sides of the plate 237 afford surfaces to which units 156 may be removably fixed in selected positions. For this, the opposed sides of plate 237 are formed with ribs 241 extending horizontally from the end 239. The ribs 241 are vertically spaced from each other to a degree equal to the spacing between pairs of keyways on the backs of the housing plates 154, so that each of the units may be moved in a predetermined course, horizontally of the mountings 236, to selected points where they may be clamped to the plate 237 by screws, extending through slots 244 intermediate the keyways 241 and threaded in the base plates 154. This construction provides for positional adjustment of the units.

Positional adjustment of the units, perpendicular to the sides of the plate 237 in varying degrees is also contemplated and provided by brackets, provided by lengths of channel irons 245 of L-shaped cross-section. They, too, have cooperating keyways. The brackets 245 additionally have slots 249, intermediate their keyways, to receive bolts 251 by which they are both clamped to the plate 237 and the units.

A unit 156 may also be fixed to the end 239 of the plate 237 this plate being provided with a bracket plate 252.

In addition, a double angle bracket 240 may be received on the side opposite to the bracket 246 for the support of a third attaching unit.

Although the mounting 236 has been described as a support for the unit 156, other units may also be supported thereby. And the units carried by the mounting 236 may differ one from another in their capacity for applying components differing in character to a blank. For an example, one of the units, supported by the mounting may apply condensers, another resistors, and still another cross-overs to the blank B during one operation of the motor 170.

For it to operate two or more units, the motor 170 is fixed to the top of a horizontal yoke 253 supported above the level of the brackets 172 of the units 156 by vertical support rods 254, the ends of which are fixed to the yoke and brackets. Between the yoke 253 and brackets is a crosshead 256 to which the piston 173 is coupled and to which connecting rods 255 are rigidly coupled at points spaced from the junction between the piston and crosshead to operate the rams through the rotary adjustment discs 177 threaded in the rods 255 and rams 168.

*Provision for affixing peaking coils to a blank*

Peaking coils 257 may be applied to blanks B by a component affixing unit 258 of the character indicated fragmentarily in Figs. 33 to 36 inclusive. The unit 258 is so illustrated because the difference between its structure and that of the unit 156 is dimensional only to accommodate the formation of the coils. One of the latter 257 includes a coil body 259 through which extends a cylindrical support 261 having end leads 262. The coils 257 are delivered to a pair of lower jaws 183, on which the leads 262 rest, by magazine members including lower horn portions 209 and cooperating upper horns 211. Upper movable jaws 188 trim the leads to predetermined lengths by movement downward past the fixed jaws after which the trimmed leads rest on the horns 209 for support of the coil 257 until the leads are bent downward over said horns 209, to provide vertical portions 265. The bending of the leads is effected by downward motion of the jaws 188. The bent ends of the leads disposed in the grooves for the ram in the same manner as described for the resistor attaching component and are eventually diverted into holes 4 in the blank B by downward operation of the ram 266. Upon passing through the holes 4, the downwardly struck end portions are intercepted by the dies 271 below the blank B, and thereby deflected and bent into clinched relation to the bottom of the blank. The periphery of the coil 259 may engage the top face thereof.

*Cross-over affixing mechanism*

Where electrical connections must be established between a pair of first and second conductors on the bottom of the blank and the two conductors are disposed on opposite sides of a third conductor, this being known as a "cross-over," said first and second conductors may be connected to each other by a wire cross-over applied to the top of the blank and the ends thereof bent downward to pass through pairs of holes, in the blank, leading to the first and second conductors and which ends are then bent over into electrical contact therewith. This operation is performed by a component affixing unit best shown in Figs. 37 to 50 inclusive and indicated in its entirety by the reference character 272. It is arranged to intermittently draw a wire W from any source of supply, such as a spool 273, sever the wire to a predetermined length and manipulate it as indicated. The spool may be supported remotely of the unit 272 by any suitable means not shown. From the spool the wire is directed to the unit 272 by being conveyed through a tube 274 formed with downward bent end portions 275 and 276 intermediate of which the tube is fixed to the upper end of an upright member 277 indirectly supported from the unit 272.

The unit 272 resembles the previously described component affixing unit with respect to a base plate 278, slide 279, ram 280, motor-operated piston rod 281, guide 282 and an adjustable coupling 283. Also employed is a ball clutch, including a ball 284 thereof (Fig. 38), similar to the one shown in detail (Figs. 27 and 28), providing a similar driving relationship between the ram 280 and slider 279. The slider is of a composite construction and comprises a slider base plate 286 Fig. 43 confined for vertical operation in a longitudinal channel 285 of the main base plate 278, by a pair of vertical confining plates 293 and 294 fixed to the front of the plate 278 in overlapping relation to the edges of the plate 286. The front of slider base 286 has a pair of laterally spaced track plates 287 both of which are formed with grooves 288, on their adjacent sides, in which is received a pair of fins 289 on opposed edges of the ram 280. Finally the ram is coupled to the piston rod 281 by the adjustable coupling 283.

While the structure of plate 293 is similar to the plate 164, the plate 294 is formed with a lateral extension 296 which provides a support for a wire advancing mechanism support plate 297, and on the reverse side a pivot plate 298 for the wire advancing mechanism operating lever. The plate 297 is bolted to the extension 296 and hence is capable of occupying but one position relative to the base plate. The pivot plate is secured to the extension and its position may be adjusted horizontally relative to the plate 294, being provided with a dove-tail connection 299 and 301 to the plate 296. A pair of screws 302 threaded in the plate 294 also pass freely through a horizontal slot 303 in the pivot plate and are threaded into the plate 296. The plate 298 may therefore be moved horizontally with limits governed by the length of the slot 303. The edges of slot 303 are countersunk as at 307 to accommodate the heads of the screws 302 below the surface of the plate 298 to prevent interference with a wire advancing lever 304 pivoted at 306 on the plate 298.

A lost motion coupling 300 is employed for communicating vertical motion of the slider 279 to the wire advancing lever 304. The coupling 300 includes a vertically movable member 308 confined between the slider 279 and an anchor member 311 secured to the left side of the slider by a pair of spaced-apart screws 312, threaded in said slider. The member 308 is formed with a longitudinal slot 309 in which an elongated boss 305, Fig. 44, on the back of the anchor member 311 is disposed. The lever 304 extends in front of the member 308 and is formed with a slot 313 which engages a bolt 314 carried by the member 308. The lower end of the member 308 has an adjustable strop screw 316, threaded therein, and extending upward in the slot 309 so that as the slider moves downward, carrying the anchor member with it, the boss 305 engages the upper end of the screw 316 after which the member 308 is carried downward with the slider to swing lever 304 counterclockwise about its axis 306.

From the tube portion 276, the course of the wire W is downward through a wire advancing mechanism 317. The mechanism 317 comprises a feeder casing 318 fixed to the plate 297 at the outer vertical edge. Throughout its length the casing 318 is of U-shaped transverse cross-section thereby providing a central, longitudinal channel 319 between a pair of flanges 321 and 322, Fig. 46, which are normal to the plate 297. The mechanism 317 also includes a wire guide 323, in the upper end, a wire retainer 324 in the lower end and a wire feeder 326 centrally of the channel 319.

Fixed in the channel 319, the wire guide comprises a guide block of L-shaped horizontal cross-section, having a flange 328. A cover plate 331 to cover a vertical groove 332, at the junction of the flange 328 with the base for the wire W to pass freely through and be thereby directed to the wire feeder 326.

The wire retainer 324, Fig. 48, includes a block 333 also of L-shaped horizontal cross-section so as to include a vertical flange portion 334 and base portion 336 bolted to the bottom of channel 319. The junction of the base 336 and flange 334 form a groove 337, Fig. 48. The base is provided with a recess having pads 338 and 341, Fig. 45, on opposite ends and intersecting the groove to provide upper and lower grooves. A wire retainer lever 344 is arranged to rock about a pin 346 supported by the base and held in the recess by a cover plate 342. The lever is biased counterclockwise about its pivot by a torsion spring 347, coiled about a pin 346, Fig. 41, and terminating in a pair of arms 347' one of which has a hook engaging the lever to urge it counterclockwise about its axis, the other arm being in engagement with the edge of the pad 338. The purpose of the lever is to hold the wire against upward forces yet permit it to be passed downward when needed. The lever 344 has a cam 348, on the inner end which engages the wire. The cam curves from a point nearest the axis of the lever, at the upper edge thereof, to a point farthest from the axis, adjacent the lower edge of the lever. The wire is therefore wedged between the cam 348 and flange 334. And the wedging action is augmented whenever force is applied to the wire above the lever in a direction tending to move the wire upward. When, however, force is applied to the wire to move it downward, friction between the cam and wire tends to swing the high part of the cam away from the wire thereby loosening it from its grip by the cam so that it may be moved past the cam. In case it is desired to remove the wire from the wire manipulating mechanism 317, the lever 344 extends outwardly of the casing 318 and terminates in a free end or handle 349. By lifting the handle 349 manually against resistance of the spring 347 the pressure of cam 348 on the wire is relieved so that it can be readily drawn upward.

The wire feeder 326 comprises a rectangular block 351, L-shaped in cross-section, having a base portion 352 and a side flange 353. The block 351 is slidably anchored in the channel 319 by a screw 354 which is threaded in the base 352 the shank of the screw extending through a slot 356 which slot extends longitudinally of the channel. A head 357 on the screw overlies the bottom of a relieved region 358 in the back of the base 352 adjacent the edges of the slot. On the front of the base 352 is an upper pad 359, separated from the flange 353 by a groove 362, and a lower pad 363, separated from the flange by a groove 364, directly below the groove 362. The grooves 362 and 364 are formed to receive the wire W which is confined for longitudinal movement therein by a cover plate 366 bolted to the pads 359 and 363. The pads are also spaced vertically from each other to provide space for operation of a feeder finger or lever 367 which is disposed between the cover plate 366 and back portion 352 in both of which the ends of a pin 368 are supported to provide a pivot for the finger 367. When the lever 304 is rocked, it moves the finger 367 about its pivot 368 through a link 369 the ends of which are pivotally coupled at 371 to the lever 304 and to the finger at 372.

Normally, the wire feeder 326 occupies an upper position in engagement with the wire guide 323. This position is maintained by a tension spring 373 anchored to a screw in a recess 374 in the upper guide block 323 and in a lower bore 376 in the intermediate block 351. By extending the bore downward for nearly the full length of the block a longer spring may be used and the feeder may be moved into contact with the wire guide, the spring collapsing inside the bore. The finger 367 is also formed with a cam 377 on its free end, to the right of pivot 368. The rotation of the finger 367 counterclockwise carries the cam 377 into pressure engagement with the wire W to press it against the flange 353 with sufficient force to cause downward movement of the feeder 326 against the resistance of spring 373, as the lever 304 is rocked clockwise. In the course of this operation, the wire is moved downward and is pushed past the cam 348 of the wire retainer 324. When the lever 304 is swung counterclockwise about its pivot, the pressure on the cam 348 on the wire is relieved, the feeder 326 is drawn upward by the spring 373. And, as previously indicated, the wire is held by the wire retainer 324 against backward motion in an upward direction as the feeder is moved upward.

From the retainer 324 the wire is directed downward and then laterally by a wire conveyor 378 fixed at its upper end to the casing 318 while its lower end is fixed to a feeder block 379 on the lower end of the housing plate 278. In detail, the conveyor 378 comprises an arcuate member 381 of rectangular cross-section having a wire groove 382, in its concave surface. The groove 382 extends from the groove 337 in the retainer 324 to a horizontal bore 383 in the block 379. The groove 382 is closed by an arcuate cover plate 384 fixed to the member 381. As the wire is advanced intermittently it is passed across a gap 386, Fig. 37 between the block 379 and a stop block 387 fixed to the lower end of the housing base 278.

That portion of the wire W which extends across the gap 386 is severed as the slide moves downward. This is by a shearing action between the lower corner 385, of the slide 279 and an edge of the bore 383 to provide a wire blank W1, of predetermined length. During this operation, the wire W, between the blocks, is engaged by a retractable wire support 388. It comprises lever 389, Fig. 40, within a recess 391, Fig. 39, in the housing plate 278. The lever is pivotally supported on a pin 392 transversely of the plate 278. At its upper end, the lever 389 is bifurcated to provide a pair of follower arms 393 having cam contacting follower portions 394 on the fronts thereof for cooperation with cams 407 on the back of the slider 279. When the slider is in its uppermost position, Fig. 39, the space between the slider 279 and bottom of recess 391 is spanned by the parts 394 of the arms 393. The lever 389 at this time is held against rotation about the pin 392. At this time a foot portion 396 on the lower end of the lever extends forward to the wire W and is formed with a transverse groove 397 at the tip thereof for engaging said wire. To confine the wire in the groove 397, a spring retainer 398 is provided. It is of T-shaped formation thus having a horizontal upper portion 399, the ends of which are anchored to the plates 293 and 294 and a vertical or lever-engageable portion 401 extending downward from the portion 399, intermediate the ends thereof. The portion 401 also extends backward to engage the lever 389 at the groove 397. Also, the spring portion 401 owing to its formation, is deflected forward by the lever. Therefore, pressure being exerted on the lever at the outer side of the groove 397 by the portion 401, lateral displacement of the wire from the groove is precluded.

The wire blank W1 is deformed by cooperation between the slider 279 and the foot 396 during downward movement of the slider. For this operation, the lower end of the slider base 286 is bifurcated to provide a pair of tongues 402, spaced to straddle the foot 398 as the slides are moved downward. Also the track plates 287 continue downward at least as far as the tongues 402 and are also spaced from each other to straddle the shoe 396. In the course of their downward movement, the plates therefore engage the ends of the wire and bend them to form the blank W1 to an inverted U-shaped blank having downward portions W$b$. In this operation the portions Wb are received in the grooves 288 and are retained therein both by friction and slight resiliency of the portions Wb tending to urge the ends against the bottoms of the grooves until they are stripped therefrom by the operation of the ram 280. In the grooves the blank is in readiness to be inserted in a pair of the holes 4 in the blank B, since the grooves 288 are positioned directly in line with the holes 4.

But before the blank W11 may be ejected from the grooves 288, however, the ram 280 must clear the foot 396. Therefore the backs of each of the arms 393 are formed with a socket 404 in which is received a compression spring 406 confined therein by the bottom wall of the channel 391. The springs 406 therefore bias the lever 389 counterclockwise about its axis. Also, the back of the slide 279 is formed with a pair of vertical cam grooves 407 therein into which the followers 394 are swung by the springs when the slide advances downward. Concurrent with entry of the followers 394 into the grooves 407 the foot 396 is swung counterclockwise toward the bottom of channel 391, by the springs, sufficiently to be out of the course of the ram 280. Although removal of the shoe 396 from pressure engagement with the spring 401 allows the lever end of the spring to move toward the plate 281, the spring is cammed outward by the ram 287 in the course of its motion downward. The arms Wb of the blank having been passed through the holes 4 in the blank B, by the operation of the ram, they are deflected laterally and then upward by dies 408 as were the leads 159 previously described. The ball 284 is displaced from its driving cooperation with the slide and ram at substantially the same time that a lower, horizontal arm 411 of a Z-shaped contactor 412 engage a stop 413 fixed to the plate 294. This interrupts the downward movement of the slide and thereafter permits the ram to move downward for the remainder of its stroke independently of the slide.

On the up or return stroke of the ram 280 a striker block 414, on the front thereof is arranged to be carried into engagement with an upper horizontal arm 416 of the contractor 412, the arm 416 extending in front of the ram. The ensuing and continuous motion of the block 414 then carries the arm 412 before it, along with the slider which is restored to clutch coupled relation to the ram as the arm 411 is carried out of engagement with the abutment 413 as was described in the previous embodiment. Also during the upward movement of the slider 291 the lever 304 is rocked clockwise about its pivot 306. And this is because a vertical lift screw 417, threaded in a lug 418 on the member 308, toward the top thereof, is engaged by a striker 419 on the upper end of the member 311, and, as previously indicated, rocking of lever 304 clockwise feeds the wire W downward and into the passageway provided by the groove 397 and spring arm 401.

As will now be apparent, the length of wire withdrawn from its supply may be varied by varying the swing or position of arc swing through the lever 304. This is effected by varying the vertical positions of the screws 417 and/or screw 316.

*Socket affixing mechanism*

Another component affixing unit for affixing vacuum tube sockets 427 to the blanks B, each of the sockets comprising a body or base 428, of dielectric material, from the lower side of which a series of terminal lugs 429 extend downward on an arc at the periphery of the body is provided. The body 428 of the socket is formed with a pair of parallel opposed grooves 431 extending longitudinally of the base at the periphery thereof.

The unit 426, Fig. 51, comprises a housing plate or base 432 supported by one of the mountings 139. The unit also includes a bracket 433 fixed to the top of housing plate 432 for support of a motor 434 having a piston rod 436 coupled to a ram 437 by the adjustable coupling 438. An intermittent clutch-coupled relationship between the ram and a slider 439 is provided by clutch mechanism 441, Fig. 55. All the elements of the unit, thus far enumerated, correspond to elements of the units previously described in detail.

A magazine 442 is provided in which a supply of the tube sockets 427 may be contained and intermittently fed to other mechanism of the unit arranged to apply them to the blanks B. The bracket 433 has a pair of spaced lugs 443 on the frame to receive a cam plate 444 of the magazine 442. The lugs 443 engage the upper end of the plate 444 and support it from a horizontal pivot pin 446 extending through the lugs and cam plate so that the plane of the cam plate is normal to the plane of the housing plate 432. The plate 444 has an outer, straight vertical edge 447, Fig. 55, which merges with a lower arcuate edge 448. Intimately associated with and throughout at least the length of the edges 447 and 448 is an inner guide bar 449 from which in uniformly spaced relation is an outer guide bar 451. The bars are spaced from each by an upper bridge 452, adjacent their upper ends, which is fixed thereto and to the plate 444 while adjacent their lower curved end portions a lower bridge 453 is fixed to the bars and to the plate 444. Additionally an intermediate bridge 454 is fixed to the bars to rigidly secure them together. A space 456 is thus provided, between the bars, for accommodating a series of the sockets 427. When the sockets are disposed in the space 456 between the guide rods, diametrically opposite lugs 429 of each of the sockets extend into a channel 457 in the inner edge of the outer guide bar 451. By this feature and the fact that the space 456 is but little wider than is necessary to permit the sockets to slide around the curved portions of the space 456, the sockets are operatively restrained from tipping while in the magazine. The rods 449 and 451 extend upward to points above the level of the plate 444 where they terminate in free ends between which the sockets are loaded into the magazine by inserting them sideways into the space 456. Therefrom the sockets slide downward by gravity, their weight being adequate to urge the successive lowermost sockets from the space 456 except when gate mechanism, later to be described, is operated. In the course of their downward movement, the sockets 427 clear the bridge members 452, 454 and 453 since these members are each slightly U-shaped as shown in Fig. 53.

For regulating the downward flow of the sockets 427, a gate mechanism is employed. It comprises a substantially vertical bar 458, Fig. 55, formed with longitudinally spaced slots 459 therein in each of which is received a headed pin 461 carried by the plate 444. The length of the bar 458 is sufficient for its lower end 462, of wedge shaped formation, to extend transversely of the arcuate portion of the course of the magazined sockets 427. Toward this position the bar 458 is biased by a tension spring 463 anchored to the lower end of the pins 461 and a pin 464 on the bar 458 at a point between the slots 459. Normally; that is, when the ram 437 is in its uppermost position, the bar 458 is out of the course of the magazined sockets. This position is maintained, against the resistance of the spring 463, by an arm 466, fixed to the front of the ram 437 and an arm 467 extending laterally of the arm 458 over and in engagement with the arm 466. When the ram descends from its normal position and support of arm 466 consequently is removed, gravity and the spring 463 slides the rod 458 downward over the pins 461 as far as the slots 459 permit to resist movement of the sockets 427 from the left of the bar 458 (Fig. 55).

Figure 59:
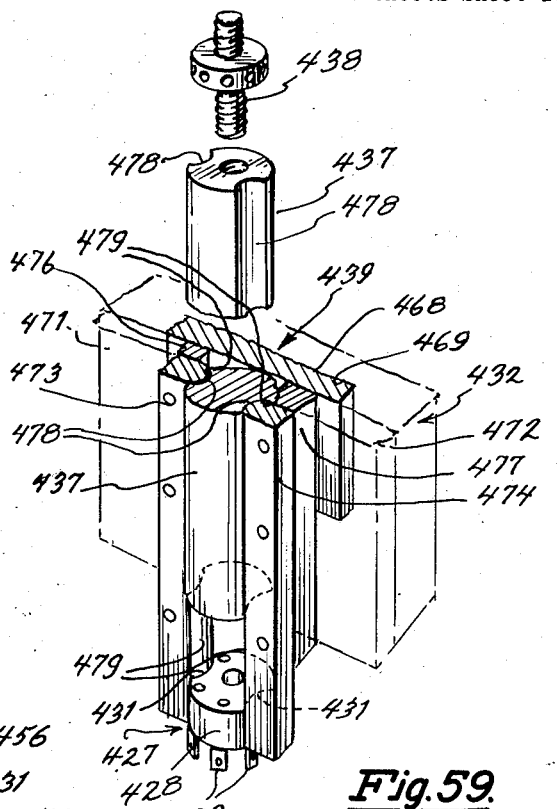
Fig. 59 is a partly exploded view of the ram and guide members of the mechanism shown in Fig. 55.
Figure 61:
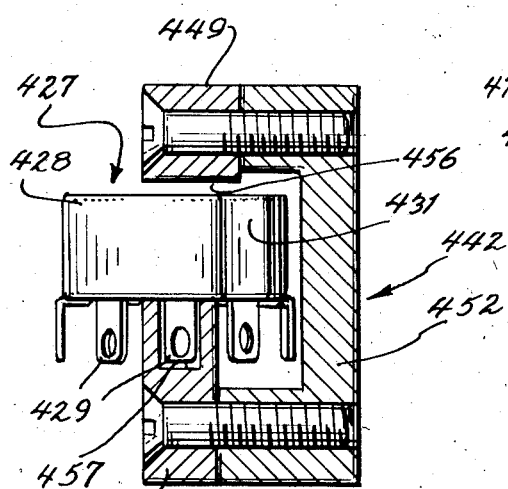
Fig. 61 is a horizontal section taken on line 61—61 of Fig. 51.

To understand the structure of the slider 439, it should be noted (Fig. 59) that it is of composite structure and includes a carrier plate 468 received in a longitudinally extending channel 469 of the base 432. In the channel 469, the plate is confined for vertical movement by confining plates 471 and 472 fixed to the front of the base and extending in front of the carrier plate, similar to the units previously described. The slider 439 also includes a pair of socket guides 473 and 474. The guide 473 is fixed to the plate 468 but spaced therefrom by a filler 476 while the guide 474 is also fixed to plate 468 but spaced therefrom by a filler 477, of thickness differing from the thickness of the filler 476, in order that the guides may cooperate with the sockets as will later be described. Adjacent edges 478 of the guides 473 and 474 are of formation and lateral spacing complementary to the formation of the grooves 431 for being received therein, whereby a tube socket so engaged may be held against turning motion about its axis after support of the magazine has been removed, as will be later described.

The transverse contour of the ram 437 is similar to the socket and consequently formed with a pair of grooves 478, throughout its length, in which the edges 479 are received for the ram to be confined for movement to its vertical course.

As the ram 437 is moved throughout its course, the magazine 442 is swung about its pivotal axis provided by the pin 446. For this to be effected, the plate 444 is formed with a cam slot or positive motion cam 481 therein in which is received a follower 482 carried by the arm 466. At the beginning of the downward stroke of the ram, the follower 482 is at the upper end of cam 481 which relationship of cam to follower maintains the lower end of the rod 451 in the course of the ram and retains the end 462 out of the course of the sockets 427, by cooperation between the arms 466 and 467. At the same time, the lowermost of the sockets is directly below the ram and blocked from movement beyond this position by engagement thereof with a stop block 483. As the ram moves downward, the arm 466 is carried from its supporting relation to the rod 458 allowing the latter to descend and its lower wedge-shaped end 462 to be interposed between adjacent sockets contained in the magazine so that the weight of the remaining sockets in the magazine can no longer move the lowermost sockets from between the bars 449 and 451. At the same time the wedge-shaped end moved the bottom sockets to the end of the magazine so that a socket was disposed in the path of the fingers on the slider. The movement of the follower 482 being continuous throughout the length of its downward stroke, it is then carried into an inclined portion 484 of the cam 481 whereupon the magazine is swung rapidly clockwise about the pivot 446 after the socket grooves 431 have been entered by the socket guides 473 and 474. The clockwise motion of the magazine is adequate to carry the lower and outer supporting end of the rail 451 out of the course of the ram 437 and guides 473 and 474. The socket, having its grooves properly orientated with the fingers 473 and 474, the fingers enter the grooves in the sockets, Fig. 59. The friction between the fingers and socket is adequate to retain the socket between the guides after the magazine support has been removed. The downward movement of the slider 439 carries a striker 486, fixed to the guide 473 into engagement with a stop 487 rigidly secured to the plate 471 at approximately the same time that the clutch ball 441 is carried into engagement with a spring-pressed plunger 488 which is depressed after which the ram continues its downward motion independently of the slider as described in the previous embodiment. This independent operation of the ram is initiated when the lower extremities of the guides 473 and 474 are in close proximity; that is, at approximately ⅛ of an inch from the blank B. Thereafter the ram 437 strips the socket from the guides or fingers 473 and 474 and being arranged directly above a group of holes 4, on the blank, the lugs are passed into said holes.

A die 489 is employed below the holes 4 to cooperate with the socket lugs in order that the lugs may be bent laterally and upward into clinched relation to the blank.

B. The mechanism 489, Fig. 54, comprises a cylindrical support 491 fixed in an aperture 492 in the plate 113 and also extends into a shallow bore 493, in one of the plates 18, from the bottom of which the support is spaced by a disc 494, of insulating material for a reason later to be indicated. For the same reason, the periphery of the bore 493 is of diameter substantially greater than the diameter of the support and the support consequently segregated from the plate 18. Axially thereof, the support 491 is formed at its upper end with a bore 496 communicating with a coaxial counterbore 497 in the lower end of which is threaded a fixed plug 498. The upper end of the counterbore houses a movable plug 499 formed with an upper end or pad 501, of reduced diameter, for freedom of movement in the bore 496. The movable plug 499 is biased upward by a compression spring 502 in the counterbore between the plugs 498 and 499. The pad 501 is of sufficient length and the spring therefore cooperates with the movable plug to sustain the upper end of the pad 501 at a level above the level of a plurality of die cavities 503 on the top of the support 491 about the edge of the bore 496. The dies 503 are concave, as indicated, and are of an arrangement wherein one of the dies is directly below each of the holes 4 of the blank B. While so positioned, the blank is initially supported on the pad 501, the spring 502 spacing the blank from the dies 503. This is a precautionary construction to ensure entry of the lugs 429 into the holes 4 before the lugs are engaged by the dies. Once the lugs are inserted in the holes 4 the latter serve to guide the lugs into engagement with the dies. Thereby the lugs are bent radially outward of the mechanism 489 and then upward into clinched relation to the bottom of the blank B, the pad 501 being depressed for the clinching operation to be completed at the end of the stroke of ram 437.

During the upward stroke thereof the ram 437 carries a contactor 504 thereon into engagement with the arm 466 to lift the slider 439 which, in turn, carries a detent 506 on the back of plate 468 opposite the ball 441 to reestablish clutch-coupled relationship between the ram and slider.

Also during the upper stroke of the ram 437 the magazine 442 is swung counterclockwise to its normal position as the follower 482 is carried upwardly of the cam 481. Concurrently, the rod 458 is lifted from its blocking relation to the stream of sockets, in the space 456, by engagement of the arm 467 by the arm 466, thereby permitting another lowermost socket to be moved into engagement with the block 483.

Safety mechanism is provided to prevent operation of the motor 434 when an end or lowermost magazined socket is improperly positioned for cooperation with the guides 473 and 474 if they were lowered. A typical example of such a condition could arise where the socket content of the magazine became so depleted that the remaining magazined sockets could exert insufficient pressure on the end socket to urge it into engagement with the stop block 483, in which event the guides, if lowered, would strike the top of the socket instead of straddling it. The ill effect would be bending or breakage of the rod 451 or injury to the socket itself. Accordingly, the block 483 is movably supported on the outer side of a tongue 507, normally within a recess 508 on the lower end of the housing plate 432. Therein the tongue 507 is pivotally supported, upwardly thereof, on a pin 509 extending transversely of the recess 508. While the tongue 507 carries the block 483 on its front side, it carries a movable switch block 511 on its rear side opposite the block 483. The block 511 is adjacent a fixed switch block 512 secured to the back of the housing plate. Both of the switch blocks are of dielectric material for operative support of a switch 510 comprising a first contactor 513 on the block 511 and a second contactor 514, on the block 512, opposite the contactor 513. When the contactors are in engagement with each other a current may flow from a flexible cable 516 in electrical communication with the contactor 513 to a wire 517 in communication with the contactor 514. The motor 434 is conditioned for operation by electrical control apparatus in circuit with the switch 510. The contactors 513 and 514 are biased away from each other by a compression spring 518, the respective ends of which are pocketed in a bore 519 in the back of the tongue 507 and a bore 521 in the housing plate. When there is an adequate supply of sockets in the magazine their weight overcomes the resistance of spring 518 thereby conditioning the motor for operation as the end socket is urged against the block 483. When, however, few, if any sockets remain in the magazine their weight is insufficient to overcome the resistance of spring 518 and the switch 510 remains open after the previous operation of the motor. The motor can, of course, be then made to operate by inserting more sockets in the magazine.

Although the unit 442 has been described for manipulating sockets 427; that is, sockets having grooves 431 on opposite sides thereof, other sockets are contemplated. A typical socket not of the class first referred to, is one without the grooves but of diameter capable of being straddled by the guides 473 and 474. When a socket of this description is employed, the bottom of the ram 437 may carry a plurality of locator pins 522, Fig. 57, arranged on the ram to enter the holes ordinarily to be found in the top of a socket for receiving the prongs on the bottom of a vacuum tube, as means for supporting the socket after the magazine rod 451 has been withdrawn from underneath the socket.

*Provisions for manipulating blanks differing in size*

Although blanks B of but one width have thus far been considered, provisions have been made for automatically manipulating blanks of other widths and for affixing the components, previously referred to, to them. One provision, already referred to for releasably clamping the rail sections 21 (Fig. 19) to their support, includes the anchor members 22 and slots 24 therein. By releasing the clamping operation of the studs 26, the sections 21 are conditioned to be moved laterally relative to the sections 19 to selected positions where they are clamped to the anchor members. In addition, the rails 79 are also releasably anchored to the transverse rods 86 by screws 523, passing freely through slots 524 in the transverse rods, and threaded in the rails so that the latter can be clamped in selected positions on the rods 86. Further provisions to accommodate blanks of additional widths may involve replacement of parts by other parts, differing in dimension.

Alternative mechanism for trimming the leads 139 is also contemplated. It is shown in Figs. 62 to 66 inclusive, and comprises a pair of blocks 901 and 902, rigidly secured to each side of the component magazine. As will be noted, the width of the blocks 901 and 902 between their opposed vertical edges, is greater than the combined width of the plates 192 and 193 in their spaced relation to each other so that rearwardly of the component magazine the blocks include rearwardly extending portions 903. The blocks are provided with vertically extending slots 904 on the inner edge which join with horizontally extending slots 906 through the top of the blocks. At the rear top edge notches 907 are provided which extend transversely of the blocks 901 and 902 from the upper edges thereof intersecting the horizontal slot 906. The notches 907 extend downward from the upper edges of the plates 901 and 902 to the level of the bottoms of the slots 906. The faces of the blocks next to the magazine plates are provided with clearance grooves 908, in alignment with the notches 907, which extend to the lower edges of the blocks. The opposed walls of the slots 904 and 906 each afford guide surfaces for T-shaped movable shear members 909, confined in the slots and each pivotally supported by a pin 910. The shears 909 can each swing in the slots and each is limited in its counterclockwise motion by engagement with the bottom of the groove 904 at the groove 906. The members are swung to their shearing position, against the resistance of springs 915, seated in pockets 914, and engaging the shears 909. When the force for their counterclockwise motion is removed, the springs turn the shears 909 clockwise until they engage stops provided by the bottoms of the heads of screws 916 which are threaded in the plates 901 and 902 beside the pockets 914. The members 909 are formed with sharp wedge shaped shear edges 913 which overlap the notches 907, when in shearing position, at which time they cooperate with a pair of hard metal plates or shear leaves 911 fixed to portions of the plates 901 and 902 beside the plates 193, the portions being of reduced thickness to accommodate the leaves between the same and the members 909 when the latter are in their shearing positions.

In the present construction, the components 157 are fed into the component magazine 191 in the manner already described, their untrimmed ends protruding through the slots 201. It will therefore be apparent that a pair of horizontal support pins 919, one of which extends from both of the plates 901 and 902 to extend transversely of the course of the untrimmed leads 159 interrupt the descent of the components by engaging the leads of the lowermost of the magazined components. The pins are so positioned that the members 909 operate between them. Also the elevation of the pins above the bottom of the notch 907 is such that when the members 909 are moved to their shearing position they sever the leads of the components which are engaged by the pins. Thereupon the trimmed component moves downward of the grooves 908 and slot 201 while the remaining components move downward to the support of the members 909. This is by engagement of the tops of the members 909 by the lowest untrimmed component leads until the members 909 are retracted from their shearing positions.

The shearing operation of the members 909 takes place on the upstroke of the slider 166. To provide for this, the members 909 are formed with follower portions 917 for engagement by cams 918, fixed to the front of the slider 166.

If desired, a chute 921 or deflector may be secured, by any suitable means, as by a bracket 923 to the member 154 (Fig. 31) to convey the trimmings from the components to a convenient container for them or in a similar manner to that described in Fig. 3.

In this construction the cutting jaws 183 and 186 (Figs. 25 and 26) may be eliminated. The horizontal distance across the front of the component affixing head, at the bottom thereof, may be reduced, and consequently the components may be affixed to a blank in closer end-to-end relationship to each other than in the previously described component affixing units.

*Control apparatus*

The operation of the foregoing mechanism is in response to operation of manual and automatic electrical control apparatus indicated diagrammatically in Figs. 62 and 62A. Therein a transformer 531 steps down the current from 110 volts to 4 volts which is supplied to a pair of leads 532 and 533, the lead 533 being grounded. The 110 volt current is delivered to the transformer by wires 534 and 536 controlled by a master switch 537, connected to the power lines 538 and 539. If desired, a fuse 541 may be inserted in one of the primary leads and a pilot light 542, connected across the primary to indicate the circuit is engaged.

For controlling the sequence of operation of the horizontal transport motors 6 and 87 in addition to the vertical station motors P, Q, R, etc., a series of cam switches 543, 544, 546, 547, 548, 549 and 551 are provided. They are arranged to cooperate with a series of cam discs 553, 554, 556, 557, 558, 559 and 561 by virtue of their mounting, their movable ends being biased into engagement with the peripheries of the discs. The discs each have a periphery which is mutilated by a series of circumferentially spaced notches 562 into which the tips of the switch blades snap to energize or deenergize switches as the discs are rotated. A motor 563 drives a shaft 564 to which the discs are fixed, the connection between the motor and shaft being by a gear train, not shown, to reduce the speed of the shaft to about one revolution per minute. All of the discs are arranged with their notches 562 in staggered relation to each other in order that no two of the switches 543 and 551 may be operated concurrently.

Assuming that none of the switches 543 to 551 is engaged by one of the notches 562, but that the discs are so arranged that one of the notches on the disc 553 is first for engagement with the switch blade 543, then closing of main switch 537 is followed by closing of the switch 543. This is because a circuit is made from the wire 536 on one side of the main power line by way of fuse 541, wires 567 and 568, switch 569, wires 571 and 572, switch 573, wires 574 and 576, switch 577, wire 578, switch 579, wire 581, to the motor 563 which is thereby started, wire 582 and switch 583 to the wire 566 to the other side of the line.

When the main switch 537 is closed low voltage current is available at the transformer's secondary terminals and lead 533 which is grounded. Owing to this grounded connection and the now closed status of switch 543, a circuit is made from a wire 584, connected to the wire 532, through a wire 588, a switch 589, wire 591, the cam switch 543, a wire 592 through the solenoid 587 to ground 586.

Each of the several fluid pressure motors 6, 87, 171, etc., is controlled by valve means, the structure of which will not be described in detail, since they per se constitute no part of the present invention. Such a valve is on the market and known as an "Electroaire valve," manufactured by The Bellows Company of Akron, Ohio. Each of the motors has a pair of first and second valve ports, one of which is in communication with the interior of the motor on either side of its piston and the ports are closeable by integral port-closing members or valve members, movable between two predetermined positions on either side of an intermediate position wherein the valves preclude entrance of the air into either of the ports. When the members are in one of their predetermined positions, a first of the ports only is in communication with the supply of compressed air and when the members are in their other predetermined positions, the second of the ports is open to ingress of air and air is excluded from the first port; thus, the direction in which the piston is moved is dependent on the position of the valve members. Each of the integral valves is connected to the armatures of a pair of solenoids, one of which when energized moves the members to one of their predetermined positions while the other solenoid, when energized, moves the members to their other predetermined positions.

In keeping with the foregoing, the controls for the motor 6 will be considered first. They include a pair of coaxial solenoids 587 and 593 disposed on each side of the axis of motor 6. The solenoids are supported from the motor by a valve body 594 which receives air under pressure through a conduit 596, and directs the air in accordance with the valve operation alternately to one side or the other of the piston by one of the solenoids 587 and 593. Prior to operaton of the electric motor 563 the switch 543 is in engagement with the periphery of disc 553, as previously indicated. Upon rotation of disc 553, the notch 562, nearest to switch 543, is carried to a point where it is exposed to the movable end of the switch 543, which snaps into the notch to close the switch. Closing of switch 543 is followed by energization of the solenoid 587 to operate the valve 594 and move the motor piston forward; that is, in a direction from left to right. This removes a blank B from the magazine and transfers it to the first component affixing station P, by the means already described. The removal of the blank is carried out before switch 543 is opened by continuous rotation of the motor 563. The forward operation of the motor 6 carries a striker 597, on the rod 129 (Fig. 22) into mechanical communication with a switch blade 598 changing the position thereof so that it is in electrical communication with a lead wire 599 until the operation of the motor 6 is reversed.

Following the opening of switch 543, the switch 544 is operated by the disc 554 to close the switch. This causes a current flow from wire 591 over wires 601 and 602 to the switch 598; the latter being now connected to wire 599; the current then flows through a closed switch 603 and a wire 604 to a switch 606 and thence by a wire 607 to a solenoid 608 supported from the motor 87 by a valve 609, through the solenoid and wire 612 to ground 611. The solenoid 608 is energized thereby adjusting the valve 609 for admitting air to the motor 87 at an end thereof capable of moving the cams 97 (Fig. 22) to the left, the air being supplied to the valve 609 by a conduit 613. This moves a blank B to a lower position wherein it is in readiness to receive a component. Following movement of the blank to its lowered position, the switch 544 opens, the notch 562 it engaged, being carried past the switch.

Next, the switch 546 is closed and current flows from the wire 591 by leads 616, 617 and a solenoid 618 and then to ground 614 energizing the solenoid 618, and closing the switch 619. This enables the flow of current to take place to the component affixing stations from the wire 532, over wires 621, 622, switch 619, wires 623, and branches 624 and 626. Although only two wires 624 and 626 are shown that branch from the wire 623 to control apparatus for but two component affixing stations, additional wires branching from the wire 623 and corresponding to the wires 624 and 626 are needed for feeding each additional station.

As stated, the blanks B engage the anvils 121 when the blanks are in their lowest positions, the positions they occupy when the first operation of the motor 87 has been completed. It sometimes happens, however, that even though the motor 87 has performed the operation described one of the blanks fails to seat on one of the anvils 121. A safety means is therefore provided, to prevent operation of the vertical motor or motors of that station until the trouble has been corrected, in the form of a detector switch in each of the stations such as 627 and 628, Fig. 68. The switches 627 and 628 are held open by spring pressure and in this status support vertical contactor pins 629 and 631 with their upper extremities above the level of the anvils 121 before the blanks B are lowered. Pins 629 and 631 are immediately below the blanks when in the component affixing stations and, as the blanks are carried downward, they engage the pins and depress them against the resistance of the switches, thereby closing the said switches.

Current conveyed by the wire 624 then passes through a switch 632, a wire 633, the switch 627, a wire 634 through a valve solenoid 636 to a grounded wire 637, energizing the solenoid. The solenoid 636, and a solenoid 638, are supported from the vertical motor 171 by a valve 639, previously described, which conveys fluid pressure delivered thereto by a tube 641 and transfers the pressure to an end of the motor determined by the solenoid energized. The solenoid 636, when energized, operates a valve which admits pressure to the upper end of the motor 171 resulting in a downward movement of the rams 167 and sliders 166.

Similarly, a printed circuit blank pressed downward against the pin 631 may close the switch 628 so that current may flow through the lead 626 by way of switch 643, wire 644, switch 628 and wire 646 to solenoid 642 and thence to a grounded wire 647. Both solenoids 642 and 648 are supported in a vertical motor 649 by a valve 651 performing a function identical to that of the valve 639 and operating concurrently therewith. The solenoid 642 controls the lowering of the ram 167, associated with motor 649 and the solenoid 648 provides for raising said ram by means later to be considered. Following a complete downward operation of the vertical motors, the switch 546 is opened by the rotation of cam 556.

It will now be apparent that should any one of the blanks B in any of the stations fail to be lowered to the level of the anvils when the blanks of the remaining stations are lowered, the vertical motor of that station does not operate.

Assuming the lowering of the blanks in both stations has been in a satisfactory manner and the switch 546 has just opened, the switch 547 is next closed. This is followed by a flow of current from the wire 591 over wires 652 through switch 547 over wire 653, through a solenoid 654 to a grounded wire 656. As a result, a normally open switch 657, mechanically connected to the solenoid, is closed thereby. This causes two separate operations. First current flows from the wire 621 over wires 658, 659 and 661, through the solenoid 593 and over a wire 662 connected to the grounded wire 586. The consequent energization of the solenoid 593 operates the valve 594 to admit fluid pressure to the right hand end of the motor 6 thereby operating it through its return stroke. During this operation the switch blade 598 is swung by the stop 597 on rod 129 out of electrical communication with the wire 599 and into communication with a wire 663.

The second operation which takes place as a result of the closing of switch 657 is a flow of current from the wire 661 over branches thereof, namely, 664 and 666, at the component affixing stations. The current flow, in the first station, is from the wire 664 through a switch 667, over a wire 668, through the solenoid 638 to the grounded wire 637 by way of a wire 669. At the same time there is a flow of current from the wire 666 by way of a switch 671 and wire 672, through the solenoid 648 and to ground through wire 673. Both solenoids 638 and 648 are energized to operate the valves for admitting compressed air to the lower ends of the motors 171 and 649 thereby lifting the sliders 166 and rams 167 to their upper positions.

There may be a failure in applying a component to a blank because one end portion does not pass through the blank into engagement with one of the anvils 121. If this should happen the machine stops automatically and the defect corrected. In carrying this out the rams 167 and anvils 121 act as a switch, the contacting surfaces being the end portions of components with the anvils. The anvils 121 being insulated from each other, safety control apparatus or test apparatus, is electrically coupled to each of the anvils by wires 673, 674, 676, 677, 678 and 679. The rams 167 and sliders 166 are grounded, as indicated diagrammatically at 681 and 682, so that as the ends of the components are passed through the blanks and into engagement with the anvils, the wires 673, 674, 676 etc., connected to the anvils, are grounded. It will, therefore, be apparent that should one of a component's end portion fail to pass through a blank and into engagement with the anvil nearest thereto, that anvil does not act as a conductor and the control apparatus is not energized.

Elements of the control apparatus comprise a first group of solenoids 683, 684, 686 and 687, in association with one of the stations, and a pair of solenoids 688 and 689 in association with the other of the stations shown. One of the ends of each of the solenoids 683 to 687, inclusive, is connected to a current bearing wire 691, also connected to the wire 588, by means of wires 692, 693, 694 and 696. The remaining test solenoids 688 and 689 are connected to the wire 691 by a wire 697 and 698.

To supplement the current supplied by transformer 531 to the test apparatus, an additional transformer 699 may be provided. Its primary is connected to the wire 566 by a wire 701 and to the wire 567. One end of the transformer secondary is grounded at 702, while to the other end is connected a wire 703, in turn connected to the wire 691.

The solenoid 683 is connected by the wire 673 to the anvil 121 and when operated closes a pair of switches 704 and 706, the former of which is connected by a wire 707 to the wire 673 and the latter connected by the wire 674 to an anvil. The wire 676 is connected to the solenoid 684 and to a switch 708 by a wire 709. The solenoid 684 is arranged to close the normally open switches 708, and 711. The wire 677 connects with the solenoid 686 for closing a pair of switches 712 and 713, the former being connected to the wire 677 by a wire 714. To the remaining end of solenoid 687 a wire 716 extends to the switch 713, which is series connected to the switch 711 by a wire 717. A wire 718 connects the terminals of the switches 706 and 711. It will therefore be apparent that a current may flow from the wire 693 by way of the solenoid 687, through wire 716, switch 713, wire 717, switch 711, wire 718 and switch 706 to wire 674 attached to the anvil. This energizes the solenoid 687, and closes a pair of switches 715 and 720.

In the adjoining station, the lead 678 from the anvil connects with a normally open switch 719 while the lead 679 connects the remaining anvil to a normally open switch 721. Both of the switches are closeable by the solenoid 688.

Assuming now that during a cycle of operation of the rams 167 all the anvils have been connected, electrically, with the rams, it will be understood how the solenoids 683, 684 and 686 are energized, thereby closing the switches associated therewith. Solenoid 687 is energized consequent to closing of the switches 706, 711 and 713. The current flow from the wire 698 through the solenoid 688 and thence over wire 679 to the grounded wire 682 results in closing of the switches 719 and 721 by energization of the solenoid. As a result, another circuit is made from the wire 742 and a wire 743 to the closed switch 719 to energize the solenoid 689. Its operation is communicated to a pair of normally open switches 724 and 726 which are thereby closed.

The solenoids 683, 684, 686, 687, 688 and 689 remain closed after the rams 167 have been withdrawn from the blanks because a holding circuit has been established by means including a solenoid 727, shown at the upper left of Fig. 68. It is connected to the wire 621 and also connected to a wire 728 leading to the switch 549, to which a grounded wire 729 is also attached. When the switch blade is engaging the periphery of the disc 559, a circuit is established through the solenoid 727 to ground. The solenoid 727 operates a normally open switch 731 to establish a ground connection to wire 733.

Branching from the wire 733 is a lead 734 for communication with the switch 704, a lead 736 for communication with the switch 708, a lead 737 for communication with the switch 712, leads 738 and 739 for communication with the switch 715, a lead 740 for communication with the switch 721, and a lead 741 for communication with the switch 724. When the switch 724 is moved into communication with the wire 744, current from the wire 698 may flow through solenoid 689, thence over wires 742 to wires 743 and 744 to the switch 724 to maintain the switches 724 and 726 in closed status. Also, a circuit is closed from the wire 698 through the solenoid 688, the wire 679 to the anvil as well as through a wire 746 and the switch 721 to wire 740. Another circuit is made from the wire 693 connected to 691 by way of the wire 716 and a wire 747 to switch 715 now closed. Circuits through the remaining switches 704, 708, and 712 to the wire 733 have been previously indicated.

Following opening of the switch 547, the switch 551 is next closed. Current flows from the wire 591 by way of wires 749 and 750 to pass through a solenoid 751 which is energized to ground 748. The solenoid operates a normally open switch 752 to closed position and a switch 573 is moved out of communication with the wire 572 and into communication with a wire 754. Also, a low voltage current is permitted to flow from the wire 591 over wires 756 through switch 752 to wire 757 from the latter of which leads 758 and 759 lead to pilot lights 761 and 762, each one of which is associated with the respective stations indicated. The wire 754 extends throughout the length of the row of stations P, Q, R, etc., beyond which it is connected by a cross-over 763 to another high voltage wire 764 and branch thereof 766 leading to the switch 726. The switch 726 is connected in series with the switch 720 by wires 767, 768 and 769. The switch 720, when now closed, is in communication with the wire 571 by a branch thereof 771, so that a current to operate the electric motor 563 which is delivered to the series-connected switches 720 and 726 by the wire 571 finds its way to the motor by way of wire 754, switch 573 and other conductive means already referred to including the wires 574, 576 and switches 577 and 579.

If any one of the component ends fails to be passed through the blank and into engagement with an anvil the motor 563 stops. The reason for this will be evident by a study of the relationship between the solenoids 683, 684, 686 and 687, the switches they operate and relationship between them. For example, let it be assumed that owing to such a defect, no current may pass over the wire 673, but can pass over all of the wires 674, 676 and 677. The result, of course, is that the solenoid 683 is not energized. Consequently, a flow of current through the switch 706 is precluded, the switch 715 remains in communication with a wire 772, since the solenoid 687 cannot be energized. The light 761 becomes illuminated since a current may then flow from the wire 758 through the light 761 to the switch 715 and to the wire 733 by way of wires 739 and 738, the light serving as a warning to an attendant of the installation. The rotary motor 563 stops, since the switch 720 remains open.

Should it happen that the component affixing operation is defective to the extent that a circuit by means of either of the wires 678 and 679 fails to be made, then the pilot light 762 remains illuminated since a current may then flow from the wire 757 over the wire 759, through the lamp 762, over wire 760, through switch 724 and wire 741. Also the motor 563 stops since switch 726 remains open.

For each additional component affixing station, control and test apparatus corresponding to the apparatus just described will be required including switches corresponding to the switches 720 and 726 connected in series by wires corresponding to the wires 768 and 764 so that throughout the length of the row of stations means is provided for automatically interrupting the flow of blanks B should one of them fail to operatively receive a component, as previously indicated. Also, in case of a shut-down, an operator is apprised of the station where he may look for the defect.

It will now also be apparent that in starting a run of blanks through the installation that immediately after the first blank from the magazine has received the component or components scheduled for the first station that the motor 563 will stop owing to the series connected status of the switches in the succeeding stations. Therefore it is necessary to re-start the motor 563. This is done manually by closing a starting switch 774 for a period long enough for the rotation of disc 561 to open the switch 551. The starting switch 774 must also be closed at each rotation of the disc 561 so long as one of the component affixing stations is without a blank therein or the blank that is in the station is fed a component which is defectively received by the blank. When each of the stations has received a blank, the operation of the motor 563 is continuous so long as there is a supply of blanks B in the magazine M.

Assuming that all of the blanks in the respective stations have received components and the switch 551 has been opened by rotation of the disc 561, the next of the cam-operated switches to be closed is switch 548, the remaining switches operated indirectly by the motor 563 remaining open. By closing of switch 548 a circuit is made from the wire 591 over wires 776 and 777, a switch 778, a wire 779, and through a solenoid 781 to the grounded wire 611. The energization of the solenoid 781 operates the valve 609 the result of which is movement of the piston rod 88 to the right resulting in movement of the blanks to their upper positions from which each may be moved to the next stations. Each of the solenoids 683, 684, 686, 687, 688 and 689 and/or the corresponding solenoids of the succeeding stations remain energized since a current may still flow throw the switch 731 to ground, even though the interval after the switches 551 and 548 are opened is short.

The apparatus for opening the switch 731 includes the switch 549 which, next in order, is engaged by one of the notches 562 so that communication therewith and the wire 728 is interrupted to deenergize the solenoid 727. This also results in the switches to the anvils being opened.

Additional means is provided for closing the switch 720 to re-start the motor 563 after a defective connection between the end of a component and blank has been repaired. The means includes a normally open switch 750 to connect the wire 739 to the wire 747. When the switch 750 is closed, a current may flow from the wire 739 to the wire 716 by passing through the solenoid 687 and energizing it thereby to move the switches 715 and 720. A switch 755 having a similar function is provided in connection with inspection apparatus for the remaining station indicated. When the switch 755 is closed, a current may flow therethrough from the wire 743 to the wire 741 after passing through the solenoid 689 which is thereby energized to close the switch 726 and extinguish the lamp 762 by moving the switch 724 to provide communication between the wires 741 and 744.

An installation without a magazine M and consequently one to which the blanks B are manually fed is also contemplated. In such an installation the switch 577 is employed. It is normally closed but arranged to be opened when a current passes through an associated solenoid 782 from the wire 532 by way of wires 783 and 784, a switch 786, a wire 787, the switch 549 and wire 729. This, of course, stops the motor 563. To re-start the switch 786 is biased to a closed status. It is also mechanically coupled to a finger 788 in the course of a blank B as it is slid into the ends of the grooves 32 and 33 but arranged to be depressed by the blank which operation is communicated to the switch 786 for opening it. This enables the motor 563 to continue its operation since the switch 577 is then closed. When a magazine M is employed as an element of the component affixing installation, the switch 786 may be dispensed with as may also the solenoid 782, wires 784, 787 and switch 577, the wire 576 then being integral with the wire 578.

Safety features are included in the control apparatus for the component affixing installation. One such feature involves means for automatically stopping the motor 563 when a blank fails to be transferred from the magazine M to the component affixing station nearest to said magazine or from any given station to the next station. The means includes a solenoid 789 having a grounded lead 791 and a lead 792 extending therefrom. The lead 792 connects with the wire 663 and a solenoid 793. Consequently, when a blank B becomes jammed in the grooves 32 and 33 or the grooves 133 the motor 6 is precluded from operating through a full forward stroke. As a result, the switch blade 598 remains in communication with the wire 663 after the switch 543 has opened and switch 544 closes. It will be apparent, then, that a current delivered by the wire 602 passes through switch 598 to both the solenoids 789 and 793 by way of wires 663 and 792, the solenoid 793 being grounded at 794. The resulting operation of both solenoids is opening of the switches 579 and 603 concurrent with which a switch 796 is closed. It will now be apparent that the operation of electric motor 563 is arrested owing to the opening status of switch 579, and downward movement of the blanks B is precluded since no current can flow to the solenoid 608 owing to the open status of switch 603. This status cannot be changed so long as the switch 598 conveys current from the wire 602 to the wire 663 and switch 544 remains closed. Nor is breaking of the communication between the wires 602 and 663 by moving the switch blade 598 manually or by removal of the jammed blank adequate to restart the motor 563, since a current from the wire 602 may now flow to the solenoids 789 and 793 by way of a wire 797, a closed switch 798, a wire 763, the switch 796 and a wire 764 connected to the wire 663.

When the jammed blank has been removed, the operation of the installation may be restored by opening the switch 798. This is followed by de-energization of the solenoids 789 and 793, assuming, of course, that the motor 6 has operated for the remainder of its stroke and has adjusted switch 598 so that it provides communication between the wires 602 and 599.

The controls for the component affixing installation includes means for precluding operation of the electric motor 563 when the fluid pressure, for operation of the motors 6, 87, 171, etc., is below a predetermined limit at which the fluid pressure motors do not operate effectively, if at all. The means includes a pressure-responsive control gauge 801. It is connected to a conduit 802 communicating with the source of fluid pressure for the motors 6, 87, 171, etc., and to a switch 803 which is closed when no fluid pressure is conveyed to the gauge through the pipe 802; that is, when the pressure acting on the valve is not above the ordinary or normal pressure of the atmosphere. When the fluid pressure, of the source to which the tube 802 is connected, is suitable for operation of the pneumatic motors, the gauge 801 transmits adequate motion for opening the switch 803 and retaining it in the position indicated. In case the fluid pressure falls below the predetermined minimum, however, in the course of operation of the component affixing installation, the switch 803 is closed. This enables a current to flow from the wire 532 by way of the wire 783 to and through a solenoid 804, thence over wires 806, 807 and 808 through the switch 803 to a ground 809. As a result, the solenoid 804 is energized. It is mechanically coupled to a normally open switch 811 and to the normally closed switch 583. Consequent to the opening of switch 583 the electric motor 563 may not operate. By closing of the switch 811 a holding circuit is established between a grounded wire 812 and the wire 532. From the latter the current flow is then by way of wire 783, solenoid 804, wires 806 and 807, a wire 813, the switch 811, a wire 814 and a switch 816 to which the grounded wire 812 is connected. This holding circuit is maintained until the switch 816 is manually opened at which time the solenoid 804 is de-energized, the switch 811 opened, and the switch 583 closed, if the fluid pressure is above the predetermined limit. Otherwise the holding circuit is re-established on release of the switch 816 since it is preferably of the normally closed variety. If desired, a pilot light 817 may be connected by a wire 818 to the wire 532 and to a continuation of the wire 806 to indicate, when a current is passing through the solenoid 804 and the reason for a stall in the operation of the machine.

Figure 67:
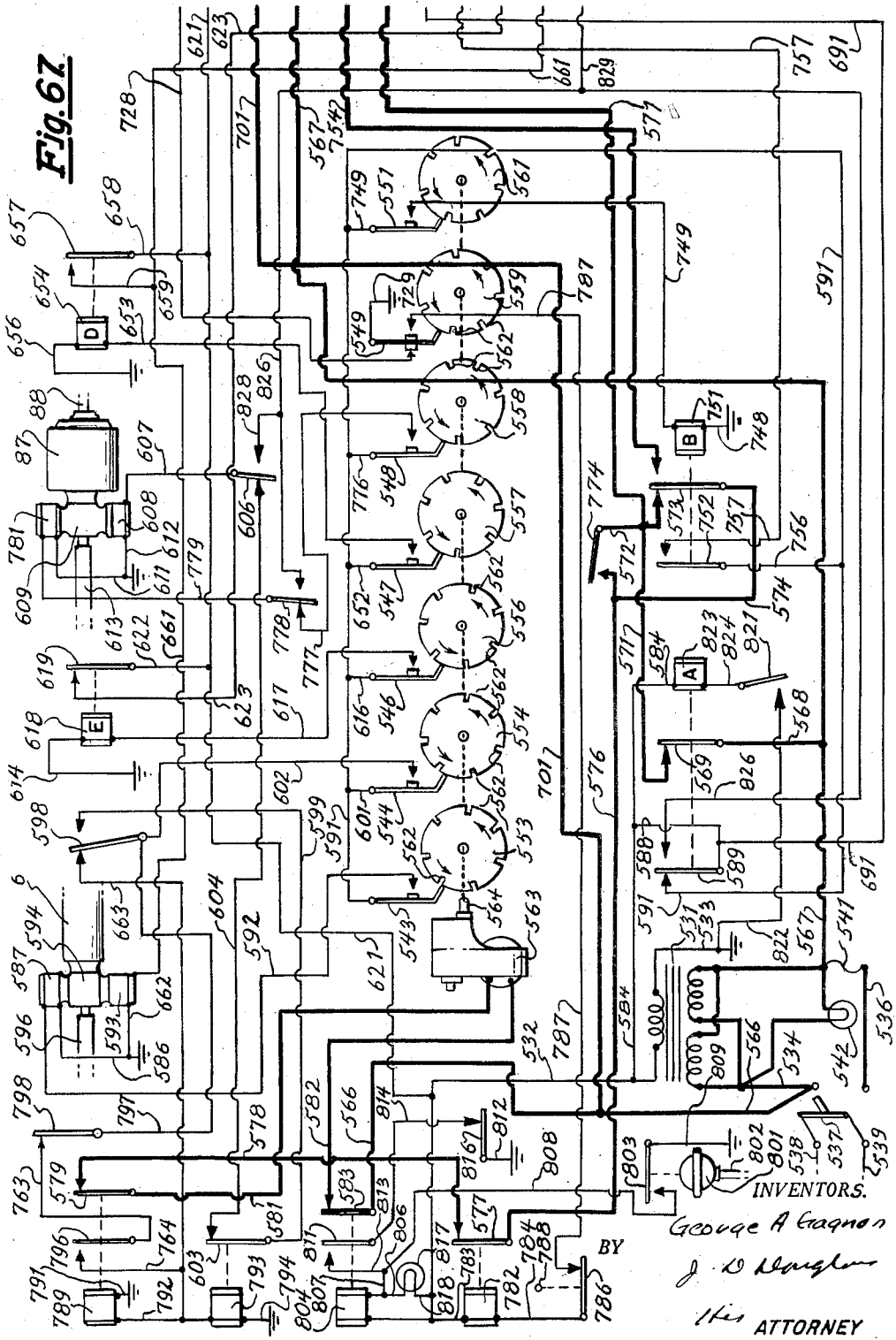
Fig. 67 is the left hand part of an electrical circuit drawing of the control apparatus for the component affixing installation.

Provision has been made for manually operating the elements of the installation, including a switch 821, Fig. 67, which is connected through a lead 822 to the ground. When the switch is closed, current may pass from the wire 584 through a solenoid 823 and over a wire 824 connecting said solenoid with the switch. The armature of solenoid 823 is coupled to the switches 589 and 569 so that when the solenoid is energized the switch blade 589 moves out of communication with wire 591 and connects with a wire 826, thereby diverting flow of current from the switches 543, 544, 546, etc., to the switches 778 and 606. Concurrent with this operation, the switch 569 opens thereby preventing the passage of current over the wires 571 and 754 to the motor 563. The switch blade 778 connected to solenoid 781 is biased into communication with the wire 777 and the switch blade 606 connected to solenoid 608 is biased into electrical communication with the wire 604. The motor 87 can now be operated manually by operating the switches 778 and 606. When the switch 777 is moved into communication with the wire 826 a flow of current takes place through the solenoid 781 and energizes it to move the blanks upward. When the switch blade 778 is released for movement out of communication with the wire 826 and the switch blade 606 moved into communication with a wire 828, branching from the wire 826, a flow of current takes place through the solenoid 608 which is energized with the result that the blanks in the respective component receiving stations are moved vertically downward. Releasing the switch 606 is, of course, accompanied by de-energization of the solenoid 608. The motors 171 and 649 may also be manually operated when the switch 821 is closed. For this to be possible a wire 829 branches from the wire 826 and, in turn, has branches 831 and 832 connected thereto. The wire 831 is connected to a wire 833 the respective ends of which are in association with the switches 632 and 667. The wire 832 while having an end in association with the switch 671 has a branch thereof 834 an end of which is in association with the switch 643. The switch 667 is biased into communication with the wire 664 while the switch is biased into communication with the wire 624. Accordingly, the switch may be moved out of communication with wire 664 and into communication with the wire 833 to energize the solenoid 638 for raising the rams 167. On releasing the switch 667 and moving the switch 632 into communication with the wire 833 to move the ram downward by energization of the solenoid 636. In the remaining station, the valve 651 may be adjusted to move the ram downward by moving the switch 643 into communication with the wire 834 for energizing solenoid 642. Similarly, the solenoid 648 may be energized to move the ram upward by moving switch 671 for communication between the wire 832 and the wire 672. An advantage of this feature is that when a component is ineffectively affixed to a blank in one of the stations that blank may be removed therefrom and after the defective component has been removed from the blank it may be returned to the station to receive another component without disturbing the flow of blanks through the series of stations.

In changing to manual control from automatic control, it is customary and advisable to interrupt the supply of compressed air to the station it is desired to operate manually immediately after the switch 821 is closed.

Additional means are provided for inactivating any one or number of component affixing stations without disturbing the operability of the remaining stations of a complete installation. This feature is, of course, effective when the stations are fed blanks automatically when the switch 821 is open. For this feature the wire 571, of the first station, is connected to a switch 836 in association with the wire 768, which is also connected to a switch 837 in the remaining station shown. Additional stations employed would, of course, each have switches corresponding to the manually operable switches 836 and 837 in series with said switches. Preferably the switches 836, 837, etc. are of the toggle variety. When, therefore, the switch 837 is closed, for example, and there is a blank in the first station, the motor 563 does not cease operation due to failure of the solenoid 689 to be energized by the means already described.

Having thus described the invention it will be apparent that numerous and extensive departures can be made from the invention by those versed in the art without departing from the spirit or scope of the invention as defined in the appended claims.

I claim:

1. An automation machine comprising a base, a track support disposed alongside the base and a track supported thereby, a magazine disposed at one end of the track in communication therewith for supporting and discharging a plurality of chassis boards one at a time onto the track, means cooperative with the track and magazine for moving said chassis board from said magazine onto said track, said base being provided with a plurality of component attaching mechanisms disposed in stations at predetermined points along the track, said track being formed with movable sections opposite each of said stations, and support means for adjustably supporting said component attaching means over said movable track sections and anvil means disposed below said movable track sections and cooperating with said component attaching means for attaching components to said chassis.

2. A device as described in claim 1 where said movable track sections are arranged to be movable vertically to move a chassis board into engagement with said anvil means.

3. A device as described in claim 1 where said movable track sections are arranged to be movable vertically to move a chassis board into engagement with said anvil means and means on said anvil means engageable with said board to position said board on said anvil means.

4. A device described in claim 1 where said movable track sections are arranged to be movable vertically to move a chassis board into engagement with said anvil means, means on said anvil means engageable with said board to position said board on said anvil means, motor means associated with said track sections and having control means extending longitudinally of rail track for moving said chassis boards and having means connected with said track sections for lowering said track sections in timed relation to the movement of the boards along the track.

5. An automation matchine comprising a main support, track means extending alongside said main support and arranged to support a plurality of chassis boards for movement on said track, said machine providing a plurality of stations and anvil means carried by the support and disposed below said track means at each of said stations, component attaching means at each of said stations carried by the main support, each of said stations including a stationary platform to one side of said movable track means, movable bracket means adjustably disposed on each of said platforms and adjustably movable thereover to predetermined fixed portions, adjustable arms carried by said bracket and component attaching means secured to said arms and adjustably and movably supported over said movable track means.

6. In printed circuit assembly apparatus, a row of component carriers one of which is fixed and an adjacent one of which is movable vertically, all of the carriers being formed with pairs of grooves arranged to embrace the opposed edges of a printed circuit blank and provide a substantially continuous horizontal track for a blank on the fixed carried to be slidably moved into position on the movable carrier when said movable carrier is in elevated position, a fixed support below the level of the blank when it is in elevated position, a pair of vertical positioning pins on the support below a pair of locating apertures in the blank when said blank is in its position and said carrier is elevated, and an operating mechanism coupled to the movable carrier to sustain it in elevated position and being movable to lower it for said blank to be supported by the support and concurrently for the apertures to be threaded over the pins and the blank thereby precluded from edgewise displacement and for the upper side of the blank to be engaged by a component after portions thereof are passed through holes in said blank by a component attaching mechanism above the movable carrier and said component secured to said blank by clinching of said portions to the lower side of said blank by said attaching mechanism.

7. In printed circuit assembly apparatus, a row of alternate fixed and vertically movable horizontal component carriers, each of the carriers being formed with a pair of spaced grooves arranged to embrace the opposed edges of a printed circuit blank, each of the pairs being arranged to provide a substantially continuous pair of tracks when the movable carriers are in an elevated position, adjustment means in connection with the respective carriers by which the spacing between the tracks may be varied to accommodate blanks differing in width and being arranged for clamping of one of said tracks in a selected spaced relationship to the other track, a motor-operated pusher mechanism arranged to operate in conjunction with the tracks and concurrently engage a blank on one of the fixed carriers to remove therefrom said blank into position on the movable carrier by sliding said blank along the track, a fixed support below the level of the tracks, a movable operating mechanism coupled to each of the movable carriers to sustain said carriers in elevated position and being moved to lower said carriers thereby to lower the blank to the support of the support, and a pair of positioning pins on each of the supports, said blank having a pair of positioning apertures therein formed to receive the pins when said blank is lowered whereby the blank is positioned relative to the support for the upper side of the blank to be engaged by a component after portions thereof are passed through holes in said blank by a component attaching mechanism above the movable carrier and said component secured to said blank by clinching of said portions to the lower side of said blank by said attaching mechanism.

8. In printed circuit assembly apparatus, a row of alternate fixed and vertically movable horizontal carriers, each of the carriers being formed with a pair of spaced grooves and the grooves of adjacent pairs being in registration to provide substantially continuous tracks to receive the opposed edges of a blank when the movable carriers are in elevated position, a reciprocatory mechanism beside the tracks, said mechanism being arranged to engage a blank on one of the movable carriers during the forward part of its stroke to push said blank along the tracks into position on another of the movable carriers, a fixed support below the level of the tracks, a cam follower connected to each of the movable carriers, a cam cooperating with each of the followers for support of said movable carriers, said carriers being in their upper positions when said cams are in a first position and being lowered until the blank is supported by said support by moving of said cams to a second position to also provide clearance for the reciprocatory mechanism to move through the return portion of its stoke above said blank, and a pair of vertical positioning pins on each of the supports, said blank having a pair of positioning apertures therein formed to receive the pins when said blank is lowered whereby the blank is positioned relative to the support for the upper side of the blank to be engaged by a component after portions thereof are passed through holes in said blank by a component attaching mechanism above the movable carrier and said component secured to said blank by clinching of said portions to the lower side of said blank by said attached mechanism.

9. Apparatus of the class described comprising a frame, a row of supports on the frame to successively receive a printed circuit blank having a pair of registration portions thereon, a pair of registration members on each of the supports, said members being complementary to said portions for cooperation therewith to provide a fixed position for the blank when it is positioned on any one of the supports, a horizontal pad on the frame beside each of the supports, an upright member associated with each of the pads, an arm cantilevered from each of the uprights and having an outer end, a component affixing device on each of the outer ends thereby to be above one of the supports, and means in connection with each of the uprights and the pads by which said uprights may be clamped in a different selected position on said pads for the respective devices to be operative at a different point on the blank.

10. Apparatus of the class described comprising a frame, a horizontal support on the frame to support thereon a printed circuit blank of rectangular formation in a fixed position, bearer mechanism comprising upright means on the frame, an arm cantilevered from the upright for a transverse and elevated relationship thereof to the blank, a first coupling on the side of the arm for supporting a first component affixing device, a second coupling on the end of the arm, first releasable clamping means anchoring the first coupling means to the arm and permitting said first coupling means to be moved along said arm when clamping operation of said clamping means is reduced thereby for the first device to be carried transversely of said blank to a position above a selected point thereon and be fixed thereat by clamping operation of said first clamping means, and second releasable clamp means anchoring said second device to said second coupling, said second coupling being arranged to guide said second device in a course transversely of the course of said first device when the clamping operation of said second clamping means is reduced thereby for said second device to be carried longitudinally of said blank to a position above a selected point thereon and be fixed in said selected position by clamping operation of said second clamping means.

11. In a machine for affixing to a printed circuit blank a component having a longitudinal body formed with opposed ends and a lead continuing from both of the ends, spaced apart pairs of fixed and movable jaws for cooperation with each other, magazine means to retain components in side-by-side relation including a pair of guides at opposed ends of the bodies, said guides being spaced to provide slots through which said leads may extend, said guides extending from an elevation above that of the jaws to a region between the jaws for the leads of the lowermost magazined component to extend between the jaws and be thereby positioned when said jaws are operated, and a movable stop fixed to the movable jaws, said stop moving between the lowest magazined component and adjacent component for retaining the remaining component in the magazine until after said lowermost component has been positioned.

12. A component attaching means for attaching components to a chassis board including a base, a slider slidably carried by the base, a ram slidably carried by the slider, piston means disposed at one end of the base and adjustably connected to the ram for driving the ram, clutch means for connecting the ram to the slider comprising a first detent on the ram and an opening through the slider and ball means seated in said opening and detent, a second opening in the base and spring pressed plunger means in said opening, said opening adapted to receive said ball upon movement of the slider and ram relative to the base, and said ball being moved out of the ram detent against said plunger to release the ram from the slider.

13. A component attaching means for attaching components to a chassis board including a base, a slider slidably carried by the base, a ram slidably carried by the slider, piston means disposed at one end of the base and adjustably connected to the ram for driving the ram, clutch means for connecting the ram to the slider comprising a first detent on the ram and an opening through the slider and ball means seated in said opening and detent, a second opening in the base and spring pressed plunger means in said opening, said opening adapted to receive said ball upon movement of the slider and ram relative to the base, and said ball being moved out of the ram detent against said plunger to release the ram from the slider, stop means on said base and means on said slider for engagement with the stop means, said stop means being positioned to stop the slider when the ball means arrives opposite the opening in the base.

14. A component attaching means for attaching components to a chassis board including a base, a slider slidably carried by the base, a ram slidably carried by the slider, piston means disposed at one end of the base and adjustably connected to the ram for driving the ram, clutch means for connecting the ram to the slider comprising a first detent on the ram and an opening through the slider and ball means seated in said opening and detent, a second opening in the base and spring pressed plunger means in said opening, said opening adapted to receive said ball upon movement of the slider and ram relative to the base, and said ball being moved out of the ram detent against said plunger to release the ram from the slider, stop means on said base and means on said slider for engagement with the stop means, said stop means being positioned to stop the slider when the ball means arrives opposite the opening in the base and stop means on the slider and means on the ram for engagement therewith on the upward stroke of the ram positioned to move the slider when the detent arrives opposite said ball.

15. A device for attaching components to a printed circuit board wherein the components have bendable wirelike portions comprising a base, means for supporting a component near the end of the base, a bender for bending said bendable portions of said components comprising a slider slidably supported on a support base and having ends formed with grooves, the ends arranged to engage the bendable portions of the component adjacent the support means, and said grooves arranged to receive the bent ends of the components, and ejector means carried by said slider in said grooves and having extended parts slidable therein for engagement with said components adjacent the bent ends to push said components out of said grooves, and means to withdraw said support means from support of the component prior to engagement of the component by the ejector whereby the component is supported by frictional engagement in said grooves.

16. A device for attaching components to a printed circuit board wherein the board is provided with component receiving holes and wherein the components have wires for insertion through the holes, comprising a support base, a wire severing anvil supported at one end of the support base, a severing and bending slide slidably supported by the support base and having cutter surfaces for cooperation with said anvil surfaces to sever said wires to uniform length upon movement of the slide toward the anvil, means to support a component in cooperative relation to the anvil and slide, said slide being provided with grooves facing toward each other and arranged to receive the bent ends of said wires when the slide end passed beyond the component support, ejector means slidably carried by said slider in said grooves and having projections arranged to engage said wires adjacent the bent ends and to slide the bent ends in said groove, and means on said slider for engaging and moving said component support to remove it from proximity of the component after the bent ends are disposed in said grooves.

17. A device for attaching electronic components to a chassis base wherein the base is formed with component receiving apertures and wherein the components have connecting wires for insertion through the holes, comprising a support base, a severing anvil supported by the base, a severing and bending slide slidably supported by the base and having cutter surfaces for cooperation with said anvil surfaces to sever said wires to uniform length upon movement of the slide toward the anvil, means to support a component in cooperative relation to the anvil and slide comprising a magazine arranged to support a plurality of said components, pivotally mounted on the base; said slide being provided with grooves facing toward each other and arranged to receive the bent ends of said wires when the slide end passes beyond the component support, ejector means slidably carried by said slider in said grooves and having projections arranged to engage said wires adjacent the bent ends and to slide the bent ends in said groove, and means on said slider for engaging and moving said component support about its pivot to remove it from proximity of the component after the bent ends are disposed in said groves and having means for engaging and holding succeeding components against release.

18. A device for attaching electronic components to a chassis base wherein the base is formed with component receiving apertures and wherein the components have connecting wires for insertion through the holes, comprising a support base, a component receiving hopper having a discharge end pivotally supported for movement of the discharge end toward and from the support base, a severing anvil supported by the hopper, a bending slide slidably supported by the support base and having surfaces for cooperation with component supporting surfaces on the hopper to bend said wires to uniform angles upon movement of the slide toward the end of the support base and end of the hopper, said slide being provided with portions arranged to extend beyond the discharge end of the hopper and formed with grooves facing toward each other and arranged to receive the bent ends of said wires when the bending portions of the slide end pass beyond the ends of the hopper, ejector mean slidably carried by said slide in said grooves and having projections arranged to engage said wires adjacent the bent ends and to slide the bent ends in said grooves, and means on said slide for engaging and moving said hopper about its pivot to remove the discharge end from proximity of the component after the bent ends of the component are disposed in said grooves and having means for engaging and holding succeeding components against release from the hopper.

19. A device for attaching electronic components to a chassis base wherein the base is formed with component receiving apertures and wherein the components have connecting wires for insertion through the holes, comprising a support base, a component receiving hopper having a discharge end pivotally supported for movement of the discharge end toward and from the support base, a severing anvil supported by the hopper, a bending slide slidably supported by the support base and having surfaces for cooperation with component supporting surfaces on the hopper to bend said wires to uniform angles upon movement of the slide toward the end of the support base and end of the hopper, said slide being provided with portions arranged to extend beyond the discharge end of the hopper and formed with grooves facing toward each other and arranged to receive the bent ends of said wires when the bending portions of the slide end pass beyond the ends of the hopper, ejector means slidably carried by said slide in said grooves and having projections arranged to engage said wires adjacent the bent ends and to slide the bent ends in said grooves, and means on said slide for engaging and moving said hopper about its pivot to remove the discharge end from proximity of the component after the bent ends of the component are disposed in said grooves and having means for engaging and holding succeeding components against release from the hopper, motor means for moving said ejector and slide comprising a motor having a reciprocable member adjustably connected to said ejector, a detent in the ejector facing toward the slide, a socket extending through the slide and a ball disposed in said socket and engaged in the detent, a recess in said support base having a spring pressed plunger therein arranged for alignment with the ball socket on the slide upon a predetermined movement of the ejector and slide and means for engagement with the slide to stop its sliding movement when the socket is aligned with said recess and plunger, said ball moving out of said detent and locking the slide to the support base, and said ejector moving beyond the slide to push said component out of said grooves with the bent ends into said apertures.

20. A device for attaching circuit components to a chassis board wherein the board is formed with component receiving apertures and wherein the components have axially extending wire portions arranged to be bent at an angle to provide parallel parts for insertion through the apertures, comprising a base, means to support the component, a wire severing anvil supported by the base, a bending slide slidably disposed on the base and having surfaces for cooperation with the anvil to bend said wires to uniform angles upon movement of the slide toward the end of the base, said slide being provided with portions arranged to extend beyond the component support and formed with grooves facing toward each other and arranged to receive the bent ends of said wire when the bending portions of the slide end pass beyond the ends of the component support, ejector means slidably carried by said slide in said grooves and having projections arranged to engage said wires adjacent the bent ends and to slide the bent ends in said grooves, and means on said slide for engaging and moving said component support to remove it from proximity of the component after the bent ends of the component are disposed in said grooves, motor means for moving said ejector and slide comprising a motor having a reciprocable member adjustably connected to said ejector, clutch means between the ejector and slide to drive the slide through the ejector, and means on said base for cooperation with the slide to release the slide and lock the slide to the base.

21. A device for attaching circuit components to a chassis board wherein the board is formed with component receiving apertures and wherein the components have axially extending wire portions arranged to be bent at an angle to provide parallel parts for insertion through the apertures, comprising a base, means to support the component, a wire severing anvil supported by the base, a bending slide slidably disposed on the base and having surfaces for cooperation with the anvil to bend said wires to uniform angles upon movement of the slide toward the end of the base, said slide being provided with portions arranged to extend beyond the component support and formed with grooves facing toward each other and arranged to receive the bent ends of said wire when the bending portions of the slide end pass beyond the ends of the component support, ejector means slidably carried by said slide in said grooves and having projections arranged to engage said wires adjacent the bent ends and to slide the bent ends in said grooves, and means on said slide for engaging and moving said component support to remove it from proximity of the component after the bent ends of the component are disposed in said grooves, motor means for moving said ejector and slide comprising a motor having a reciprocable member adjustably connected to said ejector, a detent in the ejector facing toward the slide, a socket extending through the slide and a ball disposed in said socket and engaged in the detent, a recess in said base having a spring pressed plunger therein arranged for alignment with the ball socket on the slide upon a predetermined movement of the ejector and slide and means for engagement with the slide to stop its sliding movement when the socket is aligned with said recess and plunger, said ball moving out of said detent and locking the slide to the base, and said ejector moving beyond the slide to push said component out of said grooves with the bent end into said apertures.

22. A machine for affixing components to a printed circuit chassis board having component receiving holes in it comprising a base, a motor operatively associated with the base, an ejector ram connected to the motor, a slide supported by the base and in turn supporting the ejector, clutch means for connecting the ejector in driving relation to the slider, means on the base for cooperation with the clutch to release the locking engagement of the ejector and slider and to lock the slider to the base, a hopper for supporting a plurality of components comprising at least a pair of vertically extending guide members disposed in spaced parallel relation for receiving the components therein, support means on the base pivotally supporting said hopper, means carried by the slider and connected to the hopper to move one end of the hopper toward and away from the base, support means at the lower end of said base for receiving and supporting a component from the hopper, means on said slider for engagement with said component upon downward movement to engage and hold said component, said means arranged to lower said component into proximity and registration with the holes in the printed circuit board, said ejector being movable into engagement with said component to release it from holding engagement with the slider and insert it into the holes in said board, and means on said hopper for engagement with the remaining components to hold them against discharge and means on the slider connected to said holding means for operating the holding means in timed relation to the operation of the hopper toward and away from the base.

23. A machine for affixing components to a printed circuit chassis board having component receiving holes in it comprising a base, a motor operatively associated with the base, an ejector ram connected to the motor, a slide supported by the base and in turn supporting the ejector, clutch means for connecting the ejector in driving relation to the slider, means on the base for cooperation with the clutch to release the locking engagement of the ejector and slider and to lock the slider to the base, a hopper for supporting a plurality of components comprising at least a pair of vertically extending guide members disposed in spaced parallel relation for receiving the components therein, support means on the base pivotally supporting said hopper, means carried by the slider and connected to the hopper to move one end of the hopper toward and away from the base, support means at the lower end of said base for receiving and supporting a component from the hopper, means on said slider for engagement with said component upon downward movement to frictionally engage and hold said component, said means arranged to lower said component into proximity and registration with the holes in the printed circuit board, said ejector being movable into engagement with said component to release it from folding engagement with the slider and insert it into the holes in said board, and gate means on said hopper for engagement with the remaining components to hold them against discharge, spring means for said gate to normally hold it in component holding position and means on the slider arranged to raise said gate means in timed relation to the operation of the hopper toward the base.

24. A machine for attaching electronic components to circuit boards having openings for receiving attaching parts of the components comprising a support for supporting a plurality of component attaching means in stations, track means for supporting said boards disposed to one side of said attaching means and including a magazine for supporting a stack of boards, motor means for moving boards from said magazine into and along said track, said track being provided with portions opposite to said stations which are arranged to be moved in a vertical direction, a second motor means connected to said portions for moving said track sections vertically, means disposed below said movable track sections for supporting a circuit board when the track is moved downwardly including index means for engagement with the board to accurately position the board relative to the support and anvil means for positioning below the openings in the board, each of said component attaching means being operated by a motor to move a component with the attaching means through said openings, said anvils arranged to engage said attaching means and bend them into engagement with the bottom of the board, circuit means for controlling the operation of said motors in timed relation, at least one of said anvils being supported in insulated relation and connected into said circuit to stop said machine if one of the attaching components fails to contact the anvil and complete the circuit.

25. An apparatus for attaching electronic components to a chassis wherein the components are provided with end wires arranged to be bent and inserted in holes in the chassis comprising a component attaching means including a reciprocable member for attaching the components, a hopper for receiving the components, comprising pairs of vertically extending parallel guide members for receiving the component body therebetween and providing slots for admitting the ends of wires therethrough, said hopper extended in proximity to the attaching means, and cutting means mounted on the hopper and operated by the reciprocable member to sever the wires to equal length.

26. An apparatus for attaching electronic components to a chassis wherein the components are provided with end wires arranged to be bent and inserted in holes in the chassis comprising a component attaching means including a reciprocable member for attaching the components, a hopper for receiving the components, comprising pairs of vertically extending parallel guide members for receiving the component body therebetween and providing slots for admitting the ends of wires therethrough, said hopper extended in proximity to the attaching means, and cutting means mounted on each side of the hopper and each comprising a plate having a slot therein in alignment with the slot in the hopper for receiving the ends of the wire, a pivotal cutter member mounted for reciprocation into said slot for cooperation with the slot to cut the wires and means on said cutter bar for operative engagement with said reciprocable member to be actuated thereby.

27. Apparatus of the class described comprising a frame, a row of supports on the frame to successively receive a printed circuit blank having registration portions thereon, registration members on the respective supports, said members being complementary to said portions for cooperation therewith when the blank is positioned on any one of the supports thereby for the blank to occupy a fixed position only when on any of said supports, an upright member beside each of the supports, an arm cantilevered from each of the uprights and having an outer end, a component affixing device on each of the outer ends thereby to be above one of the supports, and means in connection with each of the uprights and the frame by which each of said uprights may be clamped in different selected positions on said frame for the respective devices to be operative at a different point on the blank.

28. In printed circuit assembly apparatus, a row of alternate fixed and vertically movable horizontal carriers, each of the carriers being formed with a pair of spaced grooves and the grooves of adjacent pairs being in registration to provide substantially continuous tracks to receive the opposed edges of a blank when the movable carriers are in elevated position, a reciprocatory mechanism beside the tracks, said mechanism being arranged to engage a blank on one of the movable carriers during the forward part of its stroke to push said blank along the tracks to a fixed position on another of the movable carriers, a fixed support below the level of the tracks, a cam follower connected to each of the movable carriers, a cam cooperating with each of the followers for support of said movable carriers, said carriers being in their upper positions when said cams are in a first position and being lowered until the blank is supported by said support by moving of said cams to a second position to also provide clearance for the reciprocatory mechanism to move through the return portion of its stroke above said blank, a pair of vertical positioning pins on each of the supports, said blank having a pair of positioning apertures therein formed to receive the pins when said blank is lowered whereby the blank is positioned relative to the support for the upper side of the blank to be engaged by a component after portions thereof are passed through holes in said blank by a mechanism above the movable carrier and said component secured to said blank by clinching of said portions to the lower side of said blank by said mechanism, and motive means drivingly coupled to the cams for moving them sequentially to the operation of the reciprocatory mechanism, for the blank to be removed from the support after a component has been applied to said blank and moved to its elevated position in time for it to be engaged by the reciprocatory mechanism during another operation thereof for transfer of said blank to the next movable carrier.

29. Apparatus of the class described comprising a frame, a horizontal support thereon on which a rectangular printed circuit blank may be superimposed in a fixed position, a mounting for a plurality of component affixing devices comprising an inverted L-shaped structure formed with a transverse member upwardly of an upright portion, said structure being fixedly arranged on the frame for said transverse member to extend in a direction transversely of the blank when said blank is in its fixed position and terminating in an end bearing one of the devices above and in fixed relation to a first point on said blank, a bracket having a pair of vertical sides normal to each other, first means in connection with the bracket for releasably clamping it to either side of the transverse member by drawing it against said member, a first pair of horizontal and complementary guide portions on said transverse member and one of the surfaces cooperating with each other when the clamping means is in operation to resist vertical displacement of the bracket relative to the transverse member and confining said bracket when said clamping means is loosened to movement horizontally over said member, second clamping means in connection with the bracket for clamping another of the devices to the other of said surfaces on the bracket by drawing it thereagainst, and a second pair of horizontal and complementary guide portions on the respective other surface and said other device to resist vertical displacement of said other device when said second clamping means is in operation and confining said other device to movement horizontally when clamping of said clamping means is relaxed thereby for said other device to be clamped in a selected position at variance both longitudinally and transversely with the position of the one device over said blank when it is in its selected position.

30. A machine for inserting and clinching terminal connections of an article comprising, a support for the article, a driver bar formed to bear only on a portion of the article to insert its connection endwise in a work piece, an anvil having electrically isolated clinching terminals disposed to be engaged by the inserted terminal connections respectively, and a test circuit including said terminals and disposed to be closed by the driver bar and said terminal connections to indicate that engagement of the latter with the anvil has occurred.

31. In a machine for inserting the terminal connections of electrical components, a testing anvil comprising electrically isolated clinching terminals, and a control circuit, including said terminals, normally open and disposed to be closed by said leads when inserted to be clinched respectively on said terminals.

32. A machine for securing the leads of lead bearing components to work pieces comprising a lead inserting driver bar mounted for reciprocable movement toward and from a work piece on one side thereof, an anvil on the other side thereof, said anvil including spaced clinching terminals respectively disposed to be engaged by a lead thrust endwise thereagainst by said driver bar, and a circuit including said terminals for controlling operation of said driver bar, said circuit being formed to be effectively closed across said terminals by the driver bar and the component leads.

33. In a machine for inserting the leads of a lead bearing component in a work piece, a cyclically operative driver bar, means for moving the bar toward the work piece to insert the leads of a component endwise, an anvil having clinching terminals respectively mounted to upset the leads being inserted, and electrical means including a circuit for controlling operation of the driver bar relatively to the work piece, said electrical means being rendered effective by the leads of a component engaging said anvil terminals.

34. A machine as set forth in claim 33 and further characterized in that said circuit includes a time delay mechanism operative to insure clinching of said leads prior to operation of said electrical means to retract the driver bar.

35. A machine for inserting the leads of lead bearing components in wiring boards comprising a reciprocable driver bar, means for supporting a wiring board in desired position with respect to the driver bar, an anvil including spaced clinching terminals respectively mounted to be engaged by the leads of a component thrust through said board by the operating stroke of said driver bar, power means for operating said driver bar, and a circuit for interrupting operation of said power means when at least one of the component leads to be thrust through the board fails to engage an anvil terminal during said operating stroke.

36. In a machine for attaching electrical components to printed circuit blanks having holes therein, a plurality of component attaching stations, conveying means for supporting and moving said blanks through said stations, each of said stations having component attaching means for inserting component leads in said holes, registration means at each of said stations for positioning said blanks relative to said component attaching means, operating means for intermittently operating said conveying means to move said blanks from station to station with a stop effected at each station, said blanks and said registration means movable relative to each other into engagement during said stop to provide a fixed position of said blanks relative to said component attaching means, actuating means for actuating at least some of said component attaching means during said stop, and means for synchronizing operation of said conveying means and said component attaching means.

References Cited in the file of this patent

UNITED STATES PATENTS

| | | |
|---|---|---|
| 351,361 | Coupal | Oct. 26, 1886 |
| 874,361 | Horton | Dec. 17, 1907 |
| 2,117,906 | Obermiller | May 17, 1938 |
| 2,128,478 | Schmidtke | Aug. 30, 1938 |
| 2,614,252 | Stilwell | Oct. 21, 1952 |
| 2,643,377 | Paxton | June 30, 1953 |
| 2,673,344 | Sandberg | Mar. 20, 1954 |
| 2,772,416 | Dorosz | Dec. 4, 1956 |
| 2,791,772 | Cardini | May 14, 1957 |

FOREIGN PATENTS

| | | |
|---|---|---|
| 618,788 | Great Britain | Feb. 28, 1949 |